US006230486B1

(12) United States Patent
Yasui et al.

(10) Patent No.: US 6,230,486 B1
(45) Date of Patent: May 15, 2001

(54) PLANT CONTROL SYSTEM

(75) Inventors: Yuji Yasui; Shusuke Akazaki; Tadashi Sato; Masaki Ueno; Yoshihisa Iwaki, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/465,395

(22) Filed: Dec. 17, 1999

(30) Foreign Application Priority Data

Dec. 17, 1998 (JP) .................................................. 10-359816

(51) Int. Cl.⁷ ...................................................... F01N 3/00
(52) U.S. Cl. ................................ 60/285; 60/274; 123/674
(58) Field of Search ..................... 60/274, 285; 123/674; 701/106

(56) References Cited

U.S. PATENT DOCUMENTS

| | | | |
|---|---|---|---|
| 4,235,204 | * 11/1980 | Rice ........................................ | 60/276 |
| 5,117,631 | * 6/1992 | Moser ..................................... | 60/285 |
| 5,392,599 | * 2/1995 | Hamburg et al. ...................... | 60/274 |
| 5,426,935 | * 6/1995 | Ogawa et al. .......................... | 60/285 |
| 5,682,317 | * 10/1997 | Keeler et al. .......................... | 60/274 |
| 5,694,910 | 12/1997 | Hasegawa et al. . | |
| 5,758,490 | * 6/1998 | Maki et al. ............................. | 60/285 |
| 5,797,261 | * 8/1998 | Akazaki et al. ....................... | 123/674 |
| 5,845,490 | 12/1998 | Yasui et al. . | |
| 5,845,491 | 12/1998 | Yasui et al. . | |
| 5,852,930 | 12/1998 | Yasui et al. . | |
| 5,857,163 | * 1/1999 | Trombley et al. ..................... | 60/277 |
| 5,880,952 | 3/1999 | Yasui et al. . | |
| 5,901,552 | * 5/1999 | Schnaibel et al. .................... | 60/285 |
| 5,924,281 | 7/1999 | Yasui et al. . | |
| 5,937,638 | * 8/1999 | Akazaki et al. ....................... | 60/285 |
| 5,983,875 | * 11/1999 | Kitagawa et al. ..................... | 123/674 |
| 6,021,767 | * 2/2000 | Yasui et al. ............................ | 60/285 |
| 6,073,073 | * 6/2000 | Kitamura et al. ...................... | 60/285 |
| 6,092,017 | * 7/2000 | Ishida et al. .......................... | 701/106 |
| 6,125,831 | * 10/2000 | Yasui et al. ........................... | 123/674 |

FOREIGN PATENT DOCUMENTS

| | | |
|---|---|---|
| 4-369471 | 12/1992 | (JP) . |
| 5-79374 | 3/1993 | (JP) . |
| 7-83094 | 3/1995 | (JP) . |
| 7-259588 | 10/1995 | (JP) . |
| 8-21273 | 1/1996 | (JP) . |
| 8-105345 | 4/1996 | (JP) . |
| 11-93740 | 4/1999 | (JP) . |
| 11-93741 | 4/1999 | (JP) . |

OTHER PUBLICATIONS

Serial No.: 09/153,156; filed: Sep. 15, 1998; By: Yuji Yasui et al; For: Plant Control System (Now US Patent 6,079,205).
Serial No.: 09/153,300; filed: Sep. 15, 1998; By: Yuji Yasui et al For: Plant Control System (Now US Patent 6,112,517).
Serial No.: 09/153,032; filed: Sep. 15, 1998; By: Yuji Yasui et al For: Plant Control System (Now US Patent 6,082,099).

* cited by examiner

*Primary Examiner*—Thomas Denion
*Assistant Examiner*—Diem Tran
(74) *Attorney, Agent, or Firm*—Arent Fox Kintner Plotkin & Kahn, PLLC

(57) ABSTRACT

A plant control system has a reference value setting unit for variably setting a reference value for an air-fuel ratio to be given to an exhaust system including a catalytic converter, depending on a component based on an adaptive control law of a manipulated variable of the air-fuel ratio generated by a controller according to an adaptive sliding mode control process in order to converge an output of an $O_2$ sensor disposed downstream of the catalytic converter to a target value. The manipulated variable generated by the controller represents the difference between the air-fuel ratio and the reference value, required to converge the output of the $O_2$ sensor to the target value.

16 Claims, 27 Drawing Sheets

PLANT CONTROL SYSTEM

BACKGROUND OF THE INVENTION

1. Field of the Invention

The present invention relates to a plant control system.

2. Description of the Prior Art

The applicant of the present application has proposed an air-fuel ratio control system having an exhaust gas sensor for detecting the concentration of a certain component of an exhaust gas that has passed through a catalytic converter such as a three-way catalytic converter disposed in the exhaust passage of an internal combustion engine, such as an $O_2$ sensor for detecting the concentration of oxygen in the exhaust gas, the exhaust gas sensor being disposed downstream of the catalytic converter. The system controls the air-fuel ratio of the internal combustion engine, more accurately, the air-fuel ratio of an air-fuel mixture to be combusted by the internal combustion engine, in order to converge an output of the $O_2$ sensor, i.e., the detected value of the oxygen concentration, to a predetermined target value for enabling the catalytic converter to have a desired purifying ability irrespective of the aging of the catalytic converter. See, for example, U.S. patent application Ser. No. 09/311353, U.S. patent application Ser. No. 09/153300, and Japanese patent application No. 11-93740 (U.S. patent application Ser. No. 09/153156).

According to the disclosed technology, the behavior of the exhaust system ranging from a position up-stream of the catalytic converter to the $O_2$ sensor down-stream thereof is modeled. A manipulated variable for manipulating the air-fuel ratio of the internal combustion engine is successively generated in given control cycles in order to converge the output of the $O_2$ sensor to its target value based on a feedback control process (specifically, a sliding mode control process) constructed based on the model. The air-fuel ratio of the internal combustion engine is manipulated by controlling operation of the internal combustion engine based on the manipulated variable, specifically, by adjusting the amount of fuel supplied to the internal combustion engine.

More specifically, the manipulated variable generated according to the feedback control process is a target value for the difference (hereinafter referred to as a "differential air-fuel ratio") between the actual air-fuel ratio of the internal combustion engine and a predetermined reference value (constant value) for the air-fuel ratio. According to the disclosed technology, an exhaust gas sensor (hereinafter referred to as an "air-fuel ratio sensor) for detecting the air-fuel ratio of the air-fuel mixture that has been burned by the internal combustion engine is disposed upstream of the catalytic converter. The amount of fuel supplied to the internal combustion engine is regulated according to a feedback control process so as to converge the output of the air-fuel ratio sensor, i.e., the detected value of the air-fuel ratio, to a target air-fuel ratio defined by the manipulated variable (a target value for the differential air-fuel ratio) and the reference value for thereby controlling the air-fuel ratio of the internal combustion engine at the target air-fuel ratio.

Such air-fuel ratio control for the internal combustion engine is capable of converging the output of the $O_2$ sensor disposed downstream of the catalytic converter to its target value for thereby enabling the catalytic converter to have a desired purifying ability.

In the above proposed air-fuel ratio control system, the feedback control process using the output of the air-fuel ratio sensor disposed upstream of the catalytic converter is carried out for controlling the air-fuel ratio of the internal combustion engine at the target air-fuel ratio. However, it is also possible to control the air-fuel ratio of the internal combustion engine at the target air-fuel ratio according to a feedforward control process by determining the amount of fuel supplied to the internal combustion engine from the target air-fuel ratio using a map or the like.

In the above air-fuel ratio control system, the $O_2$ sensor is used as the exhaust gas sensor disposed down-stream of the catalytic converter. However, the exhaust gas sensor may comprise an NOx sensor, a CO sensor, an HC sensor, or another exhaust gas sensor. It is possible to enable the catalytic converter to have a desired purifying ability by controlling the air-fuel ratio of the internal combustion engine so as to converge the output of such an exhaust gas sensor to a suitable target value.

In the above conventional air-fuel ratio control system, the exhaust system, including the catalytic converter, which ranges from a position upstream of the catalytic converter to the $O_2$ sensor downstream of the catalytic converter may be considered to be a plant for generating the output of the $O_2$ sensor from the air-fuel ratio of the internal combustion engine (the air-fuel ratio as detected by the air-fuel ratio sensor). The internal combustion engine may be considered to be an actuator for generating an exhaust gas having an air-fuel ratio to be supplied to the plant. Thus, the air-fuel ratio control system may be expressed as a system for generating a manipulated variable to control the input (air-fuel ratio) to the plant (=an output from the actuator) to converge the output of the $O_2$ sensor as the output of the plant to a given target value, and controlling operation of the internal combustion engine as the actuator based on the manipulated variable.

In modeling the exhaust system including the catalytic converter, the exhaust system is regarded as a system for generating the difference between the output of the $O_2$ sensor and its target value with a response delay, etc. from the differential air-fuel ratio which is the difference between the air-fuel ratio of the air-fuel mixture combusted by the internal combustion engine and a predetermined fixed reference value with respect to the air-fuel ratio.

The feedback control process for generating the manipulated variable as the target value for the differential air-fuel ratio is constructed on the basis of the model of the exhaust system.

With the input (differential air-fuel ratio) to the exhaust system that is modeled and the output thereof (the difference between the output of the $O_2$ sensor and its target value) being expressed as differences, the algorithm of the feedback control process for generating the manipulated variable can be simplified.

According to the above technique, a parameter for defining the behavior of the model of the exhaust system is successively identified using the output data of the air-fuel ratio sensor and the $O_2$ sensor. In order to generate the manipulated variable, the feedback control process uses the identified parameter of the model of the exhaust system.

It has been found as a result of a further study by the inventors of the present application that when the output of the air-fuel ratio sensor suffers a steady offset from a normal output due to deterioration of the air-fuel ration sensor or when the actual air-fuel ratio is subject to a steady error with respect to the target air-fuel ratio due to an aging-induced characteristic change of the internal combustion engine, the quick response of a control process for converging the output of the O₂ sensor based on the model of the exhaust system to the target value is lowered, and the output of the O₂ sensor suffers a steady error with respect to the target value.

In another application, a manipulated variable for controlling an input to an arbitrary plant to converge a detected value of an output of the plant to a predetermined target value is generated according to a feedback control process based on a model of the plant which is constructed in the same manner as with the above technique. The above drawbacks are also caused in such an application when operation of the actuator for generating the input to the plant is controlled based on the manipulated variable.

SUMMARY OF THE INVENTION

It is therefore an object of the present invention to provide a plant control system for controlling an input to a plant in order to converge an output of a detecting means for detecting an output of the plant to a predetermined target value, the plant control system being capable of increasing the accuracy and quick response of a control process of converging the output of the detecting means to the target value.

Another object of the present invention is to provide a plant control system for controlling a plant which comprises an exhaust system ranging from a position upstream of a catalytic converter disposed in an exhaust passage of an internal combustion engine for purifying an exhaust gas from the internal combustion engine, to a position downstream of the catalytic converter, by controlling the air-fuel ratio of the internal combustion engine as an input to the exhaust system in order to converge an output of an exhaust gas sensor for detecting the concentration of a certain component of the exhaust gas downstream of the catalytic converter, to a predetermined target value.

To achieve the above objects, there is provided in accordance with the present invention a plant control system for controlling a plant, comprising an actuator for generating an input to the plant, first detecting means for detecting an output from the plant, manipulated variable determining means for sequentially generating a manipulated variable which manipulates the input to the plant to converge the output from the first detecting means to a predetermined target value according to a feedback control process constructed based on a model of a behavior of the plant as a system for generating the difference between the output from the first detecting means and a target value with at least a response delay from the difference between the input to the plant and a predetermined reference value, actuator control means for controlling operation of the actuator based on the manipulated variable to manipulate the input to the plant, and reference value variable setting means for variably setting the predetermined reference value depending on the manipulated variable generated by the manipulated variable determining means.

According to the present invention, a manipulated variable which manipulates the input to the plant to converge the output from the first detecting means (a detected value of the output from the plant) to a predetermined target value is sequentially generated according to a feedback control process constructed based on the model of the plant, and operation of the actuator is controlled based on the manipulated variable to manipulate the output of the actuator which is the input to the plant.

According to various studies made by the inventors of the present application, if the reference value relative to the difference (which may be referred to as a plant differential input in the description of the invention) between the input to the plant expressed by the model and the predetermined reference value is constant as is conventional, then when the input to the plant (=the output of the actuator) manipulated based on the manipulated variable contains steady disturbance, the quick response of the convergence of the output from the first detecting means to the target value may occasionally be lowered. In such a situation, when the reference value is appropriately changed depending on the manipulated variable generated by the manipulated variable generating means, the quick response of the convergence of the output from the first detecting means to the target value can be increased.

According to the present invention, the predetermined reference value is variably set depending on the manipulated variable generated by the manipulated variable determining means. In this manner, it is possible to increase the quick response of the control process for converging the output from the first detecting means to the target value.

In the present invention, the plant comprises an exhaust system ranging from a position upstream of a catalytic converter disposed in an exhaust passage of an internal combustion engine for purifying an exhaust gas from the internal combustion engine, to a position downstream of the catalytic converter, the exhaust system including the catalytic converter, the input to the plant comprising an air-fuel ratio of an air-fuel mixture combusted in the internal combustion engine as the actuator for generating the exhaust gas which enters the catalytic converter, the output from the plant comprising the concentration of a component of the exhaust gas having passed through the catalytic converter.

At this time, it is possible to increase the quick response of the convergence of the output from the first detecting means, i.e., a detected value of the concentration of a certain component of the exhaust gas having passed through the catalytic converter, to the target value, so that the purifying capability of the catalytic converter is smoothly achieved.

More specifically, the feedback control process comprises a process (e.g., a sliding mode control process) for generating the manipulated variable using data representing the difference between the output of the first detecting means and the target value (which difference may be referred to as a plant differential output in the description of the invention), and parameters of the model which define the behavior of the model.

Using the data of the plant differential output and the parameters of the model, the manipulated variable required to converge the output from the first detecting means to the target value can be generated appropriately.

The parameters comprise parameters to be set to certain values in defining the behavior of the model. For example, if the model is a model in which the plant differential output in each given control cycle is expressed with a discrete system (more specifically, a discrete-time system) by a plant differential output in a past control cycle prior to the control cycle and the plant differential input, then coefficients relative to the plant differential input and the plant differential output in the model are the parameters of the model.

In the feedback control process (e.g., the sliding mode control process) performed for the manipulated variable generating means to generate the manipulated variable, it is possible to construct a simple algorithm which does not use the parameters of the plant.

For generating the manipulated variable using the parameters of the model of the plant, the plant control system should preferably have second detecting means for detecting the input to the plant, and identifying means for sequentially identifying the parameters of the model, using the data representing the difference between the output of the first detecting means and the target value, and the data representing the difference between the output from the second detecting means and the reference value.

While the parameters of the model of the plant may be of constant values (fixed values), it is preferable to identify the parameters of the model sequentially on a real-time basis for causing the model to match the actual behavior of the plant. If the input to the plant is detected by the second detecting means, then the parameters of the model of the plant can be identified by using the data of the difference between the output from the second detecting means and the reference value (which difference corresponds to the detected value of the plant differential input) and the data of the plant differential output.

According to the finding of the inventors of the present application, in a situation where the output from the second detecting means suffers a steady offset or the input to the plant (=the output of the actuator) manipulated based on the manipulated variable contains steady disturbance, if the reference value is constant as is conventional, then the identified values of the parameters of the model of the plant tend to suffer a steady error with respect to a true value, and hence the output from the first detecting means is also liable to suffer a steady error with respect to its target value. However, with the reference value being variably set depending on the manipulated variable according to the present invention, it is possible to increase the accuracy of the identified values of the parameters of the model of the plant, and hence it is possible to increase the accuracy of the control process for converging the output from the first detecting means to the target value in various behavioral states of the plant. If the plant is the exhaust system of an internal combustion engine, then the purifying capability of a catalytic converter in the exhaust system is reliably achieved.

In the plant control systems according to the present invention, the model of the plant can be expressed by a continuous system, specifically, a continuous-time system. However, the model of the plant should preferably be such a model that the behavior of the plant is expressed by a discrete system, specifically, a discrete-time system. The model is a model (autoregressive model) where the plant differential output in each control cycle is expressed by the plant differential output in a past control cycle prior to the control cycle and the plant differential input.

With the model of the plant being constructed as a discrete system, it is easy to construct an algorithm for the manipulated variable generating means to generate the manipulated variable with a computer in given control cycles. In particular, if the above identifying means is provided, then the identifying means makes it easy to construct an algorithm for sequentially identifying the parameters of the model.

In the plant control system according to the present invention the manipulated variable comprises a target value for the difference (the plant differential input) between the input to the plant and the reference value, the actuator control means comprising means for controlling operation of the actuator in order to manipulate the input to the plant into a target input determined based on the target value for the difference and the reference value.

That is, the manipulated variable comprises a target value for the plant differential input, and operation of the actuator is controlled in order to manipulate the input to the plant (=the output of the actuator) into a target input determined based on the target value for the plant differential input and the reference value. Thus, it is made easy to construct the feedback control process based on the model of the plant, and operation of the actuator based on the manipulated variable (the target value for the plant differential input) can adequately be controlled.

In manipulating the input to the plant into the target input with the actuator control means, if the plant control system has the second detecting means for detecting the input to the plant for the processing operation of the identifying means, then operation of the actuator should preferably be controlled according to the feedback control process in order to converge the output from the second detecting means (a detected value of the input to the plant) to the target input. Even if the identifying means is not provided, it is preferable to provide the second detecting means and to control operation of the actuator according to the feedback control process. In this fashion, the input to the plant can appropriately be controlled at the target air-fuel ratio.

However, when an amount of operation of the actuator, specifically, the amount of fuel supplied to an internal combustion engine as the actuator, or its corrective variable is determined from the target input using a map or the like, the output of the actuator which is the input to the plant can be manipulated into the target input according to a feed-forward control process.

When operation of the actuator is controlled according to the feedback control process, the feedback control process is preferably carried out by a recursive-type controller such as an adaptive controller. Specifically, the recursive-type controller determines a new feedback manipulated variable according to a recursive formula containing a given number of time-series data prior to the present of a feedback manipulated variable for operation of the actuator (e.g., a corrective variable for the amount of operation of the actuator, a corrective variable for the amount of fuel supplied to an internal combustion engine as the actuator, etc.). With the recursive-type controller being used, the feedback control process for converging the output from the second detecting means (a detected value of the input to the plant) to the target input while compensating for the effect of a response delay of the actuator.

In the plant control system for generating the manipulated variable according to the feedback control process based on the model of the plant, the feedback control process should preferably be the sliding mode control process, and the sliding mode control process should preferably be the adaptive sliding mode control process.

The sliding mode control process is a variable-structure feedback control process, and is stabler against disturbances than the known PID control process. The adaptive sliding mode control process is a combination of an ordinary sliding mode control process and a control law referred to as an adaptive control law for eliminating the effect of disturbances as much as possible. By generating the manipulated variable according to the sliding mode control process, preferably, the adaptive sliding mode control process, the stability of the control process for converging the output from the first detecting means to the target value is increased.

If the feedback control process comprises the sliding mode control process, then the sliding mode control process generates the target value for the input to be given to the plant, i.e., plant differential input, as the manipulated variable.

If the feedback control process comprises the adaptive sliding mode control process, then the manipulated variable generated by the manipulated variable generating means according to the adaptive sliding mode control process includes an adaptive control law component based on an adaptive control law (adaptive algorithm) of the adaptive sliding mode control process. The reference value variable setting means comprises means for variably setting the reference value based on the value of the adaptive control law component of the manipulated variable.

The manipulated variable generated according to the adaptive sliding mode control process is given as the sum of a component based on a control law (so-called equivalent control input) for holding (restricting) the value of a function referred to as a switching function used in the adaptive sliding mode control process to "0", a component based on a reaching control law for converging the value of the switching function to "0", and a component based on an adaptive control law for eliminating disturbances as much as possible in converging the value of the switching function to "0".

The switching function is represented by a linear function or the like having as a component time-series data of the difference between a controlled variable (which is the output from the first detecting means in this invention) and a target value. The component based on the adaptive control law is of a value proportional to an integrated value (time integral) of the value of the switching function, for example.

According the finding of the inventors of the present application, by variably setting the reference value depending on the component based on the adaptive control law (adaptive control law component), the effect of disturbance steadily contained in the output of the actuator which is the input to the plant, more generally, the effect of an error of various data required to generate the manipulated variable with respect to a true value, can appropriately be compensated for. As a result, the accuracy and quick response of the control process for converging the output from the first detecting means to the target value can appropriately be increased.

Specifically, the reference value variable setting means comprises means for variably setting the reference value by increasing or decreasing the reference value depending on the magnitude of the value of the adaptive control law component of the manipulated variable with respect to a predetermined value or a range close to and containing the predetermined value.

The reference value is variably set such that the value of the adaptive control law component is converged to the predetermined value or a value close thereto. In this manner, the reference value can be variably set appropriately depending on the value of the adaptive control law component. The reference value serves as a reference for the plant differential input as the input to the model of the plant on which the adaptive sliding mode control process is based. If the reference value is varied too frequently, it will adversely affect the manipulated variable generated according to the adaptive sliding mode control process, tending to impair the stability of the output from the first detecting means. Therefore, in variably setting the reference value depending on the value of the adaptive control law component, it is preferable to increase or decrease the reference value depending on the magnitude of the value of the adaptive control law component with respect to the predetermined value or the range close to and containing the predetermined value (the reference value is not varied when the value of the adaptive control law component is present in the above range).

When the feedback control process for generating the manipulated variable comprises the sliding mode control process (including the adaptive sliding mode control process), the reference value variable setting means preferably comprises means for sequentially determining whether the output from the first detecting means is stable or not, and holding the reference value as a predetermined value irrespective of the manipulated variable if the output from the first detecting means is unstable.

Specifically, the reference value affects the manipulated variable generated according to the sliding mode control process, and hence the output from the first detecting means. Consequently, in a situation where the output from the first detecting means is judged as unstable, the reference value is not variably set, but is held to a predetermined value (e.g., the present value or a predetermined fixed value). In this manner, an inappropriate manipulated variable which will make the output from the first detecting means more unstable can be avoided.

The process of holding the reference value to the predetermined value in the situation where the output from the first detecting means is judged as unstable is preferably carried out when the reference value is variably set depending on the value of the adaptive control law component.

The reference value variable setting means comprises means for determining whether the output from the first detecting means is stable or not based on the value of a switching function used in the sliding mode control process.

In the sliding mode control process, it is important to converge the value of the switching function stably to "0" in stably converging the controlled variable (which is the output from the first detecting means in this invention) to the target value. Thus, the stability of the output from the first detecting means can be determined based on the value of the switching function.

For example, when the product of the value of the switching function and its rate of change (which product corresponds to the time-differentiated value of a Lyapunov function) is determined, if the product is of a positive value, then the value of the switching function is getting away from "0", and if the product is of a negative value, then the value of the switching function is getting closely to "0". Basically, therefore, it is possible to determine whether the output from the first detecting means is unstable or stable depending on whether the above product is of a positive value or a negative value. Instead, the stability of the output from the first detecting means can be determined by comparing the magnitude of the value of the switching function or the magnitude of its rate of change with a suitable given value.

In the plant control system, the reference value variable setting means comprises means for determining whether the output from the first detecting means is substantially converged to the target value or not, and holding the reference value as a predetermined value irrespective of the manipulated variable if the output from the first detecting means is not converged to the target value.

Specifically, in a situation where the output from the first detecting means is not converged to the target value, the generated state of the manipulated variable tends to be unstable. Therefore, the reference value is not variably set, but is held to a predetermined value (e.g., the present value or a predetermined fixed value).

The generated state of the manipulated variable is therefore made stable as much as possible, allowing the output from the first detecting means to be converged stably to the target value. If the plant is the exhaust system of an internal combustion engine, then the purifying capability of a catalytic converter in the exhaust system is stably achieved.

The process of holding the reference value to the predetermined value in the situation where the output from the first detecting means is not converged to the target value is preferably carried out when the reference value is variably set depending on the value of the adaptive control law component relative to the sliding mode control process. Whether the output from the first detecting means is substantially converged to the target value or not can be determined by comparing the magnitude of the difference (plant differential output) of the output from the first detecting means and the target value with a suitable given value. More specifically, if the magnitude of the difference is equal to or smaller than the given value, then the output from the first detecting means is judged as being substantially converged to the target value, and if the magnitude of the difference is greater than the given value, then the output from the first detecting means is judged as being not converged to the target value.

If the plant is the exhaust system of an internal combustion engine, then in achieving optimum the purifying capability of a catalytic converter in the exhaust system, it is preferable to use an $O_2$ sensor (oxygen concentration sensor) as the first detecting means and to set a target value for the output of the $O_2$ sensor to a predetermined constant value.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

A plant control system according to an embodiment of the present invention will be described below with reference to FIGS. 1 through 27. According to this embodiment, the plant control system is a system for controlling a plant which comprises an exhaust system of an internal combustion engine that ranges from a position upstream of a catalytic converter for purifying an exhaust gas emitted from the internal combustion engine to a position down-stream of the catalytic converter.

Figure 1:
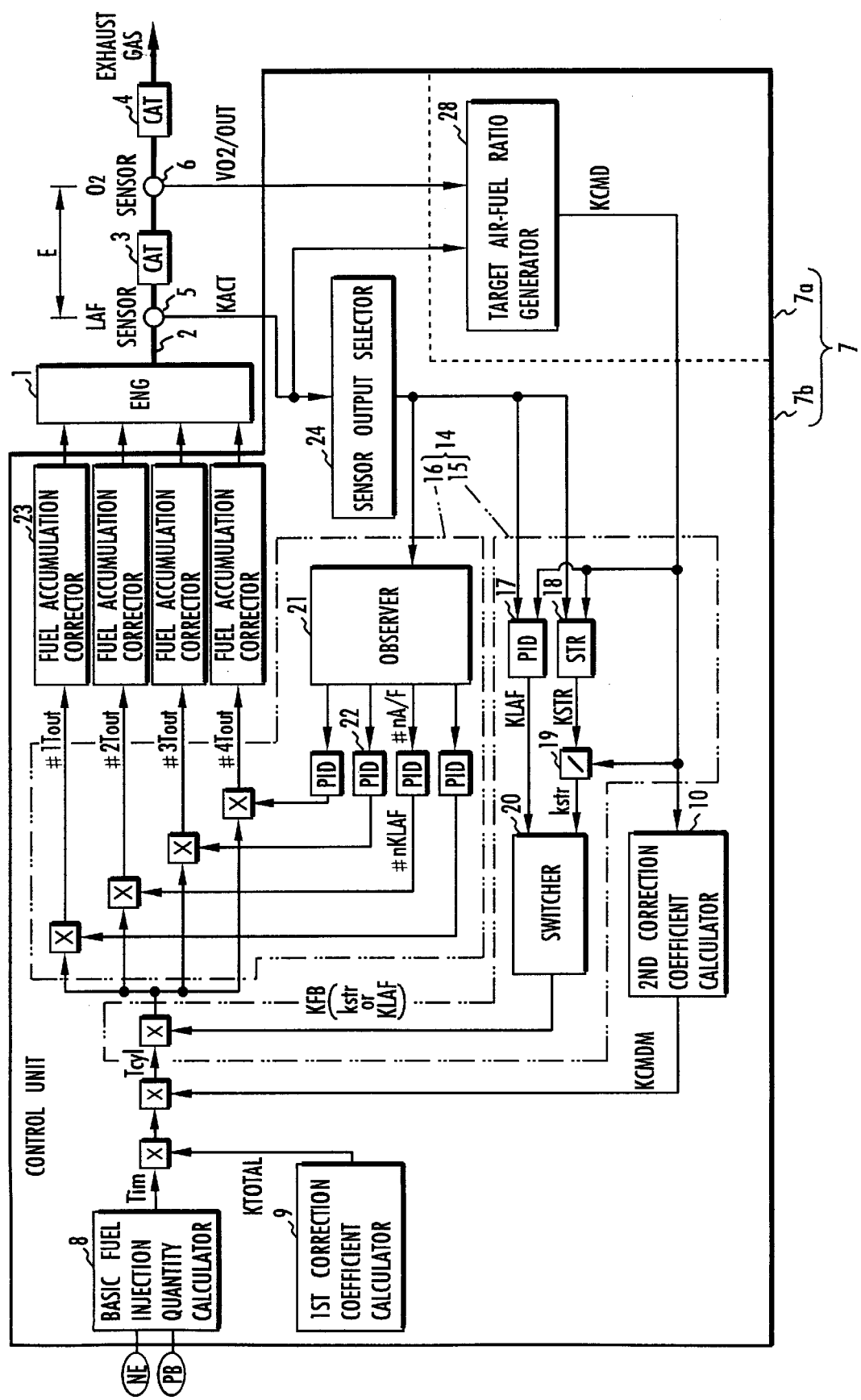
FIG. 1 is a block diagram of a plant control system according to an embodiment of the present invention.

FIG. 1 shows in block form the plant control system according to the embodiment. As shown in FIG. 1, a four-cylinder internal combustion engine 1 mounted on a propulsion source on an automobile or a hybrid vehicle, i.e., a drive source for drive wheels thereof. The internal combustion engine 1 generates exhaust gases produced by combustion of an air-fuel mixture in the cylinders. The exhaust gases are collected into a common discharge pipe 2 (exhaust passage) positioned near the internal combustion engine 1, from which the exhaust gas is discharged into the atmosphere. Two catalytic converters 3, 4, each comprising a three-way catalytic converter combined with a NOx absorber (nitrogen oxide absorber), are mounted in the common exhaust pipe 2 at successively downstream locations thereon.

The NOx absorber in each of the catalytic converters 3, 4 may be of the occlusion type which occludes NOx when the air-fuel ratio of the air-fuel mixture combusted in the internal combustion engine 1 is of a lean state (the fuel is lesser than the stoichiometric air-fuel ratio) and the concentration of oxygen in the exhaust gas is relatively high (NOx in the exhaust gas is relatively high), or of the adsorption type which adsorbs NOx in the exhaust gas when the air-fuel ratio of the air-fuel mixture is of a lean state. The occlusion-type NOx absorber may be made of barium oxide (BaO), and the adsorption-type NOx absorber may be made of sodium (Na), titanium (Ti), or strontium (Sr).

When the air-fuel ratio of the air-fuel mixture combusted in the internal combustion engine 1 is close to the stoichiometric air-fuel ratio or of a rich state (the fuel is greater than the stoichiometric air-fuel ratio), making the oxygen concentration in the exhaust gas relatively low, the occlusion-type NOx absorber discharges the occluded NOx, which is reduced by HC (hydrocarbon) and CO (carbon monoxide) in the exhaust gas. When the air-fuel ratio of the air-fuel mixture combusted in the internal combustion engine 1 is close to the stoichiometric air-fuel ratio or of a rich state (the fuel is greater than the stoichiometric air-fuel ratio), making the oxygen concentration in the exhaust gas relatively low, the adsorption-type NOx absorber causes the adsorbed NOx to be reduced by HC (hydrocarbon) and CO (carbon monoxide) in the exhaust gas, producing a nitrogen gas that is discharged from the NOx absorber.

Of the catalytic converters 3, 4, the catalytic converter related to the present invention is the upstream catalytic converter 3, and the downstream catalytic converter 4 may be dispensed with. The internal combustion engine 1 corresponds to an actuator.

The plant control system serves to control an air-fuel ratio of the internal combustion engine 1 (more accurately, the air-fuel ratio of an air-fuel mixture combusted by the internal combustion engine 1) in order to enable the catalytic converter 3 to achieve optimum exhaust gas purifying performance. The plant control system comprises a wide-range air-fuel ratio sensor 5 mounted on the exhaust pipe 2 upstream of the catalytic converter 3, or more precisely at a position where exhaust gases from the cylinders of the internal combustion engine 1 are put together, an $O_2$ sensor (oxygen concentration sensor) 6 mounted on the exhaust pipe 2 downstream of the catalytic converter 3 and upstream of the catalytic converter 4, and a control unit 7 for carrying out a control process (described later on) based on detected output signals from the sensors 5, 6. The control unit 7 is supplied with detected output signals from the sensors 5, 6 and also detected output signals from various other sensors for detecting operating conditions of the internal combustion engine 1, including a engine speed sensor, an intake pressure sensor, a coolant temperature sensor, etc. The wide-range air-fuel ratio sensor 5 and the $O_2$ sensor 6 correspond respectively to a second detecting means and a first detecting means.

The wide-range air-fuel ratio sensor 5 is in the form of an $O_2$ sensor, and outputs a signal having a level depending on the air-fuel ratio of an air-fuel mixture from which an exhaust gas introduced into the catalytic converter 3 is generated by fuel combustion in the internal combustion engine 1. The air-fuel ratio is represented by the oxygen concentration of the exhaust gas introduced into the catalytic converter. The output signal from the wide-range air-fuel ratio sensor 5 (hereinafter referred to as an LAF sensor 5) is processed by a detecting circuit such as a linearizer (not shown) into a signal having an output signal KACT having a level which is proportional to the air-fuel ratio of the air-fuel mixture combusted in the internal combustion engine 1 in a wide range of air-fuel ratios, i.e., an output signal KACT representative of a detected value of the air-fuel ratio. The LAF sensor 5 is disclosed in detail in Japanese laid-open patent publication No. 4-369471, which corresponds to U.S. Pat. No. 5,391,282, and will not be described below.

Figure 2:
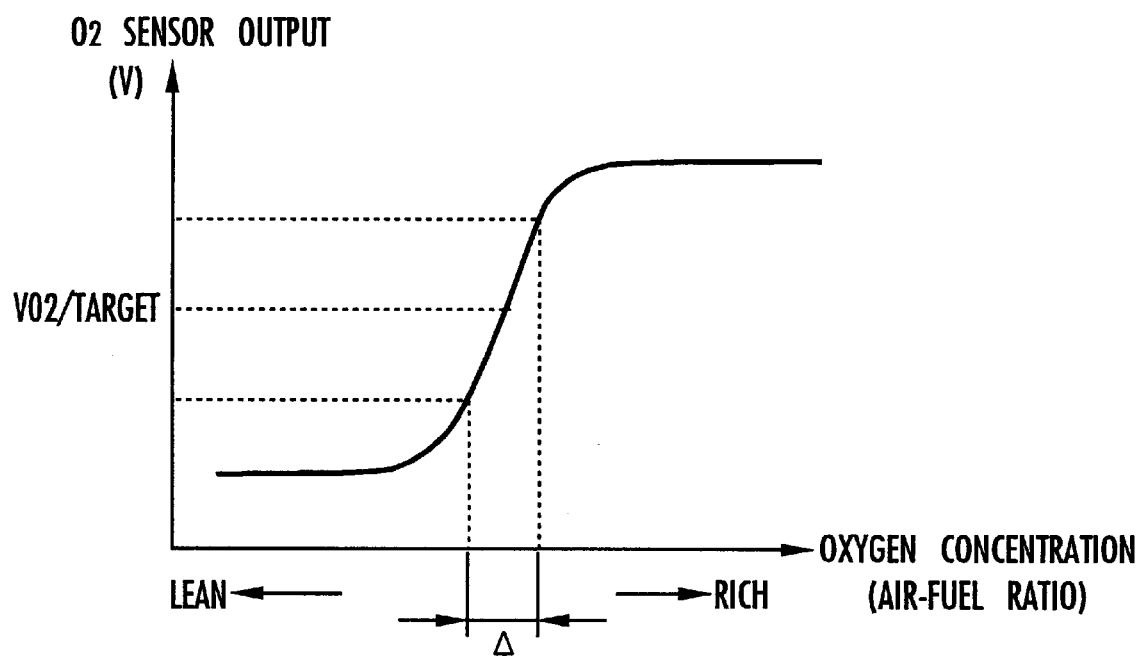
FIG. 2 is a diagram showing output characteristics of an $O_2$ sensor used in the plant control system shown in FIG. 1.

The $O_2$ sensor 6 disposed downstream of the catalytic converter 3 generates an output signal VO2/OUT having a level depending on the oxygen concentration in the exhaust gas that has passed through the catalytic converter 3, i.e., an output signal VO2/OUT representing a detected value of the oxygen concentration in the exhaust gas, as with ordinary $O_2$ sensors. The output signal VO2/OUT from the $O_2$ sensor 6 will change with high sensitivity in substantial proportion to the oxygen concentration in the exhaust gas that has passed through the catalytic converter 3, with the air-fuel ratio recognized by the oxygen concentration in the exhaust gas being in a range $\Delta$ close to a stoichiometric air-fuel ratio, as shown in FIG. 2.

The control unit 7 comprises a microcomputer and is roughly divided into a control unit 7a for performing in predetermined control cycles a process for successively generating a target air-fuel ratio KCMD (which is also a target value for the output KACT of the LAF sensor 5) for the internal combustion engine 1, and a control unit 7b for performing in predetermined control cycles a process for controlling the air-fuel ratio of the internal combustion engine 1 at the target air-fuel ratio KCMD. The control unit 7a will be referred to as an exhaust-side control unit 7a, and the control unit 7b will be referred to as an engine-side control unit 7b.

The engine-side control unit 7b corresponds to an actuator control means.

The target air-fuel ratio KCMD generated by the exhaust-side control unit 7a is basically an air-fuel ratio of the internal combustion engine 1 required to set the output of the $O_2$ sensor 6 (the detected value of the oxygen concentration) at a predetermined target value (constant value). The control cycles of the process performed by the exhaust-side control unit 7a for generating the target air-fuel ratio KCMD are of a constant period (e.g., 30–100 ms) in view of a relatively long dead time of an exhaust system E (described later on) including the catalytic converter 3 and calculating loads.

The process performed by the engine-side control unit 7b for controlling the air-fuel ratio of the internal combustion engine 1, more specifically the process for adjusting the amount of fuel supplied to the internal combustion engine 1, is required to be synchronous with the rotational speed of the internal combustion engine 1. The control cycles of the process performed by the engine-side control unit 7b are of a period in synchronism with a crankshaft angle period (so-called TDC) of the internal combustion engine 1. Output data from various sensors including the LAF sensor 5 and the $O_2$ sensor 6 are also read in synchronism with the crankshaft angle period (TDC) of the internal combustion engine 1.

The constant period of the control cycles of the exhaust-side control unit 7a is longer than the crankshaft angle period (TDC).

The engine-side control unit 7b has, as its main functional components, a basic fuel injection quantity calculator 8 for determining a basic fuel injection quantity Tim to be injected into the internal combustion engine 1, a first correction coefficient calculator 9 for determining a first correction coefficient KTOTAL to correct the basic fuel injection quantity Tim, and a second correction coefficient calculator 10 for determining a second correction coefficient KCMDM to correct the basic fuel injection quantity Tim.

The basic fuel injection quantity calculator 8 determines a reference fuel injection quantity for the internal combustion engine 1 from the rotational speed NE and intake pressure PB of the internal combustion engine 1 using a predetermined map, and corrects the determined reference fuel injection quantity depending on the effective opening area of a throttle valve (not shown) of the internal combustion engine 1, thereby calculating a basic fuel injection quantity Tim.

The first correction coefficient KTOTAL determined by the first correction coefficient calculator 9 serves to correct the basic fuel injection quantity Tim in view of an exhaust gas recirculation ratio of the internal combustion engine 1, i.e., the proportion of an exhaust gas contained in an air-fuel mixture introduced into the internal combustion engine 1, an amount of purged fuel supplied to the internal combustion engine 1 when a canister (not shown) is purged, a coolant temperature, an intake temperature, etc. of the internal combustion engine 1.

The second correction coefficient KCMDM determined by the second correction coefficient calculator 10 serves to correct the basic fuel injection quantity Tim in view of the charging efficiency of an air-fuel mixture due to the cooling effect of fuel flowing into the internal combustion engine 1 depending on a target air-fuel ratio KCMD determined by the exhaust-side control unit 7a (described later on).

The control unit 7 corrects the basic fuel injection quantity Tim with the first correction coefficient KTOTAL and the second correction coefficient KCMDM by multiplying the basic fuel injection quantity Tim by the first correction coefficient KTOTAL and the second correction coefficient KCMDM, thus producing a demand fuel injection quantity Tcyl for the internal combustion engine 1.

Specific details of processes for calculating the basic fuel injection quantity Tim, the first correction coefficient KTOTAL, and the second correction coefficient KCMDM are disclosed in detail in Japanese laid-open patent publication No. 5-79374 and U.S. Pat. No. 5,253,630, and will not be described below.

The engine-side control unit 7b also has, in addition to the above functional components, a feedback controller 14 for adjusting a fuel injection quantity of the internal combustion engine 1 according to a feedback control process so as to converge the output signal KACT of the LAF sensor 5 (the detected air-fuel ratio) to the target air-fuel ratio KCMD which is sequentially determined by the exhaust control unit 7a.

The feedback controller 14 comprises a general feedback controller 15 for feedback-controlling a total air-fuel ratio for all the cylinders of the internal combustion engine 1 and a local feedback controller 16 for feedback-controlling an air-fuel ratio for each of the cylinders of the internal combustion engine 1.

The general feedback controller 15 sequentially determines a feedback correction coefficient KFB to correct the demand fuel injection quantity Tcyl (by multiplying the demand fuel injection quantity Tcyl) so as to converge the output signal KACT from the LAF sensor 5 to the target air-fuel ratio KCMD.

The general feedback controller 15 comprises a PID controller 17 for determining a feedback manipulated variable KLAF as the feedback correction coefficient KFB depending on the difference between the output signal KACT from the LAF sensor 5 and the target air-fuel ratio KCMD according to a known PID control process, and an adaptive controller 18 (indicated by "STR" in FIG. 1) for adaptively determining a feedback manipulated variable KSTR for determining the feedback correction coefficient KFB in view of changes in operating conditions of the internal combustion engine 1 or characteristic changes thereof from the output signal KACT from the LAF sensor 5 and the target air-fuel ratio KCMD.

In present embodiment, the feedback manipulated variable KLAF generated by the PID controller 17 is of "1" and can be used directly as the feedback correction coefficient KFB when the output signal KACT (the detected air-fuel ratio) from the LAF sensor 5 is equal to the target air-fuel ratio KCMD. The feedback manipulated variable KSTR generated by the adaptive controller 18 becomes the target air-fuel ratio KCMD when the output signal KACT from the LAF sensor 5 is equal to the target air-fuel ratio KCMD. A feedback manipulated variable kstr (=KSTR/KCMD) which is produced by dividing the feedback manipulated variable KSTR by the target air-fuel ratio KCMD with a divider 19 can be used as the feedback correction coefficient KFB.

The feedback manipulated variable KLAF generated by the PID controller 17 and the feedback manipulated variable kstr which is produced by dividing the feedback manipulated variable KSTR from the adaptive controller 18 by the target air-fuel ratio KCMD are selected one at a time by a switcher 20. A selected one of the feedback manipulated variable KLAF and the feedback manipulated variable KSTR is used as the feedback correction coefficient KFB. The demand fuel injection quantity Tcyl is corrected by being multiplied by the feedback correction coefficient KFB. Details of the general feedback controller 15 (particularly, the adaptive controller 18) will be described later on.

The local feedback controller 16 comprises an observer 21 for estimating real air-fuel ratios #nA/F (n=1, 2, 3, 4) of the respective cylinders from the output signal KACT from the LAF sensor 5, and a plurality of PID controllers 22 (as many as the number of the cylinders) for determining respective feedback correction coefficients #nKLAF for fuel injection quantities for the cylinders from the respective real air-fuel ratios #nA/F estimated by the observer 21 according to a PID control process so as to eliminate variations of the air-fuel ratios of the cylinders.

Briefly stated, the observer 21 estimates a real air-fuel ratio #nA/F of each of the cylinders as follows: A system from the internal combustion engine 1 to the LAF sensor 5 (where the exhaust gases from the cylinders are combined) is considered to be a system for generating an air-fuel ratio detected by the LAF sensor 5 from a real air-fuel ratio #nA/F of each of the cylinders, and is modeled in view of a detection response delay (e.g., a time lag of first order) of the LAF sensor 5 and a chronological contribution of the air-fuel ratio of each of the cylinders to the air-fuel ratio detected by the LAF sensor 5. Based on the modeled system, a real air-fuel ratio #nA/F of each of the cylinders is estimated from the output signal KACT from the LAF sensor 5.

Details of the observer 21 are disclosed in Japanese laid-open patent publication No. 7-83094 and U.S. Pat. No. 5,531,208, for example, and will not be described below.

Each of the PID controllers 22 of the local feedback controller 16 divides the output signal KACT from the LAF sensor 5 by an average value of the feedback correction coefficients #nKLAF determined for all the cylinders by the respective PID controllers 22 in a preceding control cycle to produce a quotient value, and uses the quotient value as a target air-fuel ratio for the corresponding cylinder. Each of the PID controllers 22 then determines a feedback correction coefficient #nKLAF for each cylinder in a present control cycle so as to eliminate any difference between the target air-fuel ratio and the corresponding real air-fuel ratio #nA/F determined by the observer 21.

The local feedback controller 16 multiplies a value, which has been produced by multiplying the demand fuel injection quantity Tcyl by the selected feedback correction coefficient KFB produced by the general feedback controller 15, by the feedback correction coefficient #nKLAF for each of the cylinders, thereby determining an output fuel injection quantity #nTout (n=1, 2, 3, 4) for each of the cylinders.

The output fuel injection quantity #nTout thus determined for each of the cylinders is corrected for accumulated fuel particles on intake pipe walls of the internal combustion engine 1 by a corresponding fuel accumulation corrector 23 in the engine-side control unit 7b. The corrected output fuel injection quantity #nTout is applied to each of fuel injectors (not shown) of the internal combustion engine 1, which injects fuel into each of the cylinders with the corrected output fuel injection quantity #nTout.

The correction of the output fuel injection quantity in view of accumulated fuel particles on intake pipe walls is disclosed in detail in Japanese laid-open patent publication No. 8-21273 and U.S. Pat. No. 5,568,799, for example, and will not be described in detail below.

A sensor output selector 24 shown in FIG. 1 serves to select the output signal KACT from the LAF sensor 5, which is suitable for the estimation of a real air-fuel ratio #nA/F of each cylinder with the observer 21, depending on the operating conditions of the internal combustion engine 1. Details of the sensor output selector 24 are disclosed in detail in Japanese laid-open patent publication No. 7-259588 and U.S. Pat. No. 5,540,209, and will not be described in detail below.

The exhaust-side control unit 7a has, as its main functional component, a target air-fuel ratio generator 28 for sequentially generating the target air-fuel ratio KCMD in control cycles of the engine-side control unit 7b using the data of the output signal KACT of the LAF sensor 5 which is given via the engine-side control unit 7a and the data of the output signal VO2/OUT of the $O_2$ sensor 6.

Figure 3:
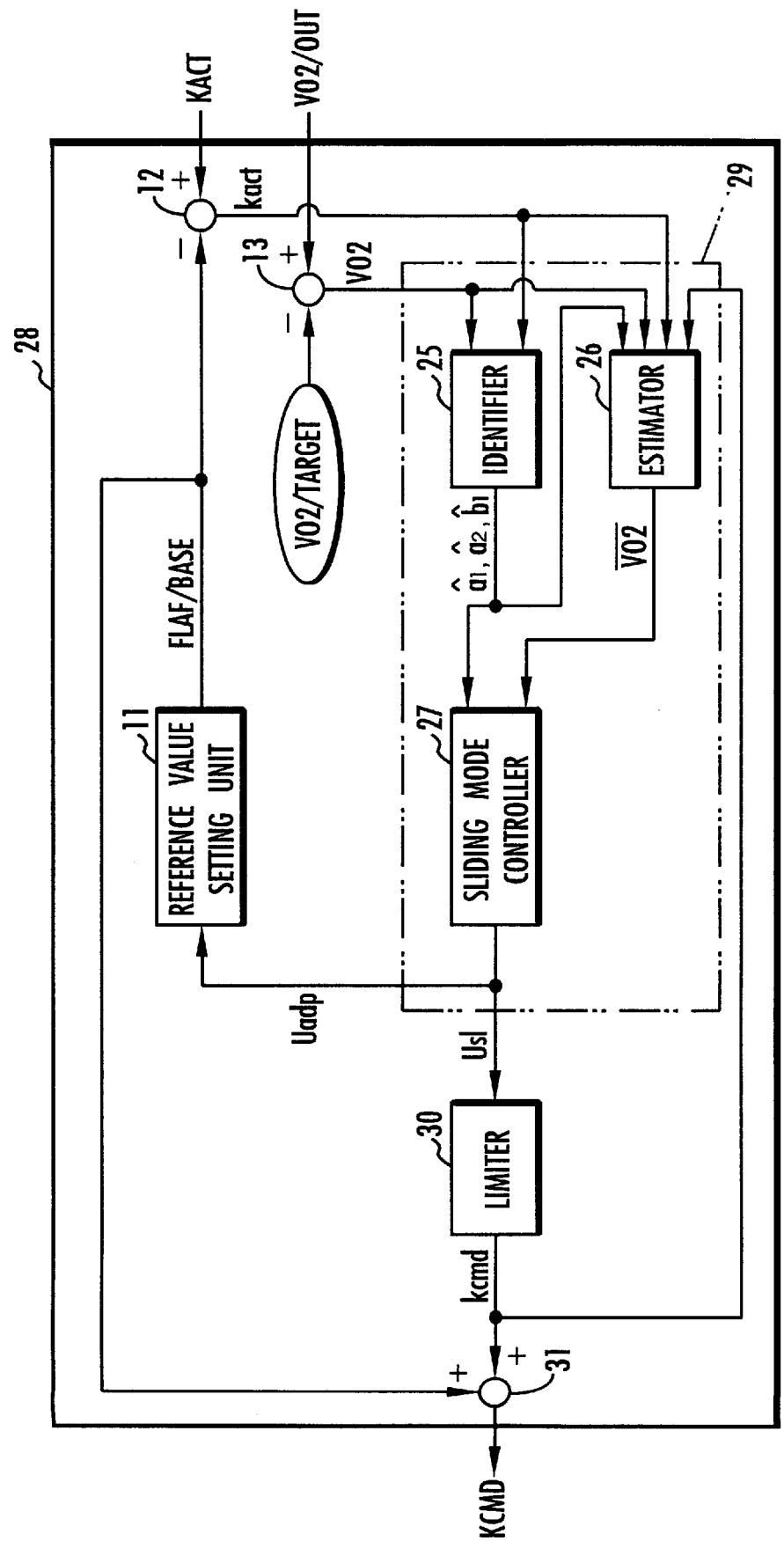
FIG. 3 is a block diagram showing a basic arrangement of a target air-fuel ratio generator in the plant control system shown in FIG. 1.

As shown in FIG. 3, the target air-fuel ratio generator 28 comprises a reference value setting unit 11 (reference value variable setting means) for sequentially variably setting a reference value FLAF/BASE with respect to the air-fuel ratio of the internal combustion engine 1 (hereinafter referred to as an "air-fuel ratio reference value FLAF/BASE", which is also a reference value with respect to the output signal KACT of the LAF sensor 5), a subtractor 12 for determining a difference kact (=KACT−FLAF/BASE) between the output signal KACT from the LAF sensor 5 and the air-fuel ratio reference value FLAF/BASE, and a subtractor 13 for determining a difference VO2 (=VO2/OUT−VO2/TARGET) between the output signal VO2/OUT from the $O_2$ sensor 6 and a target value VO2/TARGET therefor. The target value VO2/TARGET for the output signal VO2/OUT from the $O_2$ sensor 6 is established as a constant value (fixed value) since in the present embodiment, optimum exhaust gas purifying performance of the catalytic converter 3 can be achieved with the output signal VO2/OUT from the $O_2$ sensor 6 being set at a certain constant value (see FIG. 2).

The differences kact, VO2 determined respectively by the subtractors 12, 13 are referred to as a differential output kact of the LAF sensor 5 and a differential output VO2 of the $O_2$ sensor 6, respectively.

The target air-fuel ratio generator 28 also has a manipulated variable generator 29 for sequentially generating a manipulated variable usl for controlling the air-fuel ratio of the internal combustion engine 1 in order to converge the output signal VO2/OUT from the $O_2$ sensor 6 to the target value VO2/TARGET, i.e., to converge the differential output VO2 to "0", using the data of the differential output kact of the LAF sensor 5 and the differential output VO2 of the $O_2$ sensor 6, a limiter 30 for generating a manipulated variable kcmd by limiting the manipulated variable usl to a value within a predetermined allowable range, and an adder 31 for adding the air-fuel ratio reference value FLAF/BASE established by the reference value setting unit 11 to the manipulated variable kcmd generated by the limiter 30.

The manipulated variable generator 29 corresponds to a manipulated variable generating means.

The manipulated variable usl generated by the manipulated variable generator 29 as described later on represents the difference between the actual air-fuel ratio (detected by the LAF sensor 5) of the internal combustion engine 1 required to converge the output signal VO2/OUT from the $O_2$ sensor 6 to the target value VO2/TARGET, and the air-fuel ratio reference value FLAF/BASE. Therefore, basically, in order to converge the output signal VO2/OUT from the $O_2$ sensor 6 to the target value VO2/TARGET, the sum of the manipulated variable usl (hereinafter referred to as a "demand differential air-fuel ratio usl") and the air-fuel ratio reference value FLAF/BASE may be generated as the target air-fuel ratio KCMD.

The demand differential air-fuel ratio usl generated by the manipulated variable generator 29 may occasionally suffer relatively large changes due to disturbances. When the actual air-fuel ratio (detected by the LAF sensor 5) of the internal combustion engine 1 is controlled at the target air-fuel ratio (=usl+FLAF/BASE) determined depending on the demand differential air-fuel ratio usl, the internal combustion engine 1 may possibly operate unstably.

In order to avoid the above drawback, the limiter 30 in the target air-fuel ratio generator 28 limits the demand differential air-fuel ratio usl to generate the manipulated variable kcmd whose value is limited within the allowable range.

The limiter 30 limits the demand differential air-fuel ratio usl as follows: When the value of the demand differential air-fuel ratio usl is in the allowable range (a normal state), the limiter 30 sets up the demand differential air-fuel ratio usl as the manipulated variable kcmd. When the value of the demand differential air-fuel ratio usl deviates from the allowable range beyond its upper limit value or lower limit value, the limiter 30 forcibly sets the demand differential air-fuel ratio usl to the upper limit value or lower limit value of the allowable range.

The adder 31 in the target air-fuel ratio generator 28 adds the air-fuel ratio reference value FLAF/BASE to the manipulated variable kcmd (hereinafter referred to as a "command differential air-fuel ratio kcmd") produced by limiting the demand differential air-fuel ratio usl, generating the target air-fuel ratio KCMD, i.e., the target air-fuel ratio KCMD (=kcmd+FLAF/BASE) to be given as a command value for the air-fuel ratio of the internal combustion engine 1 to the engine-side control unit 7b.

The manipulated variable generator 29 will further be described below. The manipulated variable generator 29 sequentially determines the demand differential air-fuel ratio usl in control cycles of the exhaust-side control unit 7a as a control input go be given to an exhaust system E (hereinafter referred to as an "object exhaust system E"), which extends from the position of the LAF sensor 5 in the exhaust pipe 2 (upstream of the catalytic converter 3) to the position of the $O_2$ sensor 6 (downstream of the catalytic converter 3) and which includes the catalytic converter 3, in order to converge the output signal VO2/OUT of the $O_2$ sensor 6 to the target value VO2/TARGET therefor, i.e., to converge the differential output VO2 of the O₂ sensor 6 to "0", according to a sliding mode control process, which is a type of feedback control process, in view of a dead time present in the object exhaust system E, dead times present in the internal combustion engine 1 and the engine control unit 7b, and behavioral changes of the object exhaust system E.

The object exhaust system E corresponds to a plant.

For generating the demand differential air-fuel ratio usl, the object exhaust system E is regarded as a system for generating the differential output VO2 of the O₂ sensor 6 with a dead time and a response delay from the differential output kact of the LAF sensor 5 which corresponds to the difference between the actual air-fuel ratio of the air-fuel mixture, i.e., the air-fuel mixture from which the exhaust gas entering the catalytic converter 3 is generated upon combustion, and the air-fuel ratio reference value FLAF/BASE, and the behavior of the system is modeled in advance. In addition, the system comprising the internal combustion engine 1 and the engine-side control unit 7b is regarded as a system (hereinafter referred to as an "air-fuel ratio manipulating system") for generating the differential output kact of the LAF sensor 5 with a dead time from the command differential air-fuel ratio kcmd (which usually agrees with the demand differential air-fuel ratio usl) that represents the difference (=KCMD−FLAF/BASE) between the target air-fuel ratio KCMD and the air-fuel ratio reference value FLAF/BASE, i.e., a system in which the differential output kact of the LAF sensor 5 at each point of time agrees with the command differential air-fuel ratio kcmd prior to the dead time of the air-fuel ratio manipulating system, and the behavior of the system is modeled in advance.

The model representing the behavior of the object exhaust system E (hereinafter referred to as an "exhaust system model") is expressed as a model of a discrete-time system (more specifically, an autoregressive model having a dead time in the differential output kact as an input to the object exhaust system E) according to the following equation (1):

$$VO2(k+1) = a1 \cdot VO2(k) + a2 \cdot VO2(k-1) + b1 \cdot kact(k-d1) \quad (1)$$

where "k" represents the number of a discrete-time control cycle of the exhaust-side control unit 7a, and "d1" the dead time present in the object exhaust system E as expressed in terms of the number of control cycles. The dead time of the object exhaust system E (the time required until the air-fuel ratio detected by the LAF sensor 5 at each point of time is reflected in the output signal VO2/OUT from the O₂ sensor 6) is generally equal to the time of 3–10 control cycles (d1=3–10) if the period (constant) of control cycles of the exhaust-side control unit 7a ranges from 30 to 100 ms. In present embodiment, a preset constant value (e.g., d1=7 in the present embodiment) equal to or slightly longer than the actual dead time of the object exhaust system E is used as the dead time d1 in the exhaust system model as represented by the equation (1).

The first and second terms of the right side of the equation (1) correspond to a response delay of the object exhaust system E, the first term being a primary autoregressive term and the second term being a secondary autoregressive term. In the first and second terms, "a1", "a2" represent respective gain coefficients of the primary autoregressive term and the secondary autoregressive term. Stated otherwise, these gain coefficients "a1", "a2" are coefficients relative to the differential output VO2 of the O₂ sensor 6 in the exhaust system model.

The third term of the right side of the equation (1) represents the differential output kact of the LAF sensor 5 as an input to the object exhaust system E, including the dead time d1 of the object exhaust system E. In the third term, "b1" represents a gain coefficient relative to its input (=the differential output kact of the LAF sensor 5). The gain coefficients "a1", "a2", "b1" are parameters which are to be set (identified) to values in defining the behavior of the exhaust system model, and are sequentially identified by an identifier which will be described later on.

In the exhaust system model expressed as the discrete time system according to the equation (1), the differential output VO2(k+1) of the O₂ sensor 6 as an output of the object exhaust system E in each control cycle of the exhaust-side control unit 7a is expressed by a plurality of (two in this embodiment) differential outputs VO2(k), VO(k−1) and a differential output kact(k−d1) of the LAF sensor 5 in past control cycles prior to the control cycle.

The model of the air-fuel ratio manipulating system comprising the internal combustion engine 1 and the engine-side control unit 7b (hereinafter referred to as an "air-fuel ratio manipulating system model) is expressed as a discrete-time system model according to the following equation (2):

$$kact(k) = kcmd(k-d2) \quad (2)$$

where "d2" represents the dead time (second dead time) of the air-fuel ratio manipulating system in terms of the number of control cycles of the exhaust-side control unit 7a. The dead time of the air-fuel ratio manipulating system (the time required until the target air-fuel ratio KCMD or the command differential air-fuel ratio kcmd at each point of time is reflected in the output signal KACT or the differential output kact of the LAF sensor 5) varies with the rotational speed of the internal combustion engine 1, and is longer as the rotational speed of the internal combustion engine 1 is lower. In present embodiment, in view of the above characteristics of the dead time of the air-fuel ratio manipulating system expressed by the equation (2), a preset constant value (d2=3 in the present embodiment) which is equal to or slightly longer than the dead time of the actual air-fuel ratio manipulating system at an idling rotational speed of the internal combustion engine 1 (the dead time is a maximum dead time which can be taken by the air-fuel ratio manipulating system at an arbitrary rotational speed of the internal combustion engine 1) is used as the value of the dead time d2 in the air-fuel ratio manipulating system model expressed by the equation (2).

In the air-fuel ratio manipulating system model expressed by the equation (2), the differential output kact(k) of the LAF sensor 5 in each control cycle of the exhaust-side control unit 5a is assumed to agree with the command differential air-fuel ratio kcmd(k−d2) prior to the dead time d2 of the air-fuel ratio manipulating system, and is expressed by the command differential air-fuel ratio kcmd(k−d2).

The air-fuel ratio manipulating system actually includes a response delay of the internal combustion engine 1 in addition to the dead time. Since a response delay of the output KACT or the differential output kact of the LAF sensor 5 with respect to the target air-fuel ratio KCMD or the command differential air-fuel ratio kcmd is basically compensated for by the feedback controller 14 (particularly the adaptive controller 18) in the engine-side control unit 7b, there will arise no problem if the response delay of the internal combustion engine 1 is not taken into account in the air-fuel ratio manipulating system as viewed from the manipulated variable generator 29 in the exhaust-side control unit 7a.

The manipulated variable generator 29 carries out the process constructed on the basis of the exhaust system model and the air-fuel ratio manipulating system model expressed by the respective equations (1), (2) in the control cycles of the exhaust-side control unit 7a, to sequentially generate the demand manipulated quantity usl as an input to be given to the object exhaust system E for converging the output VO2/OUT of the O₂ sensor 6 to its target value VO2/TARGET. In order to generate the demand manipulated quantity usl, the manipulated variable generator 29 has its functional components as shown in FIG. 3.

Specifically, the manipulated variable generator 29 comprises an identifier 25 for sequentially identifying in each control cycle values of the gain coefficients a1, a2, b1 that are parameters to be established for the exhaust system model (the equation (1)), using the data of the differential output kact from the LAF sensor 5 and the differential output VO2 from the O₂ sensor 6, an estimator 26 for sequentially estimating in each control cycle an estimated value VO2 bar of the differential output VO2 from the O₂ sensor 6 (hereinafter referred to as an "estimated differential output VO2 bar") after the total dead time d (=d1+d2) which is the sum of the dead time d1 of the object exhaust system E and the dead time d2 of the air-fuel ratio manipulating system, using the data of the differential output kact from the LAF sensor 5, the data of the differential output VO2 from the O₂ sensor 6, the data of the command differential air-fuel ratio kcmd (normally, kcmd=usl) produced when the demand differential air-fuel ratio usl determined in the past by a sliding mode controller 27 is limited by the limiter 30, identified values a1 hat, a2 hat, b1 hat of the gain coefficients a1, a2, b1 that are calculated by the identifier 25 (hereinafter referred to as "identified gain coefficients a1 hat, a2 hat, b1 hat"), and a sliding mode controller 27 for sequentially determining in each control cycle the demand differential air-fuel ratio usl, using the data of the estimated differential output VO2 bar from the O₂ sensor 6 which has been determined by the estimator 26 and the identified gain coefficients a1 hat, a2 hat, b1 hat, according to an adaptive slide mode control process.

The identifier 25 corresponds to an identifying means.

The algorithm of a processing operation to be carried out by the identifier 25, the estimator 26, and the sliding mode controller 27 is constructed as follows:

The identifier 25 serves to identify the gain coefficients a1, a2, b1 sequentially on a real-time basis for the purpose of minimizing a modeling error of the actual object exhaust system E of the exhaust system model expressed by the equation (1). The identifier 25 carries out its identifying process as follows:

In each control cycle of the exhaust-side control unit 7a, the identifier 25 determines an identified value VO2(k) hat of the differential output VO2 from the O₂ sensor 6 (hereinafter referred to as an "identified differential output VO2 hat") on the exhaust system model, using the identified gain coefficients a1 hat, a2 hat, b1 hat of the presently established exhaust system model, i.e., identified gain coefficients a1 hat (k−1), a2 hat (k−1), b1 hat (k−1) determined in a preceding control cycle, and past data of the differential output kact from the LAF sensor 5 and the differential output VO2 from the O₂ sensor 6, according to the following equation (3):

$$\hat{VO2}(k) = \hat{a}1(k-1) \cdot VO2(k-1) + \hat{a}2(k-1) \cdot VO2(k-2) + \hat{b}1(k-1) \cdot kact(k-d1-1) \quad (3)$$

The equation (3) corresponds to the equation (1) which is shifted into the past by one control cycle with the gain coefficients a1, a2, b1 being replaced with the respective identified gain coefficients a1 hat (k−1), a2 hat (k−1), b1 hat (k−1). The value of the dead time "d1" of the object exhaust system E in the third term of the equation (3) represents a preset constant value (d1=7 in this embodiment) as described above.

If vectors $\Theta$, $\zeta$ defined by the following equations (4), (5) are introduced (the letter T in the equations (4), (5) and other equations represents a transposition), then the equation (3) is expressed by the equation (6):

$$\Theta^T(k) = [\hat{a}1(k)\,\hat{a}2(k)\,\hat{b}1(k)] \quad (4)$$

$$\zeta^T(k) = [VO2(k-1)\,VO2(k-2)\,kact(k-d1-1)] \quad (5)$$

$$\hat{VO2}(k) = \Theta^T(k-1) \cdot \zeta(k) \quad (6)$$

The identifier 25 also determines a difference id/e between the identified differential output VO2 hat from the O₂ sensor 6 which is determined by the equation (3) or (6) and the present differential output VO2 from the O₂ sensor 6, as representing a modeling error of the exhaust system model with respect to the actual object exhaust system E (hereinafter the difference id/e will be referred to as an "identified error id/e"), according to the following equation (7):

$$id/e(k) = VO2(k) - \hat{VO2}(k) \quad (7)$$

The identifier 25 further determines new identified gain coefficients a1(k) hat, a2(k) hat, b1(k) hat, stated otherwise, a new vector $\Theta(k)$ having these identified gain coefficients as elements (hereinafter the new vector $\Theta(k)$ will be referred to as an "identified gain coefficient vector $\Theta$"), in order to minimize the identified error id/e, according to the equation (8) given below. That is, the identifier 25 varies the identified gain coefficients a1 hat (k−1), a2 hat (k−1), b1 hat (k−1) determined in the preceding control cycle by a quantity proportional to the identified error id/e for thereby determining the new identified gain coefficients a1(k) hat, a2(k) hat, b1(k) hat.

$$\Theta(k) = \Theta(k-1) + K\theta(k) \cdot id/e(k) \quad (8)$$

where $K\theta$ represents a cubic vector determined by the following equation (9), i.e., a gain coefficient vector for determining a change depending on the identified error id/e of the identified gain coefficients a1 hat, a2 hat, b1 hat:

$$K\theta(k) = \frac{P(k-1)\xi(k)}{1 + \xi^T(k)P(k-1)\xi(k)} \quad (9)$$

where P represents a cubic square matrix determined by a recursive formula expressed by the following equation (10):

$$P(k) = \frac{1}{\lambda_1(k)}\left[I - \frac{\lambda_2(k)P(k-1)\xi(k)\xi^T(k)}{\lambda_1(k) + \lambda_2(k)\xi^T(k)P(k-1)\xi(k)}\right]P(k-1) \quad (10)$$

where I represents a unit matrix.

In the equation (10) $\lambda_1$, $\lambda_2$ are established to satisfy the conditions $0 < \lambda_1 \leq 1$ and $0 \leq \lambda_2 < 2$, and an initial value P(0) of P represents a diagonal matrix whose diagonal components are positive numbers.

Depending on how $\lambda_1$, $\lambda_2$ in the equation (10) are established, any one of various specific algorithms including a fixed gain method, a degressive gain method, a method of weighted least squares, a method of least squares, a fixed tracing method, etc. may be employed. According to present embodiment, a method of least squares ($\lambda_1 = \lambda_2 = 1$), for example, is employed.

Basically, the identifier 25 sequentially determines in each control cycle the identified gain coefficients a1 hat, a2 hat, b1 hat of the exhaust system model in order to minimize the identified error id/e according to the above algorithm (calculating operation). Through this operation, it is possible to sequentially obtain the identified gain coefficients a1 hat, a2 hat, b1 hat which match the actual object exhaust system E.

The calculating operation described above is the basic processing that is carried out by the identifier 25. In present embodiment, the identifier 25 performs additional processes such as a limiting process, on the identified gain coefficients a1 hat, a2 hat, b1 hat in order to determine them. Such operations of the identifier 25 will be described later on.

The estimator 26 sequentially determines in each control cycle the estimated differential output VO2 bar which is an estimated value of the differential output VO2 from the $O_2$ sensor 6 after the total dead time d (=d1+d2) in order to compensate for the effect of the dead time d1 of the object exhaust system E and the effect of the dead time d2 of the air-fuel ratio manipulating system for the calculation of the demand differential air-fuel ratio usl with the sliding mode controller 27 as described in detail later on. Since details of the estimator 26 are disclosed in U.S. patent application Ser. No. 09/311353, the estimator 26 will briefly be described below.

If the equation (2) expressing the model of the air-fuel ratio manipulating system is applied to the equation (1) expressing the exhaust system model, then the equation (1) can be rewritten as the following equation (11):

$$VO2(k+2) = a1 \cdot VO2(k) + a2 \cdot VO2(k-1) + b1 \cdot kcmd(k-d1-d2) = a1 \cdot VO2(k) + a2 \cdot VO2(k-1) + b1 \cdot kcmd(k-d) \quad (11)$$

The equation (11) expresses a system which is a combination of the object exhaust system E and the air-fuel ratio manipulating system as the model of a discrete time system, regarding such a system as a system for generating the differential output VO2 of the $O_2$ sensor 6 from the command differential air-fuel ratio kcmd with dead times of the object exhaust system E and the air-fuel ratio manipulating system and a response delay of the object exhaust system E.

Using the equation (11), the estimated differential output VO2(k+d) bar which is an estimated value of the differential output VO2 of the $O_2$ sensor 6 after the total dead time d in each control cycle is expressed using present and past time-series data VO2(k), VO2(k-1) of the differential output VO2 of the $O_2$ sensor 6 and past time-series data kcmd(k-j) (j=1, 2, . . . , d) of the command differential air-fuel ratio kcmd (=KCMD-FLAF/BASE), according to the following equation (12):

$$\overline{VO2}(k+d) = \alpha 1 \cdot VO2(k) + \alpha 2 \cdot VO2(k-1) + \sum_{j=1}^{d} \beta_j \cdot kcmd(k-j) \quad (12)$$

where $\alpha 1$ = the first-row, first-column element of $A^d$,
$\alpha 2$ = the first-row, second-column element of $A^d$,
$\beta j$ = the first-row elements of $A^{j-1} \cdot B$ $$A = \begin{bmatrix} a1 & a2 \\ 1 & 0 \end{bmatrix}$$

-continued $$B = \begin{bmatrix} b1 \\ 0 \end{bmatrix}$$

In the equation (12), $\alpha 1$, $\alpha 2$ represent the first-row, first-column element and the first-row, second-column element of the dth power $A^d$ (d: total dead time) of the matrix A defined as described above, and $\beta j$ represents the first-row elements of the product $A^{j-1} \cdot B$ of the (j-1)th power $A^{j-1}$ (j=1, 2, . . . , d) of the matrix A and the vector B defined as described above.

Of the past time-series data kcmd(k-j) (j=1, 2, . . . , d) of the command differential air-fuel ratio kcmd in the equation (12), the past time-series data kcmd(k-d2), kcmd(k-d2-1), . . . , kcmd(k-d) of the command differential air-fuel ratio kcmd before the dead time d2 of the air-fuel ratio manipulating system from the present time can be replaced with data kact(k), kact(k-1), . . . , kact(k-d+2), respectively, prior to the present time, of the differential output kact of the LAF sensor 5. The replacement of the data results in the following equation (13):

$$\overline{VO2}(k+d) = \alpha 1 \cdot VO2(k) + \alpha 2 \cdot VO2(k-1) + \quad (13)$$

$$\sum_{j=1}^{d_2-1} \beta_j \cdot kcmd(k-j) + \sum_{i=0}^{d-d_2} \beta_{i+d2} \cdot kact(k-i)$$

$$= \alpha 1 \cdot VO2(k) + \alpha 2 \cdot VO2(k-1) +$$

$$\sum_{j=1}^{d_2-1} \beta_j \cdot kcmd(k-j) + \sum_{i=0}^{d_1} \beta_{i+d2} \cdot kact(k-i)$$

The above equation (13) is a basic equation for the estimator 26 to calculate the estimated differential output VO2(k+d) bar in this embodiment. Stated otherwise, the estimator 26 determines the estimated differential output VO2 bar of the $O_2$ sensor 6 according to the equation (13), using the present and past time-series data VO2(k), VO2(k-1) of the differential output VO2 of the $O_2$ sensor 6, the past data kcmd(k-j) (j=1, . . . , d2-1) of the command differential air-fuel ratio kcmd which is produced by limiting the demand differential air-fuel ratio usl generated by the sliding mode controller 27, and the present and past time-series data kact(k-i) (i=0, . . . , d1) of the differential output kact of the LAF sensor 5.

In this embodiment, the values of the coefficients $\alpha 1$, $\alpha 2$, $\beta j$ required to calculate the estimated differential output VO2(k+d) bar according to the equation (13) are basically calculated using the identified gain coefficients a1 hat, a2 hat, b1 hat which are identified values of the gain coefficients a1, a2, b1 (these are elements of the matrix A and the vector B defined above with respect to the equation (12)). For the values of the dead times d1, d2 required for the calculation of the equation (13), the preset values described above are used.

The estimated differential output VO2(k+d) bar may be determined according to the equation (12) without using the data of the differential output kact of the LAF sensor 5. In such a case, the estimated differential output VO2(k+d) bar is determined using the present and past time-series data VO2(k), VO2(k-1) of the differential output VO2 of the $O_2$ sensor 6, the past time-series data kcmd(k-j) (j=1, 2, . . . , d) of the command differential air-fuel ratio kcmd, and values of the coefficients $\alpha 1$, $\alpha 2$, $\beta j$ (j=1, 2, . . . , d) determined by the identified gain coefficients a1 hat, a2 hat, b1 hat. For increasing the reliability of the estimated differential output VO2(k+d) bar, it is preferable to calculate the estimated differential output VO2(k+d) bar according to the equation (13) using the data of the differential output kact of the LAF sensor 5 which reflects the actual behavior of the internal combustion engine 1.

If the dead time d2 of the air-fuel ratio manipulating system may be set to d2=1, then all the past time-series data kcmd(k−j) (j=1, 2, . . . , d) of the command differential air-fuel ratio kcmd in the equation (12) may be replaced with the time-series data kact(k), kact(k−1), . . . , kact(k−d+d2), prior to the present time, of the LAF sensor 5. In this case, the estimated differential output VO2(k+d) bar can be determined according to the following equation (14) which includes no data of the command differential air-fuel ratio kcmd:

$$\overline{VO2}(k+d) = \alpha 1 \cdot VO2(k) + \alpha 2 \cdot VO2(k-1) + \sum_{j=0}^{d-1} \beta_{j+1} \cdot kact(k-j) \quad (14)$$

In the present embodiment, the estimator 26 determines in each control cycle the estimated differential output VO2 bar of the O$_2$ sensor according to the equation (13) which differs from the equation (12) in that all, prior to the dead time d2 of the air-fuel ratio manipulating system, of the time-series data of the target differential air-fuel ratio kcmd in the equation (12) are replaced with the differential output kact of the LAF sensor 5. However, the estimated differential output VO2 bar may be determined according to an equation which differs from the equation (12) in that only part of the time-series data of the target differential air-fuel ratio kcmd prior to the dead time d2 in the equation (12) is replaced with the differential output kact of the LAF sensor 5.

The above calculating process is the basic algorithm for the estimator 26 to determine the estimated differential output VO2(k+d) bar which is an estimated value after the total dead time d of the differential output VO2 of the O$_2$ sensor in each control cycle.

The sliding mode controller 27 will be described in detail below. Since details of the sliding mode controller 27 are disclosed in U.S. patent application Ser. No. 09/311353, the sliding mode controller 27 will briefly be described below.

The sliding mode controller 27 sequentially determines the demand differential air-fuel ratio usl as a manipulated variable for manipulating the air-fuel ratio of the internal combustion engine 1 in order to converge the output signal VO2/OUT from the O$_2$ sensor 6 to the target value VO2/TARGET, i.e., to converge the differential output VO2 of the O$_2$ sensor 6 to "0", according to an adaptive sliding mode control process which incorporates an adaptive control law for minimizing the effect of a disturbance, in the normal sliding mode control process. An algorithm for carrying out the adaptive sliding mode control process is constructed as follows:

A switching function required for the adaptive sliding mode control process of the sliding mode controller 27 and a hyperplane defined by the switching function (also referred to as a slip plane) will first be described below.

According to a basic concept of the sliding mode control process in the present embodiment, the differential output VO2(k) from the O$_2$ sensor 6 in each control cycle and the differential output VO2(k−1) in each preceding control cycle are used, and a switching function σ for the sliding mode control process is established according to the following equation (15). The switching function σ is defined by a linear function having as components the present and past time-series data VO2(k), VO2(k−1) of the differential output VO2 of the O$_2$ sensor 6. The vector X defined according to the equation (15) as a vector having the differential outputs VO2(k), VO2(k−1) as its components will hereinafter be referred to as a state quantity X.

$$\sigma(k) = s1 \cdot VO2(k) + s2 \cdot VO2(k-1) \quad (15)$$
$$= S \cdot X$$

$$\left( S = [s1 \; s2], \; X = \begin{bmatrix} VO2(k) \\ VO2(k-1) \end{bmatrix} \right)$$

The coefficients s1, s2 relative to the components VO2(k), VO2(k−1) of the switching function σ are established to meet the condition of the following equation (16):

$$-1 < \frac{s2}{s1} < 1 \quad (16)$$

(when $s1 = 1, -1 < s2 < 1$)

In the present embodiment, for the sake of brevity, the coefficient s1 is set to s1=1 (s2/s1=s2), and the coefficient s2 is established to satisfy the condition: −1<s2<1.

With the switching function σ thus defined, the hyperplane for the sliding mode control process is defined by the equation σ=0. Since the state quantity X is of the second degree, the hyperplane σ=0 is represented by a straight line as shown in FIG. 4, and, at this time, the hyperplane is called also a switching function.

The time-series data of the estimated differential output VO2 bar determined by the estimator 26 is actually used as the components of the switching function, as described later on.

Figure 4:
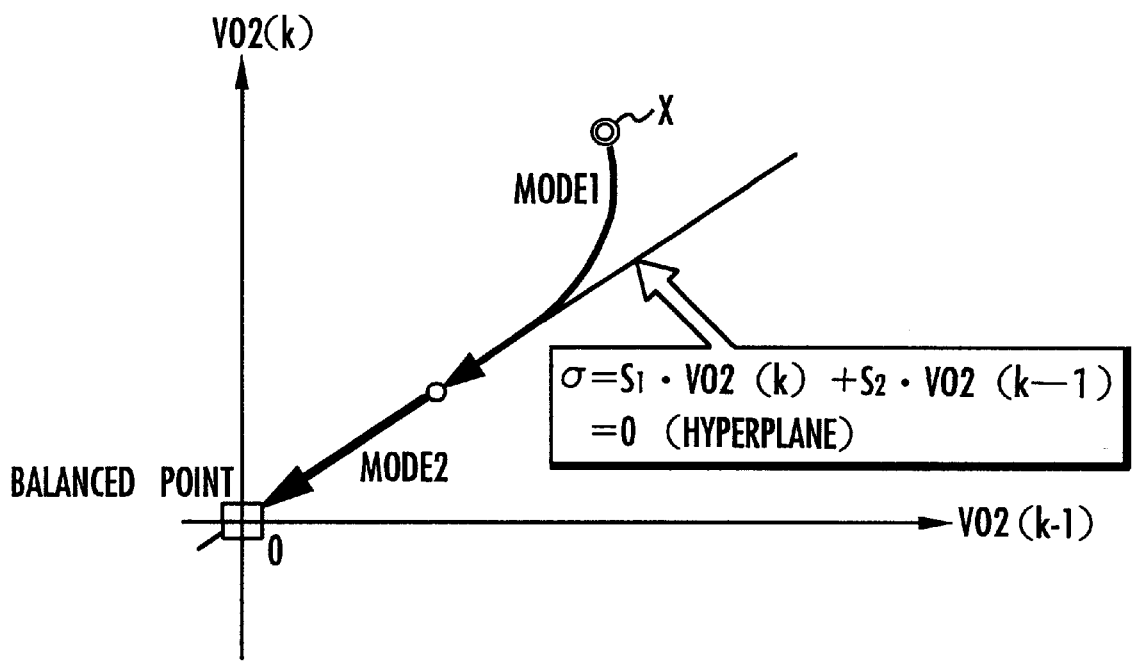
FIG. 4 is a diagram illustrative of a sliding mode control process employed by the plant control system shown in FIG. 1.

The adaptive sliding mode control process in this embodiment serves to converge the state quantity X onto the hyperplane σ=0 according to a reaching control law which is a control law for converging the state quantity X=(VO2(k), VO2(k−1)) onto the hyperplane σ=0, i.e., for converging the value of the switching function σ to "0", and an adaptive control law (adaptive algorithm) which is a control law for compensating for the effect of a disturbance in converging the state quantity X onto the hyperplane σ=0 (mode 1 in FIG. 4). While converging the state quantity X onto the hyperplane σ=0 according to an equivalent control input (holding the value of the switching function σ at "0"), the state quantity X is converted to a balanced point on the hyperplane σ=0 where VO2(k)=VO2(k−1)=0, i.e., a point where time-series data VO2/OUT(k), VO2/OUT(k−1) of the output VO2/OUT of the O$_2$ sensor 6 are equal to the target value VO2/TARGET.

The command differential air-fuel ratio usl to be generated by the sliding mode controller 27 according to the sliding mode control process for converging the state quantity X to the balanced point on the hyperplane σ=0 is expressed as the sum of an equivalent control input ueq to be applied to the object exhaust system E according to the control law for converging the state quantity X onto the hyperplane σ=0, an input urch (hereinafter referred to as a "reaching control law input urch") to be applied to the object exhaust system E according to the reaching control law, and an input uadp (hereinafter referred to as an "adaptive control law input uadp") to be applied to the object exhaust system E according to the adaptive control law (see the following equation (17)).

$$Usl = Ueq + Urch + Uadp \quad (17)$$

The equivalent control input ueq, the reaching control law input urch, and the adaptive control law uadp are determined on the basis of the model of the discrete time system expressed by the equation (11) (a model where the differential output kact(k−d1) of the LAF sensor 5 in the equation (1) is replaced with the command differential air-fuel ratio kcmd(k−d) using the total dead time d), as follows:

The equivalent control input ueq which is an input to be applied to the object exhaust system E for converging the state quantity X onto the hyperplane σ=0 is equal to the command differential air-fuel ratio kcmd which satisfies the condition: σ(k+1)=σ(k)=0. Using the equations (11), (15), the equivalent control input ueq which satisfies the above condition is given by the following equation (18):

$$Ueq(k) = -(S \cdot B)^{-1} \cdot \{S \cdot (A-1)\} \cdot X(k+d) \quad (18)$$

$$= \frac{-1}{s1b1} \cdot \{[s1 \cdot (a1-1) + s2] \cdot VO2(k+d) + (s1 \cdot a2 - s2) \cdot VO2(k+d-1)\}$$

The equation (18) is a basic formula for determining the equivalent control input ueq in each control cycle.

According to present embodiment, the reaching control law input urch is basically determined according to the following equation (19):

$$Urch(k) = -(S \cdot B)^{-1} \cdot F \cdot \sigma(k+d) \quad (19)$$

$$= \frac{-1}{s1b1} \cdot F \cdot \sigma(k+d)$$

Specifically, the reaching control law input urch is determined in proportion to the value σ(k+d) of the switching function σ after the total dead time d, in view of the effect of the total dead time d.

The coefficient F in the equation (19) which determines the gain of the reaching control law is established to satisfy the condition expressed by the following equation (20):

$$0 < F < 2 \quad (20)$$

The value of the switching function σ may possibly vary in an oscillating fashion (so-called chattering) with respect to "0". In order to suppress such chattering, it is preferable that the coefficient F relative to the reaching control law input urch be established to further satisfy the condition of the following equation (21):

$$0 < F < 1 \quad (21)$$

The adaptive control law input uadp is basically determined according to the following equation (22) (ΔT in the equation (22) represents the period of the control cycles of the exhaust-side control unit 7a):

$$Uadp(k) = -(S \cdot B)^{-1} \cdot G \cdot \sum_{i=0}^{k+d} (\sigma(i) \cdot \Delta T) \quad (22)$$

$$= \frac{-1}{s1b1} \cdot G \cdot \sum_{i=0}^{k+d} (\sigma(i) \cdot \Delta T)$$

The adaptive control law input uadp is determined in proportion to an integrated value (which corresponds to an integral of the values of the switching function σ) over control cycles of values of the switching function σ until after the total dead time d, in view of the effect of the total dead time d.

The coefficient G (which determines the gain of the adaptive control law) in the equation (22) is established to satisfy the condition of the following equation (23):

$$G = J \cdot \frac{2-F}{\Delta T} \quad (23)$$

$$(0 < J < 2)$$

A specific process of deriving conditions for establishing the equations (16), (20), (21), (23) is described in detail in Japanese patent application No. 11-93741 and U.S. patent application Ser. No. 09/153032, and will not be described in detail below.

The demand differential air-fuel ratio usl as an input to be given to the object exhaust system E for converging the output signal VO2/OUT of the $O_2$ sensor 6 to its target value VO2/TARGET may basically be determined as the sum (ueq+urch+uadp) of the equivalent control input ueq, the reaching control law input urch, and the adaptive control law uadp determined according to the respective equations (18), (19), (22). However, the differential outputs VO2(K+d), VO2(k+d−1) of the $O_2$ sensor 6 and the value σ(k+d) of the switching function σ, etc. used in the equations (18), (19), (22) cannot directly be obtained as they are values in the future.

According to present embodiment, therefore, the sliding mode controller 27 uses the estimated differential outputs VO2(k+d) bar, VO2(k+d−1) bar determined by the estimator 26, instead of the differential outputs VO2(K+d), VO2(k+d−1) from the $O_2$ sensor 6 for determining the equivalent control input ueq according to the equation (18), and calculates the equivalent control input ueq in each control cycle according to the following equation (24):

$$Ueq(k) = \frac{-1}{s1b1}\{[s1 \cdot (a1-1) + s2] \cdot \overline{VO2}(k+d) + (s1 \cdot a2 - s2) \cdot \overline{VO2}(k+d-1)\} \quad (24)$$

According to present embodiment, furthermore, the sliding mode controller 27 actually uses time-series data of the estimated differential output VO2 bar sequentially determined by the estimator 26 as described as a state quantity to be controlled. That is, the sliding mode controller 27 defines a switching function σ bar according to the following equation (25) (the linear function σ bar corresponds to time-series data of the differential output VO2 in the equation (15) which is replaced with time-series data of the estimated differential output VO2 bar), in place of the switching function σ established according to the equation (15):

$$\overline{\sigma(k)} = s1 \cdot \overline{VO2}(k) + s2 \cdot \overline{VO2}(k-1) \quad (25)$$

The sliding mode controller 27 calculates the reaching control law input urch in each control cycle according to the following equation (26), using the value of the switching function σ bar represented by the equation (25), rather than the value of the switching function σ for determining the reaching control law input urch according to the equation (19):

$$Urch(k) = \frac{-1}{s1b1} \cdot F \cdot \overline{\sigma}(k+d) \quad (26)$$

Similarly, the sliding mode controller 27 calculates the adaptive control law input uadp in each control cycle according to the following equation (27), using the value of the switching function σ bar represented by the equation (25), rather than the value of the switching function σ for determining the adaptive control law input uadp according to the equation (22):

$$Uadp(k) = \frac{-1}{s1b1} \cdot G \cdot \sum_{i=0}^{k+d} (\bar{\sigma}(i) \cdot \Delta T) \tag{27}$$

The latest identified gain coefficients a1(k) hat, a2(k) hat, b1(k) hat which have been determined by the identifier 25 are basically used as the gain coefficients a1, a2, b1 that are required to calculate the equivalent control input ueq, the reaching control law input urch, and the adaptive control law input uadp according to the equations (24), (26), (27).

The sliding mode controller 27 determines the sum of the equivalent control input ueq, the reaching control law input urch, and the adaptive control law input uadp determined according to the equations (24), (26), (27), as the demand differential air-fuel ratio usl (see the equation (17)). The conditions for establishing the coefficients s1, s2, F, G used in the equations (24), (26), (27) are as described above.

The demand differential air-fuel ratio usl determined by the sliding mode controller 27 as described above signifies an input to be given to the object exhaust system 1 for converting the estimated differential output VO2 bar from the $O_2$ sensor 6 to "0", and as a result, for converting the output VO2/OUT from the $O_2$ sensor 6 to the target value VO2/TARGET, i.e., a target value for the difference between the air-fuel ratio of the internal combustion engine 1 and the reference value FLAF/BASE.

The above process is a calculating process (algorithm) for generating the demand differential air-fuel ratio usl in each control cycle by the sliding mode controller 27.

As described above, the limiter 30 (see FIG. 3) in the target air-fuel ratio generator 28 of the exhaust-side control unit 7a limits the demand differential air-fuel ratio usl generated by the sliding mode controller 27 thereby to determine the command differential air-fuel ratio kcmd (normally kcmd=usl). Then, the adder 31 adds the air-fuel ratio reference value FLAF/BASE to the determined command differential air-fuel ratio kcmd for thereby determining the target air-fuel ratio KCMD (=kcmd+FLAF/BASE) to be given to the engine-side control unit 7b according to the following equation (28):

$$KCMD(k) = kcmd(k) + FLAF/BASE \tag{28}$$

In this embodiment, the limiter 30 sequentially variably sets up an allowable range for limiting the demand differential air-fuel ratio usl depending on the demand differential air-fuel ratio usl and the operating state of the internal combustion engine 1, as described later on.

In the present embodiment, furthermore, the air-fuel ratio reference value FLAF/BASE used as a reference for the demand differential air-fuel ratio usl and the command differential air-fuel ratio kcmd is sequentially variably established by the reference value setting unit 11 depending on the adaptive control law uadp which is an adaptive control law component of the demand differential air-fuel ratio usl generated by the sliding mode controller 27, as described later on.

The general feedback controller 15 of the engine-side control unit 7b, particularly, the adaptive controller 18, will be described below.

As shown in FIG. 1, the general feedback controller 15 effects a feedback control process to converge the output KACT (detected air-fuel ratio) from the LAF sensor 5 to the target air-fuel ratio KCMD as described above. If such a feedback control process were carried out under the known PID control only, it would be difficult keep stable controllability against dynamic behavioral changes including changes in the operating conditions of the internal combustion engine 1, characteristic changes due to aging of the internal combustion engine 1, etc.

Figure 5:
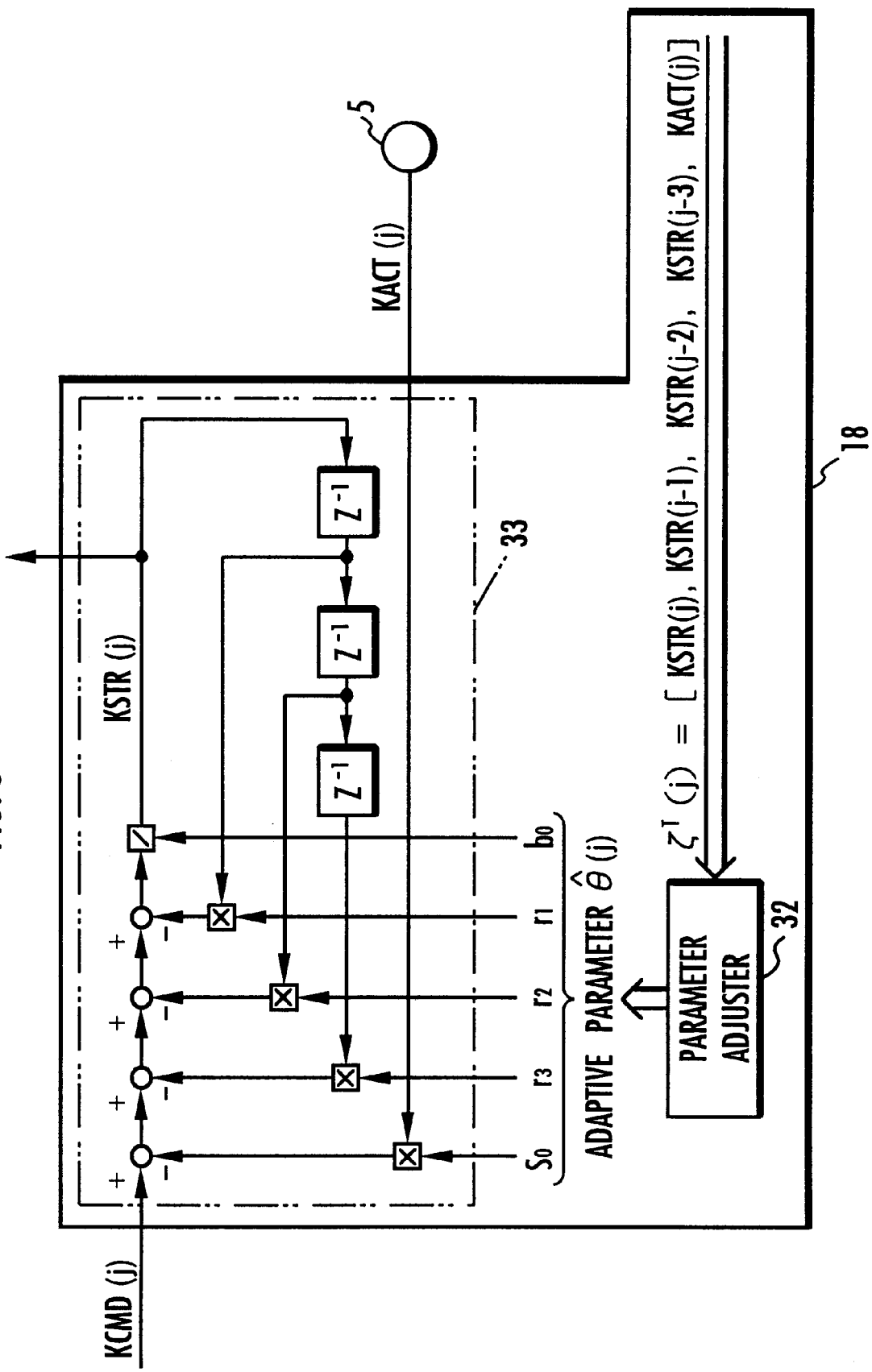
FIG. 5 is a block diagram of an adaptive controller in the plant control system shown in FIG. 1.

The adaptive controller 18 is a recursive-type controller which makes it possible to carry out a feedback control process while compensating for dynamic behavioral changes of the internal combustion engine 1. As shown in FIG. 5, the adaptive controller 18 comprises a parameter adjuster 32 for establishing a plurality of adaptive parameters using the parameter adjusting law proposed by I. D. Landau, et al., and a manipulated variable calculator 33 for calculating the feedback manipulated variable KSTR using the established adaptive parameters.

The parameter adjuster 32 will be described below. According to the parameter adjusting law proposed by I. D. Landau, et al., when polynomials of the denominator and the numerator of a transfer function $B(Z^{-1})/A(Z^{-1})$ of a discrete-system object to be controlled are generally expressed respectively by equations (29), (30), given below, an adaptive parameter θ hat (j) (j indicates the number of a control cycle) established by the parameter adjuster 32 is represented by a vector (transposed vector) according to the equation (31) given below. An input ζ(j) to the parameter adjuster 32 is expressed by the equation (32) given below. In the present embodiment, it is assumed that the internal combustion engine 1, which is an object to be controlled by the general feedback controller 15, is considered to be a plant of a first-order system having a dead time $d_p$ corresponding to three control cycles (a time corresponding to three combustion cycles of the internal combustion engine 1), and m=n=1, $d_p$=3 in the equations (29)–(32), and five adaptive parameters $s_0, r_1, r_2, r_3, b_0$ are established (see FIG. 5). In the upper and middle expressions of the equation (32), $u_s, y_s$ generally represent an input (manipulated variable) to the object to be controlled and an output (controlled variable) from the object to be controlled. In the present embodiment, the input is the feedback manipulated variable KSTR and the output from the object (the internal combustion engine 1) is the output KACT (detected air-fuel ratio) from the LAF sensor 5, and the input ζ(j) to the parameter adjuster 32 is expressed by the lower expression of the equation (32) (see FIG. 5).

$$A(Z^{-1}) = 1 + a1Z^{-1} + \ldots + anZ^{-n} \tag{29}$$

$$B(Z^{-1}) = b0 + b1Z^{-1} + \ldots + bmZ^{-m} \tag{30}$$

$$\hat{\theta}^T(j) = [\hat{b}_0(j), \hat{B}_R(Z^{-1}, j), \hat{S}(Z^{-1}, j)] \tag{31}$$

$$= [b_0(j), r_1(j), \cdots, r_{m+d_p-1}(j), s_o(j), \cdots, s_{n-1}(j)]$$

$$= [b_0(j), r_1(j), r_2(j), r_3(j), s_o(j)]$$

-continued $$\zeta^T(j) = [u_s(j), \cdots, u_s(j-m-dp+1), y_s(j), \cdots, y_s(j-n+1)] \quad (32)$$
$$= [u_s(j), u_s(j-1), u_s(j-2), u_s(j-3), y_s(j)]$$
$$= [KSTR(j), KSTR(j-1), KSTR(j-2), KSTR(j-3), KACT(j)]$$

The adaptive parameter θ hat expressed by the equation (31) is made up of a scalar quantity element $b_0$ hat ($Z^{-1}$, j) for determining the gain of the adaptive controller 18, a control element $B_R$ hat ($Z^{-1}$, j) expressed using a manipulated variable, and a control element S hat ($Z^{-1}$, j) expressed using a controlled variable, which are expressed respectively by the following equations (33)–(35) (see the block of the manipulated variable calculator 33 shown in FIG. 5):

$$\hat{b}_0^{-1}(j) = \frac{1}{b_0} \quad (33)$$

$$\hat{B}_R(Z^{-1}, j) = r_1 Z^{-1} + r_2 Z^{-2} + \cdots + r_{m+d_p-1} Z^{-(n+dp-1)} \quad (34)$$
$$= r_1 Z^{-1} + r_2 Z^{-2} + r_3 Z^{-3}$$

$$\hat{S}(Z^{-1}, j) = s_0 + s_1 Z^{-1} + \cdots + s_{n-1} Z^{(n-1)} \quad (35)$$
$$= s_0$$

The parameter adjuster 32 establishes coefficients of the scalar quantity element and the control elements, described above, and supplies them as the adaptive parameter θ hat expressed by the equation (31) to the manipulated variable calculator 33. The parameter adjuster 32 calculates the adaptive parameter θ hat so that the output KACT from the LAF sensor 5 will agree with the target air-fuel ratio KCMD, using time-series data of the feedback manipulated variable KSTR from the present to the past and the output KACT.

Specifically, the parameter adjuster 32 calculates the adaptive parameter θ hat according to the following equation (36):

$$\hat{\theta}(j) = \hat{\theta}(j-1) + \Gamma(j-1) \cdot \zeta(j-d_p) \cdot e^*(j) \quad (36)$$

where Γ(j) represents a gain matrix (whose degree is indicated by m+n+$d_p$) for determining a rate of establishing the adaptive parameter θ hat, and e*(j) an estimated error of the adaptive parameter θ hat. Γ(j) and e*(j) are expressed respectively by the following recursive formulas (37), (38):

$$\Gamma(j) = \quad (37)$$
$$\frac{1}{\lambda_1(j)} \left[ \Gamma(j-1) - \frac{\lambda_2(j) \cdot \Gamma(j-1) \cdot \zeta(j-d_p) \cdot \zeta^T(j-d_p) \cdot \Gamma(j-1)}{\lambda_1(j) + \lambda_2(j) \cdot \zeta^T(j-d_p) \cdot \Gamma(j-1) \cdot \zeta(j-d_p)} \right]$$

where $0 < \lambda_1(j) \le 1, 0 \le \lambda_2(j) < 2, \Gamma(0) > 0$.

$$e^*(j) = \frac{D(Z^{-1}) \cdot KACT(j) - \hat{\theta}^T(j-1) \cdot \zeta(j-d_p)}{1 + \zeta^T(j-d_p) \cdot \Gamma(j-1) \cdot \zeta(j-d_p)} \quad (38)$$

where $D(Z^{-1})$ represents an asymptotically stable polynomial for adjusting the convergence. In the present embodiment, $D(Z^{-1})=1$.

Various specific algorithms including the degressive gain algorithm, the variable gain algorithm, the fixed trace algorithm, and the fixed gain algorithm are obtained depending on how $\lambda_1(j)$, $\lambda_2(j)$ in the equation (37) are selected. For a time-dependent plant such as a fuel injection process, an air-fuel ratio, or the like of the internal combustion engine 1, either one of the degressive gain algorithm, the variable gain algorithm, the fixed gain algorithm, and the fixed trace algorithm is suitable.

Using the adaptive parameter θ hat ($s_0$, $r_1$, $r_2$, $r_3$, $b_0$) established by the parameter adjuster 32 and the target air-fuel ratio KCMD calculated by the exhaust-side control unit 7a, the manipulated variable calculator 33 determines the feedback manipulated variable KSTR according to a recursive formula expressed by the following equation (39):

$$KSTR = \frac{KCMD(j) - s_0 \cdot KACT(j) - r_1 \cdot KSTR(j-1) -}{b_0} \quad (39)$$
$$\frac{r_2 \cdot KSTR(j-2) - r_3 \cdot KSTR(j-3)}{b_0}$$

The manipulated variable calculator 33 shown in FIG. 5 represents a block diagram of the calculations according to the equation (39).

The feedback manipulated variable KSTR determined according to the equation (39) becomes the target air-fuel ratio KCMD insofar as the output KACT of the LAF sensor 5 agrees with the target air-fuel ratio KCMD. Therefore, the feedback manipulated variable KSTR is divided by the target air-fuel ratio KCMD by the divider 19 for thereby determining the feedback manipulated variable kstr that can be used as the feedback correction coefficient KFB.

As is apparent from the foregoing description, the adaptive controller 18 thus constructed is a recursive-type controller taking into account dynamic behavioral changes of the internal combustion engine 1 which is an object to be controlled. Stated otherwise, the adaptive controller 18 is a controller described in a recursive form to compensate for dynamic behavioral changes of the internal combustion engine 1, and more particularly a controller having a recursive-type adaptive parameter adjusting mechanism.

A recursive-type controller of this type may be constructed using an optimum regulator. In such a case, however, it generally has no parameter adjusting mechanism. The adaptive controller 18 constructed as described above is suitable for compensating for dynamic behavioral changes of the internal combustion engine 1.

The details of the adaptive controller 18 have been described above.

The PID controller 17, which is provided together with the adaptive controller 18 in the general feedback controller 20, calculates a proportional term (P term), an integral term (I term), and a derivative term (D term) from the difference between the output KACT of the LAF sensor 5 and the target air-fuel ratio KCMD, and calculates the total of those terms as the feedback manipulated variable KLAF, as is the case with the general PID control process. In the present embodiment, the feedback manipulated variable KLAF is set to "1" when the output KACT of the LAF sensor 5 agrees with the target air-fuel ratio KCMD by setting an initial value of the integral term (I term) to "1", so that the feedback manipulated variable KLAF can be used as the feedback correction coefficient KFB for directly correcting the fuel injection quantity. The gains of the proportional term, the integral term, and the derivative term are determined from the rotational speed and intake pressure of the internal combustion engine 1 using a predetermined map.

The switcher 20 of the general feedback controller 15 outputs the feedback manipulated variable KLAF determined by the PID controller 17 as the feedback correction coefficient KFB for correcting the fuel injection quantity if the combustion in the internal combustion engine 1 tends to be unstable as when the temperature of the coolant of the internal combustion engine 1 is low, the internal combustion engine 1 rotates at high speeds, or the intake pressure is low, or if the output KACT of the LAF sensor 5 is not reliable due to a response delay of the LAF sensor 5 as when the target air-fuel ratio KCMD changes largely or immediately after the air-fuel ratio feedback control process has started, or if the internal combustion engine 1 operates highly stably as when it is idling and hence no high-gain control process by the adaptive controller 18 is required. Otherwise, the switcher 20 outputs the feedback manipulated variable kstr which is produced by dividing the feedback manipulated variable KSTR determined by the adaptive controller 18 by the target air-fuel ration KCMD, as the feedback correction coefficient KFB for correcting the fuel injection quantity. This is because the adaptive controller 18 effects a high-gain control process and functions to converge the output KACT of the LAF sensor 5 quickly to the target air-fuel ratio KCMD, and if the feedback manipulated variable KSTR determined by the adaptive controller 18 is used when the combustion in the internal combustion engine 1 is unstable or the output KACT of the LAF sensor 5 is not reliable, then the air-fuel ratio control process tends to be unstable.

Such operation of the switcher 20 is disclosed in detail in Japanese laid-open patent publication No. 8-105345 and U.S. Pat. No. 5,558,075, and will not be described in detail below.

Operation of the plant control system will be described below.

Figure 7:
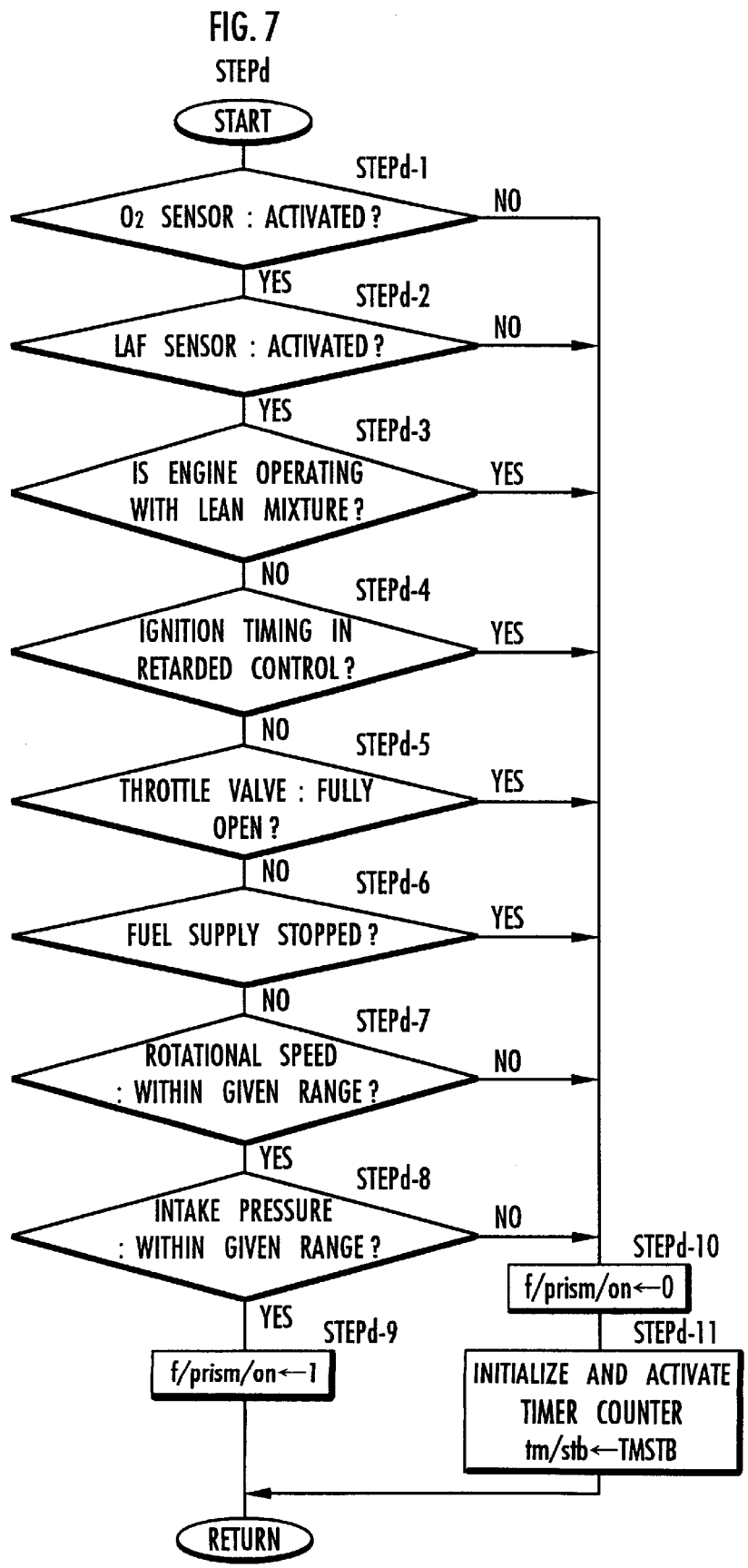
FIG. 7 is a flowchart of a subroutine of the flowchart shown in FIG. 6.

First, a process, carried out by the engine-side control unit 7b, of calculating an output fuel injection quantity #nTout (n=1, 2, 3, 4) for each of the cylinders of the internal combustion engine 1 for controlling the air-fuel ratio of the internal combustion engine 1 will be described below with reference to FIG. 6. The engine-side control unit 7b calculates an output fuel injection quantity #nTout (n=1, 2, 3, 4) for each of the cylinders in synchronism with a crankshaft angle period of the internal combustion engine 1 as follows:

In FIG. 7, the engine-side control unit 7b reads outputs from various sensors including the LAF sensor 5 and the $O_2$ sensor 6 in STEPa. At this time, the output KACT of the LAF sensor 5 and the output VO2/OUT of the $O_2$ sensor 6, including data obtained in the past, are stored in a time-series fashion in a memory (not shown).

Then, the basic fuel injection quantity calculator 8 corrects a fuel injection quantity corresponding to the rotational speed NE and intake pressure PB of the internal combustion engine 1 depending on the effective opening area of the throttle valve, thereby calculating a basic fuel injection quantity Tim in STEPb. The first correction coefficient calculator 9 calculates a first correction coefficient KTOTAL depending on the coolant temperature and the amount by which the canister is purged in STEPc.

The engine control unit 7b determines an operation mode of the internal combustion engine 1, and sets a value of a flag f/prism/on which represents whether the target air-fuel ratio KCMD generated by the target air-fuel ratio generator 28 of the exhaust-side control unit 7a is to be used to manipulate the air-fuel ratio of the internal combustion engine 1 or not in STEPd.

Operation modes of the internal combustion engine 1, specifically modes of manipulating the air-fuel ratio of the internal combustion engine 1, include an operation mode in which the engine-side control unit 7b uses the target air-fuel ratio KCMD generated by the target air-fuel ratio generator 28 (which is basically a target air-fuel ratio for converging the output signal VO2/OUT from the $O_2$ sensor 6 to the target value VO2/TARGET), and manipulates the air-fuel ratio of the internal combustion engine 1 (i.e., adjust the fuel injection quantity of the internal combustion engine 1) in order to the output signal KACT of the LAF sensor (detected air-fuel ratio) to the target air-fuel ratio KCMD, and an operation mode in which the engine-side control unit 7b manipulates the air-fuel ratio of the internal combustion engine 1 (i.e., adjust the fuel injection quantity of the internal combustion engine 1), without using the target air-fuel ratio KCMD generated by the target air-fuel ratio generator 28.

The former operation mode is a normal operation mode while the internal combustion engine 1 is in operation (hereinafter referred to as a "normal operation mode"). The latter operation mode represents a plurality of operation modes including an operation mode in which the fuel supplied to the internal combustion engine 1 is cut off (stopped), an operation mode in which the throttle valve (not shown) of the internal combustion engine 1 is fully open, and an operation mode in which the air-fuel ratio of the internal combustion engine 1 is manipulated to generate a lean air-fuel mixture (lean operation mode).

The deciding process of STEPd is a process of determining whether the internal combustion engine 1 is in the normal operation mode or not, i.e., whether the engine-side control unit 7b is to manipulate the air-fuel ratio of the internal combustion engine 1 using the target air-fuel ratio KCMD generated by the target air-fuel ratio generator 28, or not. When the value of the flag f/prism/on is "0", it means that the target air-fuel ratio KCMD generated by the target air-fuel ratio generator 28 is not to be used (the internal combustion engine 1 is not in the normal operation mode), and when the value of the flag f/prism/on is "1", it means that the target air-fuel ratio KCMD generated by the target air-fuel ratio generator 28 is to be used (the internal combustion engine 1 is in the normal operation mode).

The deciding subroutine of STEPd is shown in detail in FIG. 7. As shown in FIG. 7, the engine-side control unit 7b decides whether the $O_2$ sensor 6 and the LAF sensor 5 are activated or not respectively in STEPd-1, STEPd-2. If neither one of the $O_2$ sensor 6 and the LAF sensor 5 is activated, since detected data from the $O_2$ sensor 6 and the LAF sensor 5 for use by the target air-fuel ratio generator 28 are not accurate enough, the target air-fuel ratio generator 28 cannot generate an appropriate target air-fuel ratio. Therefore, since the internal combustion engine 1 cannot operate in the normal operation mode, the value of the flag f/prism/on is set to "0" in STEPd-10.

Then, the engine-side control unit 7b decides whether the internal combustion engine 1 is operating with a lean air-fuel mixture or not in STEPd-3. The engine control unit 7b decides whether the ignition timing of the internal combustion engine 1 is retarded for early activation of the catalytic converter 3 immediately after the start of the internal combustion engine 1 or not in STEPd-4. The engine control unit 7b decides whether the throttle valve of the internal combustion engine 1 is fully open or not in STEPd-5. The engine control unit 7b decides whether the supply of fuel to the internal combustion engine 1 is being stopped or not in STEPd-6. If either one of the conditions of these steps is satisfied (YES), then since the internal combustion engine 1 is not in the normal operation mode, the value of the flag f/prism/on is set to "0" in STEPd-10.

The engine-side control unit 7b then decides whether the rotational speed NE and the intake pressure PB of the internal combustion engine 1 fall within respective given ranges (normal ranges) or not respectively in STEPd-7, STEPd-8. If either one of the rotational speed NE and the intake pressure PB does not fall within its given range, then since it is not preferable to control the air-fuel ratio of the internal combustion engine 1 using the target air-fuel ratio KCMD generated by the target air-fuel ratio generator 28, the value of the flag f/prism/on is set to "0" in STEPd-10.

If the conditions of STEPd-1, STEPd-2, STEPd-7, STEPd-8 are satisfied, and the conditions of STEPd-3, STEPd-4, STEPd-5, STEPd-6 are not satisfied (normal), then the engine-side control unit 7b determines that the internal combustion engine 1 is in the normal operation mode in which the target air-fuel ratio KCMD generated by the target air-fuel ratio generator 28 is used to manipulate the air-fuel ratio of the internal combustion engine 1, and sets the value of the flag f/prism/on to "1" in STEPd-9.

After the value of the flag f/prism/on is set to "0" in STEPd-10, the engine-side control unit 7b sets, to a given initial value TMSTB, a timer counter tm/stb (count-down timer) for measuring an elapsed time from the time when the value of the flag f/prism/on changes from "0" to "1", i.e., an elapsed time after the air-fuel ratio of the internal combustion engine 1 starts being manipulated according to the target air-fuel ratio KCMD generated by the target air-fuel ratio generator 28, i.e., the control process for converging the output signal VO2/OUT of the $O_2$ sensor 6 to the target value VO2/TARGET has started to be carried out, and activates the timer counter tm/stb in STEPd-11. The count of the timer counter tm/stb is counted down at a constant period (longer than the period of control cycles of the exhaust-side control unit 7a). The initial value TMSTB corresponds to a period in which to inhibit the decision as to the stability of the sliding mode controller 27.

Figure 6:
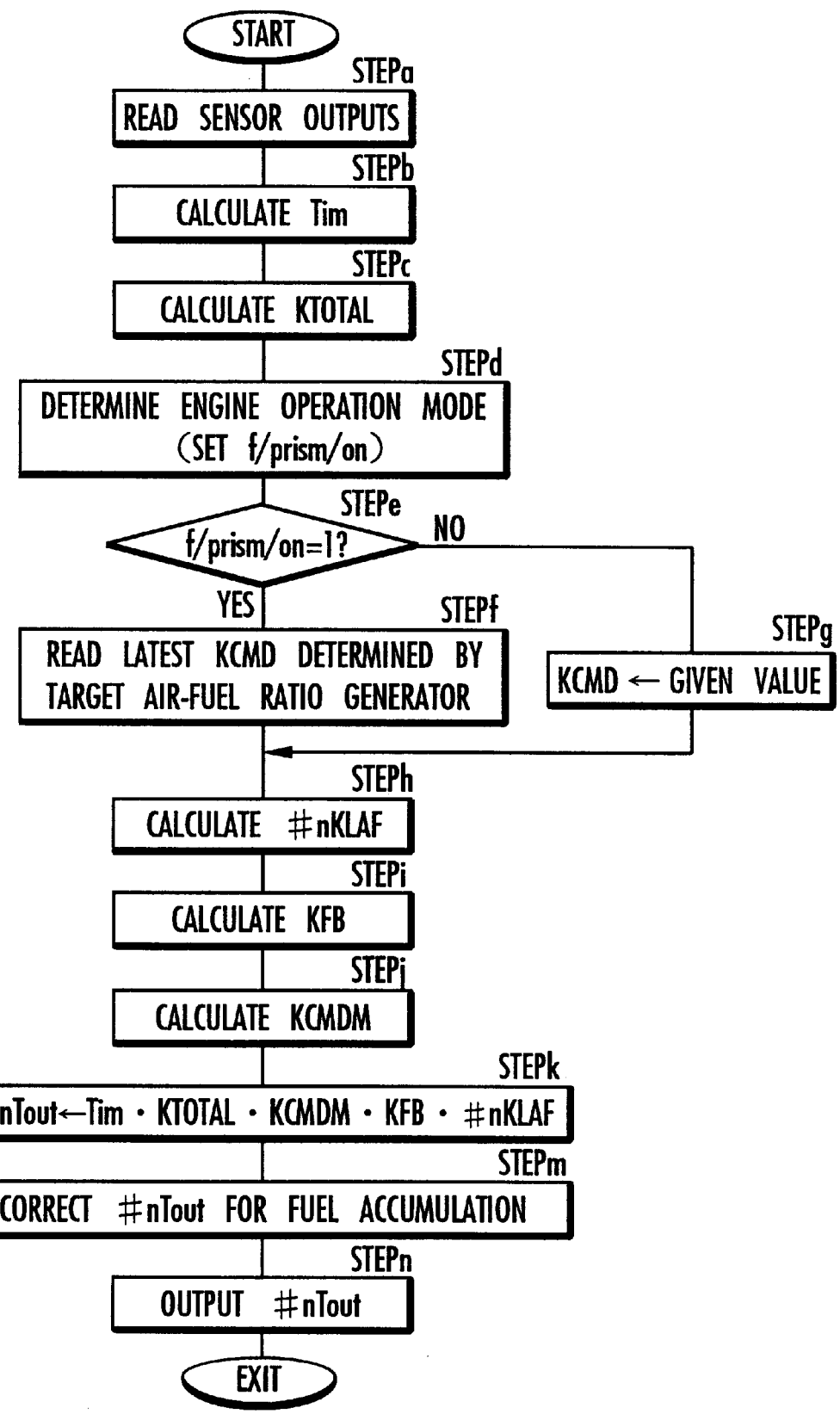
FIG. 6 is a flowchart of an engine operation control process carried out by the plant control system shown in FIG. 1.

In FIG. 6, after the value of the flag f/prism/on has been set, the engine-side control unit 7b determines the value of the flag f/prism/on in STEPe. If f/prism/on=1, then the engine-side control unit 7b reads the latest target air-fuel ratio KCMD generated by the target air-fuel ratio generator 28 in STEPf. If f/prism/on=0, then the engine-side control unit 7b sets the target air-fuel ratio KCMD to a predetermined value in STEPg. The predetermined value to be established as the target air-fuel ratio KCMD is determined from the rotational speed NE and intake pressure PB of the internal combustion engine 1 using a predetermined map, for example. Particularly when the engine 1 is in the lean operation mode, the target air-fuel ratio KCMD set in STEPg is an air-fuel ratio in a lean range.

In the local feedback controller 16, the PID controllers 22 calculates respective feedback correction coefficients #nKLAF in order to eliminate variations between the cylinders, based on actual air-fuel ratios #nA/F of the respective cylinders which have been estimated from the output KACT of the LAF sensor 5 by the observer 21, in STEPh. Then, the general feedback controller 15 calculates a feedback correction coefficient KFB in STEPi.

Depending on the operating conditions of the internal combustion engine 1, the switcher 20 selects either the feedback manipulated variable KLAF determined by the PID controller 17 or the feedback manipulated variable kstr which has been produced by dividing the feedback manipulated variable KSTR determined by the adaptive controller 18 by the target air-fuel ratio KCMD (normally, the switcher 20 selects the feedback manipulated variable kstr). The switcher 20 then outputs the selected feedback manipulated variable KLAF or kstr as a feedback correction coefficient KFB.

When switching the feedback correction coefficient KFB from the feedback manipulated variable KLAF from the PID controller 17 to the feedback manipulated variable kstr from the adaptive controller 18, the adaptive controller 18 determines a feedback manipulated variable KSTR in a manner to hold the correction coefficient KFB to the preceding correction coefficient KFB (=KLAF) as long as in the cycle time for the switching. When switching the feedback correction coefficient KFB from the feedback manipulated variable kstr from the adaptive controller 18 to the feedback manipulated variable KLAF from the PID controller 17, the PID controller 17 calculates a present correction coefficient KLAF in a manner to regard the feedback manipulated variable KLAF determined by itself in the preceding cycle time as the preceding correction coefficient KFB (=kstr).

After the feedback correction coefficient KFB has been calculated, the second correction coefficient calculator 10 calculates in STEPj a second correction coefficient KCMDM depending on the target air-fuel ratio KCMD determined in STEPf or STEPg.

Then, the engine-side control unit 7b multiplies the basic fuel injection quantity Tim, determined as described above, by the first correction coefficient KTOTAL, the second correction coefficient KCMDM, the feedback correction coefficient KFB, and the feedback correction coefficients #nKLAF of the respective cylinders, determining output fuel injection quantities #nTout of the respective cylinders in STEPk. The output fuel injection quantities #nTout are then corrected for accumulated fuel particles on intake pipe walls of the internal combustion engine 1 by the fuel accumulation corrector 23 in STEPm. The corrected output fuel injection quantities #nTout are applied to the non-illustrated fuel injectors of the internal combustion engine 1 in STEPn.

In the internal combustion engine 1, the fuel injectors inject fuel into the respective cylinders according to the respective output fuel injection quantities #nTout.

The above calculation of the output fuel injection quantities #nTout and the fuel injection of the internal combustion engine 1 are carried out in successive cycle times synchronous with the crankshaft angle period of the internal combustion engine 1 for controlling the air-fuel ratio of the internal combustion engine 1 in order to converge the output KACT of the LAF sensor 5 (the detected air-fuel ratio) to the target air-fuel ratio KCMD. While the feedback manipulated variable kstr from the adaptive controller 18 is being used as the feedback correction coefficient KFB, the output KACT of the LAF sensor 5 is quickly converged to the target air-fuel ratio KCMD with high stability against behavioral changes such as changes in the operating conditions of the internal combustion engine 1 or characteristic changes thereof. A response delay of the internal combustion engine 1 is also appropriately compensated for.

Figure 8:
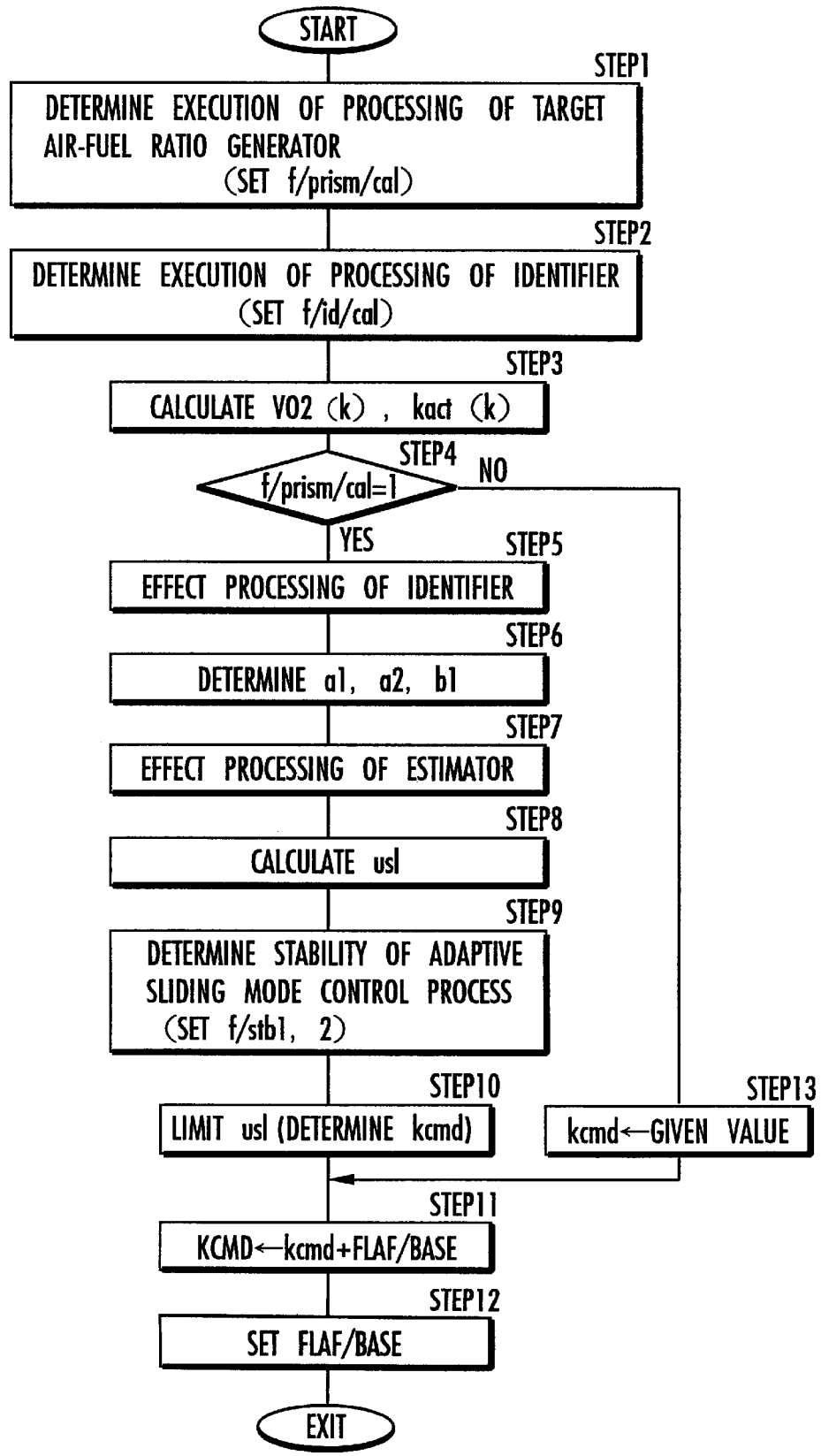
FIG. 8 is a flowchart of an overall process carried out by the target air-fuel ratio generator in the plant control system shown in FIG. 1.

Concurrent with the above air-fuel ratio manipulation for the internal combustion engine 1, the target air-fuel ratio generator 28 of the exhaust-side control unit 7a executes a main routine shown in FIG. 8 in control cycles of a constant period.

As shown in FIG. 8, the target air-fuel ratio generator 28 decides whether its own processing (the processing of the identifier 25, the estimator 26, the sliding mode controller 27, and the limiter 30) is to be executed or not, and sets a value of a flag f/prism/cal indicative of whether the processing is to be executed or not in STEP1. When the value of the flag f/prism/cal is "0", it means that the processing of the target air-fuel ratio generator 28 is not to be executed, and when the value of the flag f/prism/cal is "1", it means that the processing of the target air-fuel ratio generator 28 is to be executed.

Figure 9:
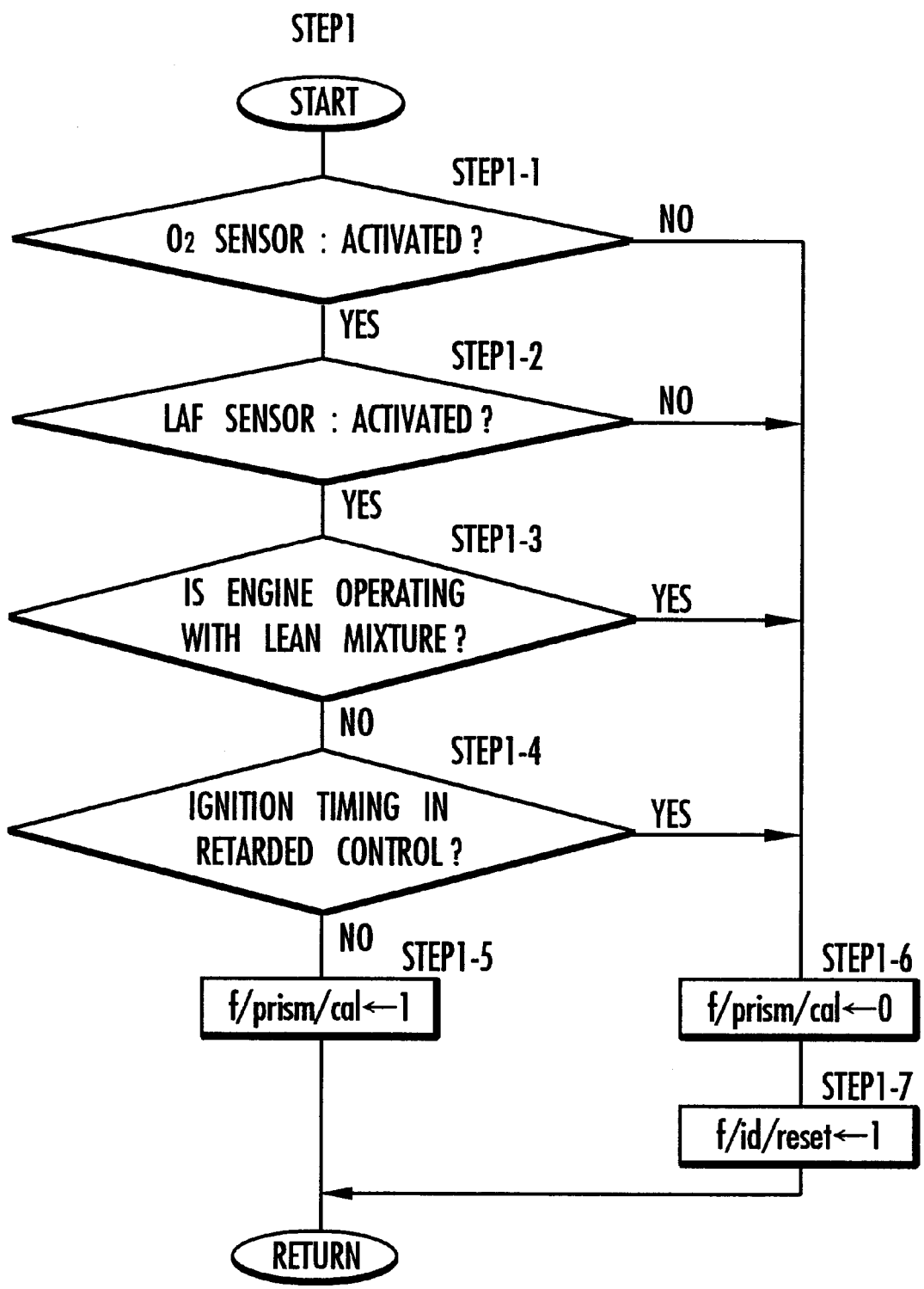
FIG. 9 is a flowchart of a subroutine of the flowchart shown in FIG. 8.

The deciding subroutine in STEP1 is shown in detail in FIG. 9. As shown in FIG. 9, the target air-fuel ratio generator 28 decides whether the $O_2$ sensor 6 and the LAF sensor 5 are activated or not respectively in STEP1-1, STEP1-2. If neither one of the $O_2$ sensor 6 and the LAF sensor 5 is activated, since detected data from the $O_2$ sensor 6 and the LAF sensor 5 for use by the target air-fuel ratio generator 28 are not accurate enough, the value of the flag f/prism/cal is set to "0" in STEP1-6. Then, in order to initialize the identifier 25 as described later on, the value of a flag f/id/reset indicative of whether the identifier 25 is to be initialized or not is set to "1" in STEP1-7. When the value of the flag f/id/reset is "1", it means that the identifier 25 is to be initialized, and when the value of the flag f/id/reset is "0", it means that the identifier 25 is not to be initialized.

The target air-fuel ratio generator 28 decides whether the internal combustion engine 1 is operating with a lean air-fuel mixture or not in STEP1-3. The target air-fuel ratio generator 28 decides whether the ignition timing of the internal combustion engine 1 is retarded for early activation of the catalytic converter 3 immediately after the start of the internal combustion engine 1 or not in STEP1-4. If the conditions of these steps are satisfied, then since the target air-fuel ratio KCMD calculated to converge the output VO2/OUT of the $O_2$ sensor 6 to the target value VO2/TARGET is not used for the fuel control for the internal combustion engine 1, the value of the flag f/prism/cal is set to "0" in STEP1-6, and the value of the flag f/id/reset is set to "1" in order to initialize the identifier 25 in STEP1-7.

If the conditions of STEP1-1, STEP1-2 are satisfied, and the conditions of STEP1-3, STEP1-4 are not satisfied, then the value of the flag f/prism/cal is set to "1" in STEP1-5.

In FIG. 8, after the above deciding subroutine, the target air-fuel ratio generator 28 decides whether a process of identifying (updating) the gain coefficients a1, a1, b1 with the identifier 25 is to be executed or not, and sets a value of a flag f/id/cal indicative of whether the process of identifying (updating) the gain coefficients a1, a1, b1 is to be executed or not in STEP2.

In STEP2, the target air-fuel ratio generator 28 decides whether the throttle valve of the internal combustion engine 1 is substantially fully open or not, and whether the supply of fuel to the internal combustion engine 1 is being stopped or not. If either one of the conditions of these steps is satisfied, then since it is difficult to identify the gain coefficients a1, a2, b1 appropriately, the value of the flag f/id/cal is set to "0". If neither one of the conditions of these steps is satisfied, then the value of the flag f/id/cal is set to "1" to identify (update) the gain coefficients a1, a2, b1 with the identifier 25.

Referring back to FIG. 8, the target air-fuel ratio generator 28 calculates the latest differential outputs kact(k) (=KACT−FLAF/BASE), VO2(k) (=VO2/OUT−VO2/TARGET) respectively from the subtractors 12, 13 in STEP3. Specifically, the subtractors 12, 13 select latest ones of the time-series data read and stored in the non-illustrated memory in STEPa shown in FIG. 6, and calculate the differential outputs kact(k), VO2(k). The air-fuel ratio reference value FLAF/BASE required to calculate the differential output kact(k) is of a latest nature set by the reference value setting unit 11 as described later on. The data of the differential outputs kact(k), VO2(k), as well as the data thereof calculated in the past, are stored in a time-series manner in a memory (not shown) in the exhaust-side control unit 7a.

Then, in STEP4, the target air-fuel ratio generator 28 determines the value of the flag f/prism/cal set in STEP1. If the value of the flag f/prism/cal is "0", i.e., if the processing of the target air-fuel ratio generator 28 is not to be executed, then the target air-fuel ratio generator 28 forcibly sets the command differential air-fuel ratio kcmd for determining the target air-fuel ration KCMD to a predetermined value in STEP13. The predetermined value may be a fixed value (e.g., "0") or the value of the command differential air-fuel ratio kcmd determined in a preceding control cycle. After the command differential air-fuel ratio kcmd is set to the predetermined value in STEP13, the adder 31 adds the air-fuel ratio reference value FLAF/BASE (the latest one set by the reference value setting unit 11) to the command differential air-fuel ratio kcmd for thereby determining a target air-fuel ratio KCMD in the present control cycle in STEP 11. Then, the reference value setting unit 11 carries out a process of setting the air-fuel ratio reference value FLAF/BASE, as described later on, in STEP12, after which the processing in the present control cycle is finished.

If the value of the flag f/prism/cal is "1" in STEP4, i.e., if the processing of the target air-fuel ratio generator 28 is to be executed, then the target air-fuel ratio generator 28 effects the processing of the identifier 25 in STEP5.

Figure 10:
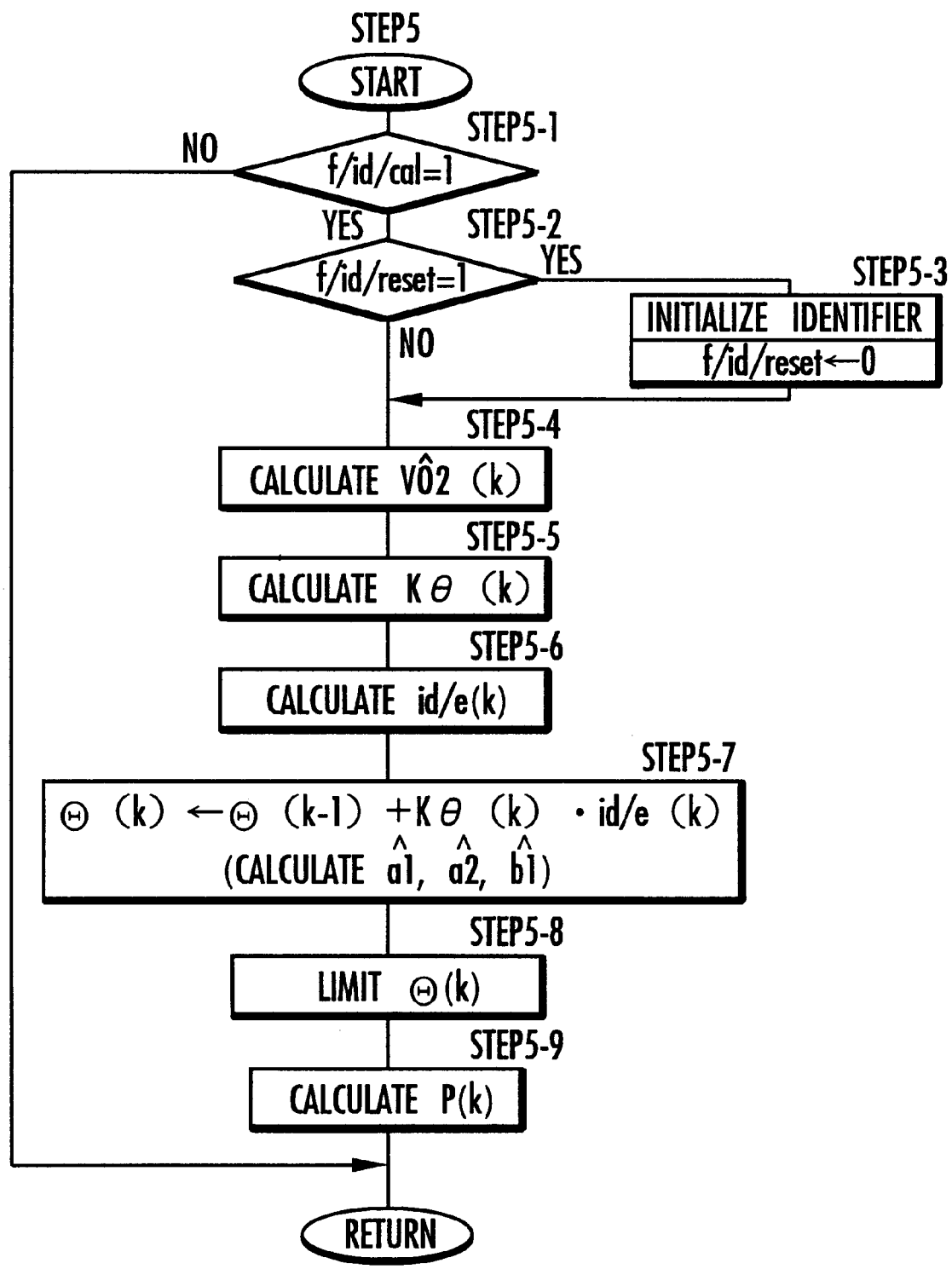
FIG. 10 is a flowchart of a subroutine of the flowchart shown in FIG. 8.

The processing subroutine of STEP5 is shown in detail in FIG. 10.

The identifier 25 determines the value of the flag f/id/cal set in STEP2 in STEP5-1. If the value of the flag f/id/cal is "0" (the throttle valve of the internal combustion engine 1 is substantially fully open or the fuel supply of the internal combustion engine 1 is being cut off), then since the process of identifying the gain coefficients a1, a2, b1 with the identifier 25 is not carried out, control immediately goes back to the main routine shown in FIG. 8.

If the value of the flag f/id/cal is "1", then the identifier 25 determines the value of the flag f/id/reset set in STEP1 with respect to the initialization of the identifier 25 in STEP5-2. If the value of the flag f/id/reset is "1", the identifier 25 is initialized in STEP5-3. When the identifier 25 is initialized, the identified gain coefficients a1 hat, a2 hat, b1 hat are set to predetermined initial values (the identified gain coefficient vector Θ according to the equation (4) is initialized), and the elements of the matrix P (diagonal matrix) according to the equation (9) are set to predetermined initial values. The value of the flag f/id/reset is reset to "0".

Then, the identifier 25 calculates the identified differential output VO2(k) hat from exhaust system model (see the equation (3)) which is expressed using the present identified gain coefficients a1(k−1) hat, a2(k−1) hat, b1(k−1) hat, according to the equation (3) or the equation (6) equivalent thereto, using the past data VO2(k−1), VO2(k−2), kact(k−d−1) of the differential outputs VO2, kact calculated in each control cycle in STEP3, and the identified gain coefficients a1(k−1) hat, a2(k−1) hat, b1(k−1) hat, in STEP5-4.

The identifier 25 then calculates the vector Kθ(k) to be used in determining the new identified gain coefficients a1 hat, a2 hat, b1 hat according to the equation (9) in STEP5-5. Thereafter, the identifier 25 calculates the identified error id/e, i.e., the difference between the identified differential output VO2 hat from the $O_2$ sensor 6 in the exhaust system model and the actual differential output VO2 (see the equation (7)), in STEP5-6.

The identified error id/e obtained in STEP5-6 may basically be calculated according to the equation (7). In the present embodiment, however, a value (=VO2−VO2 hat) calculated according to the equation (7) from the differential output VO2 acquired in each control cycle in STEP3 (see FIG. 8), and the identified differential output VO2 hat calculated in each control cycle in STEP5-4 is filtered with low-pass characteristics to calculate the identified error id/e.

This is because since the object exhaust system E including the catalytic converter 3 generally has low-pass characteristics, it is preferable to attach importance to the low-frequency behavior of the object exhaust system E in appropriately identifying the gain coefficients a1, a2, b1 of the exhaust system model.

Both the differential output VO2 and the identified differential output VO2 hat may be filtered with the same low-pass characteristics. For example, after the differential output VO2 and the identified differential output VO2 hat have separately been filtered, the equation (7) may be calculated to determine the identified error id/e. The above filtering is carried out by a moving average process which is a digital filtering process, for example.

After the identifier 25 has calculated the identified error id/e, the identifier 25 calculates a new identified gain coefficient vector E(k), i.e., new identified gain coefficients a1(k) hat, a2(k) hat, b1(k) hat, according to the equation (8) using the identified error id/e and Kθ calculated in SETP5-5 in STEP5-7.

After having calculated the new identified gain coefficients a1(k) hat, a2(k) hat, b1(k) hat, the identifier 25 further limits the values of the gain coefficients a1 hat, a2 hat, b1 hat (elements of the identified gain coefficient vector Θ), are limited to meet predetermined conditions in STEP5-8.

The predetermined conditions for limiting the values of the identified gain coefficients a1 hat, a2 hat, b1 hat include a condition (hereinafter referred to as a "first limiting condition") for limiting combinations of the values of the identified gain coefficients a1 hat, a2 hat relative to a predetermined combination, and a condition (hereinafter referred to as a "second limiting condition") for limiting the value of the identified gain coefficient b1 hat.

Prior to describing the first and second limiting conditions and the specific processing details of STEP5-8, the reasons for limiting the values of the identified gain coefficients a1 hat, a2 hat, b1 hat will be described below.

The inventors of the present invention have found that if the values of the identified gain coefficients a1 hat, a2 hat, b1 hat are not particularly limited, while the output signal VO2/OUT of the $O_2$ sensor 6 is being stably controlled at the target value VO2/TARGET, there are developed a situation in which the demand differential air-fuel ratio usl determined by the sliding mode controller 27 and the target air-fuel ratio KCMD change smoothly with time, and a situation in which the demand differential air-fuel ratio usl and the target air-fuel ratio KCMD oscillate with time at a high frequency. Neither of these situations poses problems in controlling the output VO2/OUT of the $O_2$ sensor 6 at the target value VO2/TARGET. However, the situation in which the target air-fuel ratio KCMD oscillates with time at a high frequency is not preferable in smoothly operating the internal combustion engine 1.

A study of the above phenomenon by the inventors has shown that whether the demand differential air-fuel ratio usl and the target air-fuel ratio KCMD change smoothly or oscillate at a high frequency is affected by the combinations of the values of the identified gain coefficients a1 hat, a2 hat identified by the identifier 25 and the value of the identified gain coefficient b1 hat.

In the present embodiment, the first and second limiting conditions are established appropriately, and the combinations of the values of the identified gain coefficients a1 hat, a2 hat and the value of the identified gain coefficient b1 hat are appropriately limited to eliminate the situation in which the target air-fuel ratio KCMD oscillates at a high frequency.

According to the present embodiment, the first and second limiting conditions are established as follows:

With respect to the first limiting condition for limiting the values of the identified gain coefficients a1 hat, a2 hat, the study by the inventors indicates that obtaining the demand differential air-fuel ratio usl and the target air-fuel ratio KCMD is closely related to combinations of the coefficient values α1, α2 in the equations (12)–(14) which are determined by the values of the gain coefficients a1, a2, i.e., the coefficient values α1, α2 used for the estimator 26 to determine the estimated differential output VO2(k+d) bar (the coefficient values α1, α2 are the first-row, first-column element and the first-row, second-column element of the matrix $A^d$ which is a power of the matrix A defined by the equation (12)).

Figure 11:
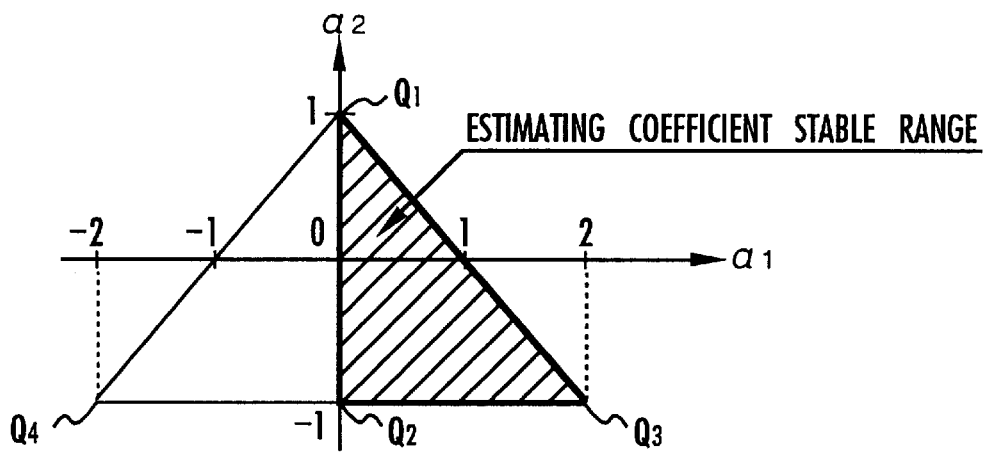
FIG. 11 is a diagram illustrative of partial processing of the flowchart shown in FIG. 10.

Specifically, as shown in FIG. 11, when a coordinate plane whose coordinate components are represented by the coefficient values α1, α2 is established, if a point on the coordinate plane which is determined by a combination of the coefficient values α1, α2 lies in a hatched range, which is surrounded by a triangle $Q_1Q_2Q_3$ (including the boundaries) and will hereinafter be referred to as an "estimating coefficient stable range", then the demand differential air-fuel ratio usl and the target air-fuel ratio KCMD tend to be smooth.

Therefore, the combinations of the values of the gain coefficients a1, a2 identified by the identifier 25, i.e., the combinations of the values of the identified gain coefficients a1 hat, a2 hat, should be limited such that the point on the coordinate plane shown in FIG. 11 which corresponds to the combination of the coefficient values α1, α2 determined by the values of the gain coefficients a1, a2 or the values of the identified gain coefficients a1 hat, a2 hat will lie within the estimating coefficient stable range.

In FIG. 11, a triangular range $Q_1Q_4Q_3$ on the coordinate plane which contains the estimating coefficient stable range is a range that determines combinations of the coefficient values α1, α2 which makes theoretically stable a system defined according to the following equation (40), i.e., a system defined by an equation similar to the equation (12) except that VO2(k), VO2(k−1) on the right side of the equation (12) are replaced respectively with VO2(k) bar, VO2(k−1) bar (VO2(k) bar, VO2(k−1) bar mean respectively an estimated differential output determined in each control cycle by the estimator 26 and an estimated differential output determined in a preceding cycle by the estimator 26).

$$\overline{VO2}(k+d) = \alpha1 \cdot \overline{VO2}(k) + \alpha2 \cdot \overline{VO2}(k-1) + \sum_{j=1}^{d} \beta_j \cdot kcmd(k-j) \quad (40)$$

The condition for the system defined according to the equation (40) to be stable is that a pole of the system (which is given by the following equation (41)) exists in a unit circle on a complex plane:

Pole of the system according to the equation (40)

$$= \frac{\alpha1 \pm \sqrt{\alpha1^2 + 4 \cdot \alpha2}}{2} \quad (41)$$

The triangular range $Q_1Q_4Q_3$ shown in FIG. 11 is a range for determining the combinations of the coefficient values α1, α2 which satisfy the above condition. Therefore, the estimating coefficient stable range is a range indicative of those combinations where α1≧0 of the combinations of the coefficient values α1, α2 which make stable the system defined by the equation (40).

Since the coefficient values α1, α2 are determined by a combination of the values of the gain coefficients a1, a2, a combination of the values of the gain coefficients a1, a2 is determined by a combination of the coefficient values α1, α2. Therefore, the estimating coefficient stable range shown in FIG. 11 which determines preferable combinations of the coefficient values α1, α2 can be converted into a range on a coordinate plane shown in FIG. 12 whose coordinate components are represented by the gain coefficients a1, a2. Specifically, the estimating coefficient stable range shown in FIG. 11 is converted into a range enclosed by the imaginary lines in FIG. 12, which is a substantially triangular range having an undulating lower side and will hereinafter be referred to as an "identifying coefficient stable range", on the coordinate plane shown in FIG. 12. Stated otherwise, when a point on the coordinate plane shown in FIG. 12 which is determined by a combination of the values of the gain coefficients a1, a2 resides in the identifying coefficient stable range, a point on the coordinate plane shown in FIG. 11 which corresponds to the combination of the coefficient values α1, α2 determined by those values of the gain coefficients a1, a2 resides in the estimating coefficient stable range.

Figure 12:
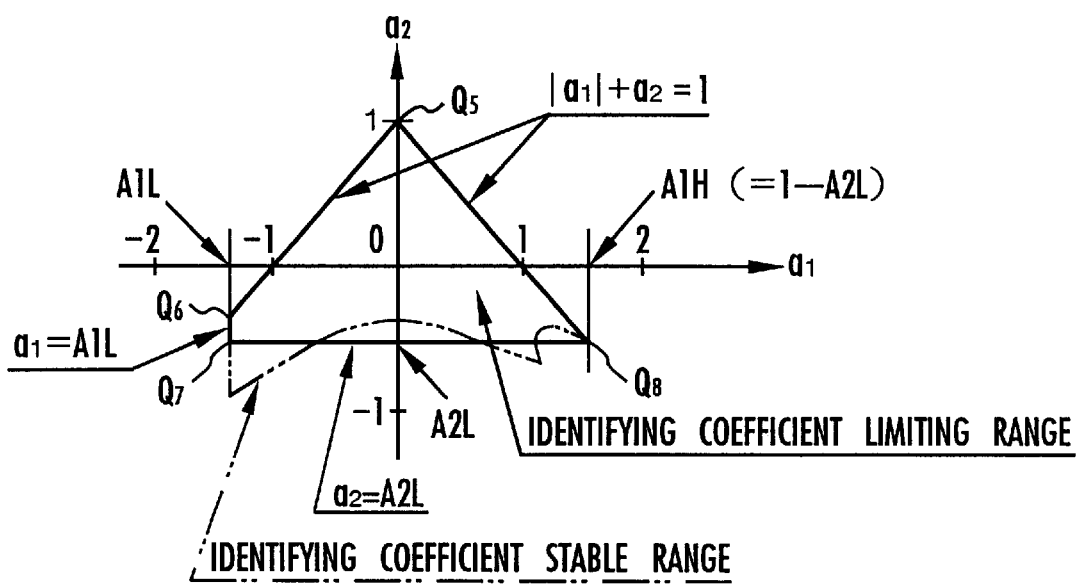
FIG. 12 is a diagram illustrative of partial processing of the flowchart shown in FIG. 10.

Consequently, the first limiting condition for limiting the values of the identified gain coefficients a1 hat, a2 hat determined by the identifier 25 should preferably be basically established such that a point on the coordinate plane shown in FIG. 12 which is determined by those values of the identified gain coefficients a1 hat, a2 hat reside in the identifying coefficient stable range.

However, since a boundary (lower side) of the identifying coefficient stable range indicated by the imaginary lines in FIG. 12 is of a complex undulating shape, a practical process for limiting the point on the coordinate plane shown in FIG. 12 which is determined by the values of the identified gain coefficients a1 hat, a2 hat is liable to be complex.

For this reason, according to the present embodiment, the identifying coefficient stable range is substantially approximated by a quadrangular range $Q_5Q_6Q_7Q_8$ enclosed by the solid lines in FIG. 12, which has straight boundaries and will hereinafter be referred to as an "identifying coefficient limiting range". As shown in FIG. 12, the identifying coefficient limiting range is a range enclosed by a polygonal line (including line segments $Q_5Q_6$ and $Q_5Q_8$) expressed by a functional expression $|a1|+a2=1$, a straight line (including a line segment $Q_6Q_7$) expressed by a constant-valued functional expression a1=A1L (A1L: constant), and a straight line (including a line segment $Q_7Q_8$) expressed by a constant-valued functional expression a2=A2L (A2L: constant). The first limiting condition for limiting the values of the identified gain coefficients a1 hat, a2 hat is established such that the point on the coordinate plane shown in FIG. 15 which is determined by those values of the identified gain coefficients a1 hat, a2 hat lies in the identifying coefficient limiting range. Although part of the lower side of the identifying coefficient limiting range deviates from the identifying coefficient stable range, it has experimentally been confirmed that the point determined by the identified gain coefficients a1 hat, a2 hat determined by the identifier 25 does not actually fall in the deviating range. Therefore, the deviating range will not pose any practical problem.

The above identifying coefficient limiting range is given for illustrative purpose only, and may be equal to or may substantially approximate the identifying coefficient stable range, or may be of any shape insofar as most or all of the identifying coefficient limiting range belongs to the identifying coefficient stable range. Thus, the identifying coefficient limiting range may be established in various configurations in view of the ease with which to limit the values of the identified gain coefficients a1 hat, a2 hat and the practical controllability.

For example, while the boundary of an upper portion of the identifying coefficient limiting range is defined by the functional expression $|a1|+a2=1$ in the illustrated embodiment, combinations of the values of the gain coefficients a1, a2 which satisfy this functional expression are combinations of theoretical stable limits where a pole of the system defined by the equation (41) exists on a unit circle on a complex plane. Therefore, the boundary of the upper portion of the identifying coefficient limiting range may be determined by a functional expression $|a1|+a2=r$ (r is a value slightly smaller than "1" corresponding to the stable limits, e.g., 0.99) for higher control stability.

The above identifying coefficient stable range shown in FIG. 12 as a basis for the identifying coefficient limiting range is given for illustrative purpose only. The identifying coefficient stable range which corresponds to the estimating coefficient stable range shown in FIG. 11 is affected by the dead time d (more precisely, its set value) and has its shape varied depending on the dead time d, as can be seen from the definition of the coefficient values α1, α2 (see the equation (12)). Irrespective of the shape of the identifying coefficient stable range, the identifying coefficient limiting range may be established, as described above, in a manner to match the shape of the identifying coefficient stable range.

In the present embodiment, the second limiting condition for limiting the value of the gain coefficient b1 identified by the identifier 25, i.e., the value of the identified gain coefficient b1 hat, is established as follows:

The inventors have found that the situation in which the time-depending change of the target air-fuel ratio KCMD is oscillatory at a high frequency tends to happen also when the value of the identified gain coefficient b1 hat is excessively large or small. According to the present embodiment, an upper limit value B1H and a lower limit value B1L (B1H>B1L>0) for the identified gain coefficient b1 hat are determined in advance through experimentation or simulation. Then, the second limiting condition is established such that the identified gain coefficient b1 hat is equal to or smaller than the upper limit value B1H and equal to or greater than the lower limit value B1L (B1L<b1hat≦B1H).

Figure 13:
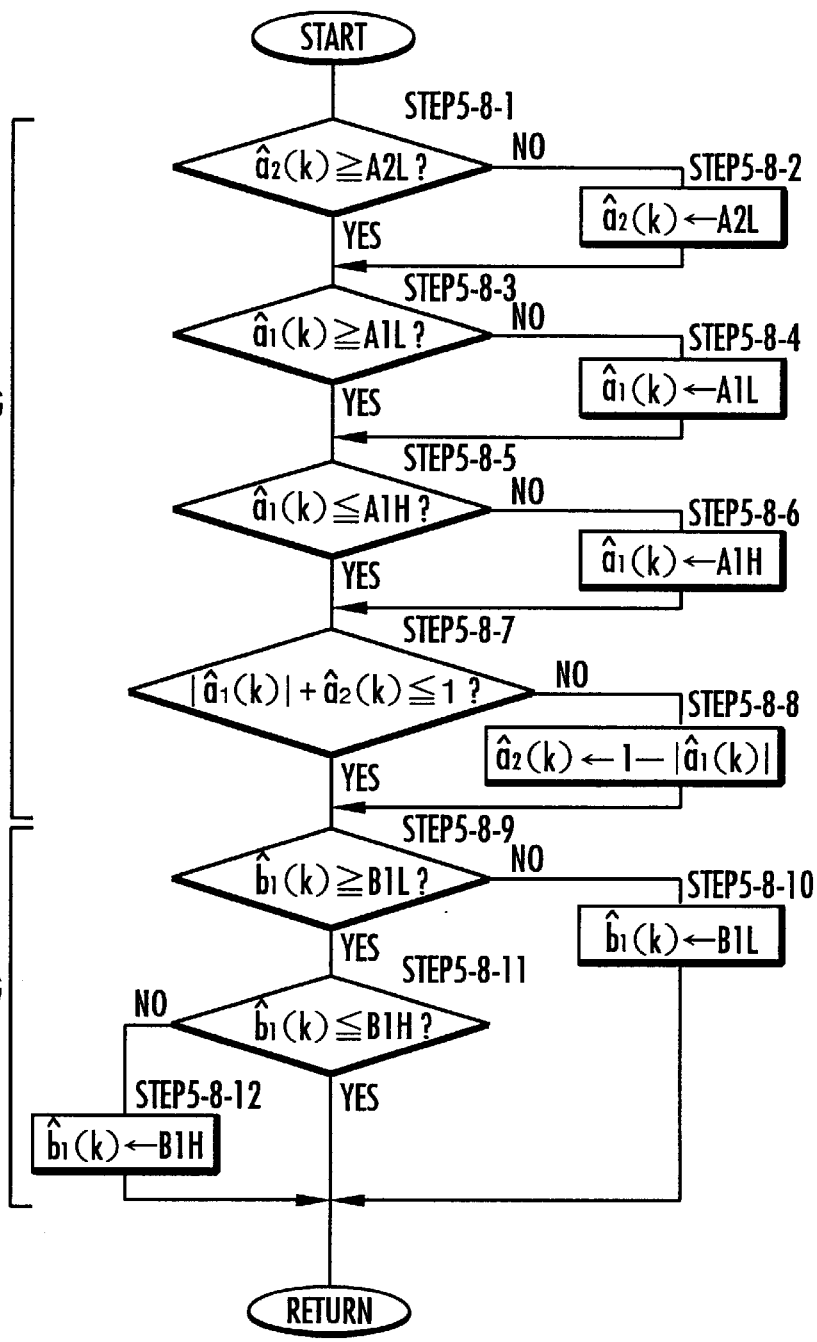
FIG. 13 is a flowchart of a subroutine of the flowchart shown in FIG. 10.

A process of limiting the values of the identified gain coefficients a1 hat, a2 hat, b1 hat according to the first and second limiting conditions is carried out by in STEP5-8 as follows:

As shown in FIG. 13, the identifier 25 limits combinations of the identified gain coefficients a1(k) hat, a2(k) hat determined in STEP5-7 shown in FIG. 10 according to the first limiting condition in STEP5-8-1 through STEP5-8-8.

Specifically, the identifier 25 decides whether or not the value of the identified gain coefficient a2(k) hat determined in STEP5-7 is equal to or greater than a lower limit value A2L (see FIG. 12) for the gain coefficient a2 in the identifying coefficient limiting range in STEP5-8-1.

If the value of the identified gain coefficient a2(k) is smaller than A2L, then since a point on the coordinate plane shown in FIG. 12, which is expressed by (a1(k) hat, a2(k) hat), determined by the combination of the values of the identified gain coefficients a1(k) hat, a2(k) hat does not reside in the identifying coefficient limiting range, the value of a2(k) hat is forcibly changed to the lower limit value A2L in STEP5-8-2. Thus, the point (a1(k) hat, a2(k) hat) on the coordinate plane shown in FIG. 12 is limited to a point in a region on and above a straight line, i.e., the straight line including the line segment $Q_7Q_8$, expressed by at least a2=A2L.

Then, the identifier 25 decides whether or not the value of the identified gain coefficient a1(k) hat determined in STEP5-7 is equal to or greater than a lower limit value A1L (see FIG. 12) for the gain coefficient a1 in the identifying coefficient limiting range in STEP5-8-3, and then decides whether or not the value of the identified gain coefficient a1(k) hat is equal to or smaller than an upper limit value A1H (see FIG. 12) for the gain coefficient a1 in the identifying coefficient limiting range in STEP5-8-5. The upper limit value A1H for the gain coefficient a1 in the identifying coefficient limiting range is represented by A1H=1−A2L because it is an a1 coordinate of the point $Q_8$ where the polygonal line $|a1|+a2=1$ (a1>0) and the straight line a2=A2L intersect with each other, as shown in FIG. 12.

If the value of the identified gain coefficient a1(k) hat is smaller than the lower limit value A1L or greater than the upper limit value A1H, then since the point (a1(k) hat, a2(k) hat) on the coordinate plane shown in FIG. 12 does not reside in the identifying coefficient limiting range, the value of a1(k) hat is forcibly changed to the lower limit value A1L or the upper limit value A1H in STEP5-8-4, STEP5-8-6.

Thus, the point (a1(k) hat, a2(k) hat) on the coordinate plane shown in FIG. 12 is limited to a region on and between a straight line, i.e., the straight line including the line segment $Q_6Q_7$, expressed by a1=A1L, and a straight line, i.e., the straight line passing through the point $Q_8$ and perpendicular to the a1 axis, expressed by a1=A1H.

The processing in STEP5-8-3 and STEP5-8-4 and the processing in STEP5-8-5 and STEP5-8-6 may be switched around. The processing in STEP5-8-1 and STEP5-8-2 may be carried out after the processing in STEP5-8-3 through STEP5-8-6.

Then, the identifier 25 decides whether the present values of a1(k) hat, a2(k) hat after STEP5-8-1 through STEP5-8-6 satisfy an inequality $|a1|+a2<1$ or not, i.e., whether the point (a1(k) hat, a2(k) hat) is positioned on or below or on or above the polygonal line (including line segments $Q_5Q_6$ and $Q_5Q_8$) expressed by the functional expression $|a1|+a2=1$ in STEP5-8-7.

If $|a1|+a2<1$, then the point (a1(k) hat, a2(k) hat) determined by the values of a1(k) hat, a2(k) hat after STEP5-8-1 through STEP5-8-6 exists in the identifying coefficient limiting range (including its boundaries).

If $|a1|+a2>1$, then since the point (a1(k) hat, a2(k) hat) deviates upwardly from the identifying coefficient limiting range, the value of the a2(k) hat is forcibly changed to a value $(1-|a1(k) hat|)$ depending on the value of a1(k) hat in STEP5-8-8. Stated otherwise, while the value of a1(k) hat is being kept unchanged, the point (a1(k) hat, a2(k) hat) is moved onto a polygonal line expressed by the functional expression $|a1|+a2=1$, i.e., onto the line segment $Q_5Q_6$ or the line segment $Q_5Q_8$ which is a boundary of the identifying coefficient limiting range.

Through the above processing in STEP5-8-1 through 5-8-8, the values of the identified gain coefficients a1(k) hat, a2(k) hat are limited such that the point (a1(k) hat, a2(k) hat) determined thereby resides in the identifying coefficient limiting range. If the point (a1(k) hat, a2(k) hat) corresponding to the values of the identified gain coefficients a1(k) hat, a2(k) hat that have been determined in STEP5-7 exists in the identifying coefficient limiting range, then those values of the identified gain coefficients a1(k) hat, a2(k) hat are maintained.

The value of the identified gain coefficient a1(k) hat relative to the primary autoregressive term of the discrete-system model is not forcibly changed insofar as the value resides between the lower limit value A1L and the upper limit value A1H of the identifying coefficient limiting range. If a1(k) hat<A1L or a1(k) hat>A1H, then since the value of the identified gain coefficient a1(k) hat is forcibly changed to the lower limit value A1L which is a minimum value that the gain coefficient a1 can take in the identifying coefficient limiting range or the upper limit value A1H which is a maximum value that the gain coefficient a1 can take in the identifying coefficient limiting range, the change in the value of the identified gain coefficient a1(k) hat is minimum. Stated otherwise, if the point (a1(k) hat, a2(k) hat) corresponding to the values of the identified gain coefficients a1(k) hat, a2(k) hat that have been determined in STEP5-7 deviates from the identifying coefficient limiting range, then the forced change in the value of the identified gain coefficient a1(k) hat is held to a minimum.

After having limited the values of the identified gain coefficients a1(k) hat, a2(k) hat, the identifier 25 limits the identified gain coefficient b1(k) hat according to the second limiting condition in STEP5-8-9 through STEP5-8-12.

Specifically, the identifier 25 decides whether or not the value of the identified gain coefficient b1(k) hat determined in STEP5-7 is equal to or greater than the lower limit value B1L in STEP5-8-9. If the lower limit value B1L is greater than the value of the identified gain coefficient b1(k) hat, the value of b1(k) hat is forcibly changed to the lower limit value B1L in STEP5-8-10.

The identifier 25 decides whether or not the value of the identified gain coefficient b1(k) hat is equal to or smaller than the upper limit value B1H in STEP5-8-11. If the upper limit value B1H is smaller than the value of the identified gain coefficient b1(k) hat, the value of b1(k) hat is forcibly changed to the upper limit value B1H in STEP5-8-12.

If $B1L \leq b1(k) hat \leq B1H$, then the value of the identified gain coefficient b1(k) is maintained as it is.

Through the above processing in STEP5-8-9 through 5-8-12, the value of the identified gain coefficient b1(k) hat is limited to a range between the lower limit value B1L and the upper limit value B1H.

After the identifier 25 has limited the combination of the values of the identified gain coefficients a1(k) hat, a2(k) hat and the identified gain coefficient b1(k) hat, control returns to the sequence shown in FIG. 10.

The preceding values a1(k−1) hat, a2(k−1) hat, b1(k−1) hat of the identified gain coefficients used for determining the identified gain coefficients a1(k) hat, a2(k) hat, b1(k) hat in STEP5-7 shown in FIG. 10 are the values of the identified gain coefficients limited according to the first and second limiting conditions in STEP5-8 in the preceding control cycle.

After having limited the identified gain coefficients a1(k) hat, a2(k) hat, b1(k) hat as described above, the identifier 25 updates the matrix P(k) according to the equation (10) for the processing of a next control cycle in STEP5-9, after which control returns to the main routine shown in FIG. 8.

The processing subroutine of STEP5 for the identifier 25 has been described above.

In FIG. 8, after the processing of the identifier 25 has been carried out, the target air-fuel ratio generator 28 determines the gain coefficients a1, a2, b1 in STEP6.

In STEP6, if the value of the flag f/id/cal set in STEP2 is "1", i.e., if the gain coefficients a1, a2, b1 have been identified by the identifier 25, then the values of the gain coefficients a1, a2, b1 are set to the identified gain coefficients a1 hat, a2 hat, b1 hat (limited in STEP5-8) determined by the identifier 25 in STEP5. If the value of the flag f/id/cal is "0", i.e., if the gain coefficients a1, a2, b1 have not been identified by the identifier 25, then the values of the gain coefficients a1, a2, b1 are set to predetermined values.

Then, the target air-fuel ratio generator 28 effects a processing operation of the estimator 26, i.e., calculates the estimated differential output VO2 bar, in STEP7 of the main routine shown in FIG. 8.

Figure 14:
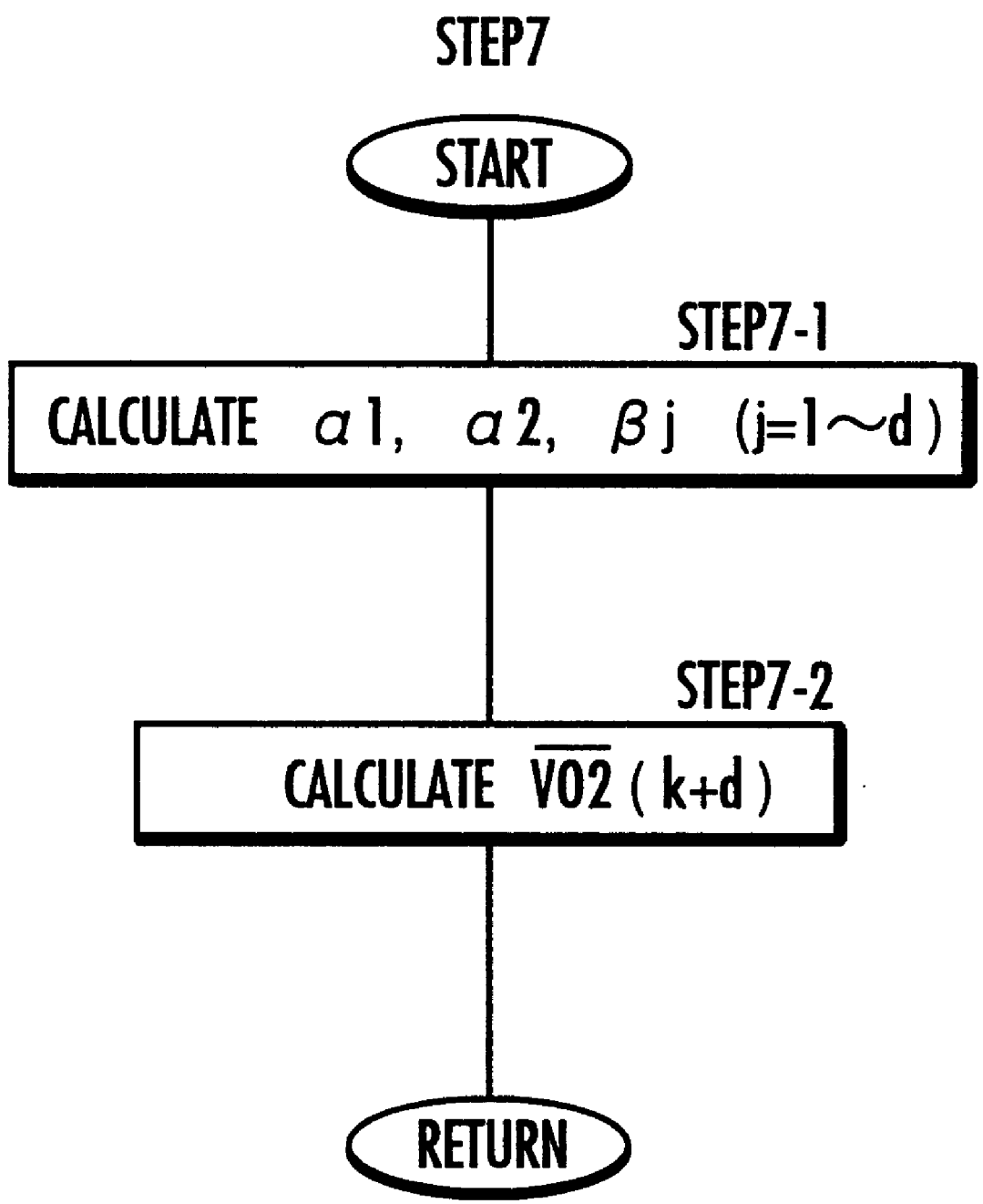
FIG. 14 is a flowchart of a subroutine of the flowchart shown in FIG. 8.

The calculating subroutine of STEP7 is shown in detail in FIG. 14. As shown in FIG. 14, the estimator 26 calculates the coefficients $\alpha 1$, $\alpha 2$, $\beta j$ (j=1–d) to be used in the equation (13), using the gain coefficients a1, a2, b1 determined in STEP6 (these values are basically the identified gain coefficients a1 hat, a2 hat, b1 hat which have been limited in STEP5-8 shown in FIG. 10) according to the definition accompanying the equation (12) in STEP7-1.

Then, in STEP7-2, the estimator 26 calculates the estimated differential output VO2(k+d) bar (estimated value of the differential output VO2 after the total dead time d from the time of the present control cycle) according to the equation (13), using the time-series data VO2(k), VO2(k−1), from before the present control cycle, of the differential output VO2 of the $O_2$ sensor calculated in each control cycle in STEP3 shown in FIG. 8, the time-series data kact(k−j) (j=0–d1), from before the present control cycle, of the differential output kact of the LAF sensor 5, the time-series data kcmd(k−j) (normally, kcmd(k−j)=usl(k−j) (j=1–d2−1), from before the preceding control cycle, of the command differential air-fuel ratio kcmd (=the demand differential air-fuel ratio usl as limited) determined in each control cycle by the limiter 30 as described later on, and the coefficients $\alpha 1$, $\alpha 2$, $\beta j$ calculated as described above.

Referring back to FIG. 8, the target air-fuel ratio generator 28 then calculates the demand differential air-fuel ratio usl with the sliding mode controller 27 in STEP8.

Figure 15:
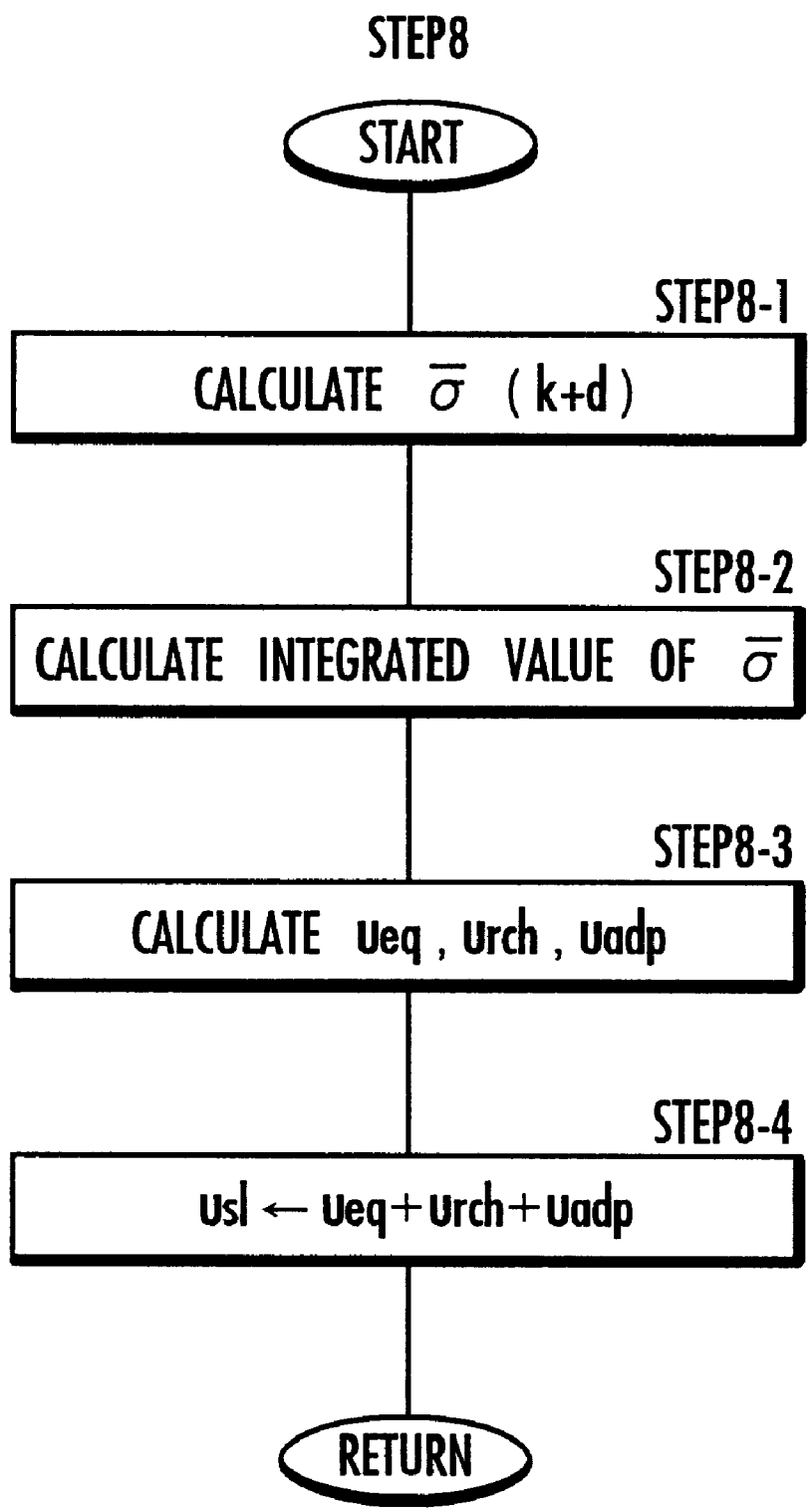
FIG. 15 is a flowchart of a subroutine of the flowchart shown in FIG. 8.

The calculating subroutine of STEP8 is shown in detail in FIG. 15.

As shown in FIG. 15, the sliding mode controller 27 calculates a value $\sigma(k+d)$ bar (corresponding to an estimated value, after the dead time d, of the switching function $\sigma$ defined according to the equation (15)), after the total dead time d from the present control cycle, of the switching function $\sigma$ bar defined according to the equation (25), using the time-series data VO2(k+d) bar, VO2(k+d−1) bar (present and preceding values of the estimated differential output VO2 bar) of the estimated differential output VO2 bar determined by the estimator 26 in STEP7 in STEP8-1.

If the switching function $\sigma$ bar is excessively large, then the value of the reaching control law input urch determined depending on the value of the switching function $\sigma$ bar becomes excessively large, causing the adaptive control law input uadp to change abruptly. Therefore, the demand differential air-fuel ratio usl determined by the sliding mode controller 27 and the target air-fuel ratio KCMD tends to become unstable. According to the present embodiment, the value of the switching function $\sigma$ bar is set to fall in a predetermined range, and if the value of the $\sigma$ bar determined according to the equation (25) exceeds an upper or lower limit of the predetermined range, then the value of the $\sigma$ bar is forcibly set to the upper or lower limit of the predetermined range.

Then, the sliding mode controller 27 accumulates values of the switching function $\sigma$ bar calculated in respective control cycles in STEP8-1 (more accurately, values produced when the value of the $\sigma$ bar is multiplied by the period (constant period) of the control cycles of the exhaust-side control unit 7a), i.e., adds a value of the $\sigma$ bar calculated in the present control cycle to the sum determined in the preceding control cycle, thereby calculating an integrated value of the $\sigma$ bar (which corresponds to the term at the right end of the equation (27)) in STEP8-2.

In order to prevent the adaptive control law input uadp determined depending on the integrated value of the $\sigma$ bar, the integrated value of the $\sigma$ bar is set to fall in a predetermined range, as with STEP8-1. Specifically, if the integrated value of the $\sigma$ bar exceeds an upper or lower limit of the predetermined range, then the integrated value of the $\sigma$ bar is limited to the upper or lower limit.

Then, the sliding mode controller 27 calculates the equivalent control input ueq, the reaching control law input urch, and the adaptive control law uadp according to the respective equations (24), (26), (27) in STEP8-3, using the time-series data VO2(k+d) bar, VO2(k+d−1) bar of the estimated differential output VO2 bar determined by the estimator 26 in STEP7, the value $\sigma(k+d)$ bar of the switching function and its integrated value which are determined respectively in STEP8-1 and STEP8-2, the gain coefficients a1, a1, b1 determined in STEP 6 (which are basically the gain coefficients a1 hat, a2 hat, b1 hat limited in STEP5-8 shown in FIG. 10).

The sliding mode controller 27 then adds the equivalent control input ueq, the reaching control law input urch, and the adaptive control law uadp determined in STEP8-3 to calculate an input to be applied to the object exhaust system E for converging the output signal VO2/OUT of the $O_2$ sensor 6 to the target value VO2/TARGET in STEP8-4.

The processing operation of the sliding mode controller 27 in STEP8 has been described above.

In FIG. 8, the target air-fuel ratio generator 28 carries out a process with the limiter 30. Prior to limiting the demand differential air-fuel ratio usl calculated by the sliding mode controller 27, the limiter 30 determines the stability of the status of the output signal VO2/OUT of the $O_2$ sensor 6 (the output status of the object exhaust system, hereinafter referred to as an "SLD control status") which is controlled according to the adaptive sliding mode control process carried out by the sliding mode controller 27 in STEP9.

A process of determining the stability will briefly be described prior to specifically describing the details of the process of determining the stability.

In the present embodiment, in each control cycle of the exhaust-side control unit 7a, the sliding mode controller 27 uses a difference $\Delta \sigma$ bar (corresponding to a rate of change of the value of the switching function $\sigma$ bar) between the present value $\sigma(k+d)$ bar of the switching function $\sigma$ bar calculated in STEP8-1 and a preceding value $\sigma(k+d-1)$ bar thereof in a preceding control cycle, and the product $\sigma(k+d)$ bar·$\Delta \sigma$ bar of the switching function $\sigma$ bar and the present value $\sigma(k+d)$ bar, as a basic parameter for determining the stability of the SLD control status (the product $\sigma(k+d)$ bar·$\Delta \sigma$ bar will hereinafter be referred to as a "stability determining basic parameter Pstb").

The stability determining basic parameter Pstb (=$\sigma(k+d)$ bar·$\Delta \sigma$ bar) corresponds to the time-differentiated function of a Lyapunov function $\sigma$ bar$^2$/2 relative to the switching function $\sigma$ bar. The state in which Pstb≦0 is basically a state in which the value of the switching function $\sigma$ bar is converged to or converging to "0" (the state quantity comprising the time-series data VO2(k+d) bar, VO2(k+d−1) bar of the estimated differential output VO2 bar is converged to or converging to the hyperplane $\sigma$ bar=0). The state in which Pstb>0 is basically a state in which the value of the switching function $\sigma$ bar is getting away from "0" (the state quantity comprising the time-series data VO2(k+d) bar, VO2(k+d−1) bar of the estimated differential output VO2 bar is getting away from the hyperplane $\sigma$ bar=0).

Therefore, it is possible to determined whether the SLD control status is stable or not based on whether or not the value of the stability determining basic parameter Pstb is equal to or smaller than "0".

However, if the stability of the SLD control status is determined solely by comparing the value of the stability determining basic parameter Pstb with "0", then any slight noise contained in the value of the σ bar will affect the determined result of the stability. Furthermore, if the determined result of the stability is established based on the value of the stability determining basic parameter Pstb in each control cycle, then the determined result tends to change frequently.

In this embodiment, in each control cycle of the exhaust-side control unit 7a, it is temporarily determined whether the SLD control status is stable or not based on whether or not the value of the stability determining basic parameter Pstb is equal or smaller than a predetermined value $\epsilon$ that is of a positive value slightly greater than "0". In addition, in a predetermined period longer than the control cycles of the exhaust-side control unit 7a, the frequency cnt/judst at which the SLD control status is temporarily determined as unstable based on the value of the stability determining basic parameter Pstb (more specifically, the number of control cycles in which Pstb>$\epsilon$ in the predetermined period, hereinafter referred to as a "temporarily unstable decision frequency cnt/judst") is measured. Whether the SLD control status is stable or not is determined by comparing the temporarily unstable decision frequency cnt/judst with predetermined thresholds.

In the present embodiment, the predetermined thresholds with which the temporarily unstable decision frequency cnt/judst is compared include a first threshold SSTB1 and a second threshold SSTB2 (SSTB1<SSTB2). If the temporarily unstable decision frequency cnt/judst is equal to or smaller than the first threshold SSTB1 (cnt/judst<SSTB1), then the SLD control status is determined as stable. If cnt/judst>SSTB1, then the SLD control status is determined as unstable. If the SLD control status is determined as unstable (cnt/judst>SSTB1), then when the temporarily unstable decision frequency cnt/judst is equal to or smaller than the second threshold SSTB2 (cnt/judst<SSTB2), the level of the instability of the SLD control status is determined as low (such a state will hereinafter be referred to as a "low-level unstable state"), and when cnt/judst>SSTB2, the level of the instability of the SLD control status is determined as high (such a state will hereinafter be referred to as a "high-level unstable state"). Thus, if the SLD control status is determined as unstable, then the level of the instability of the SLD control status is also determined depending on the value of the temporarily unstable decision frequency cnt/judst.

Based on the above principles of the determination of the stability of the SLD control status, the process of determining the stability of the SLD control status will be described in greater detail below.

Figure 16:
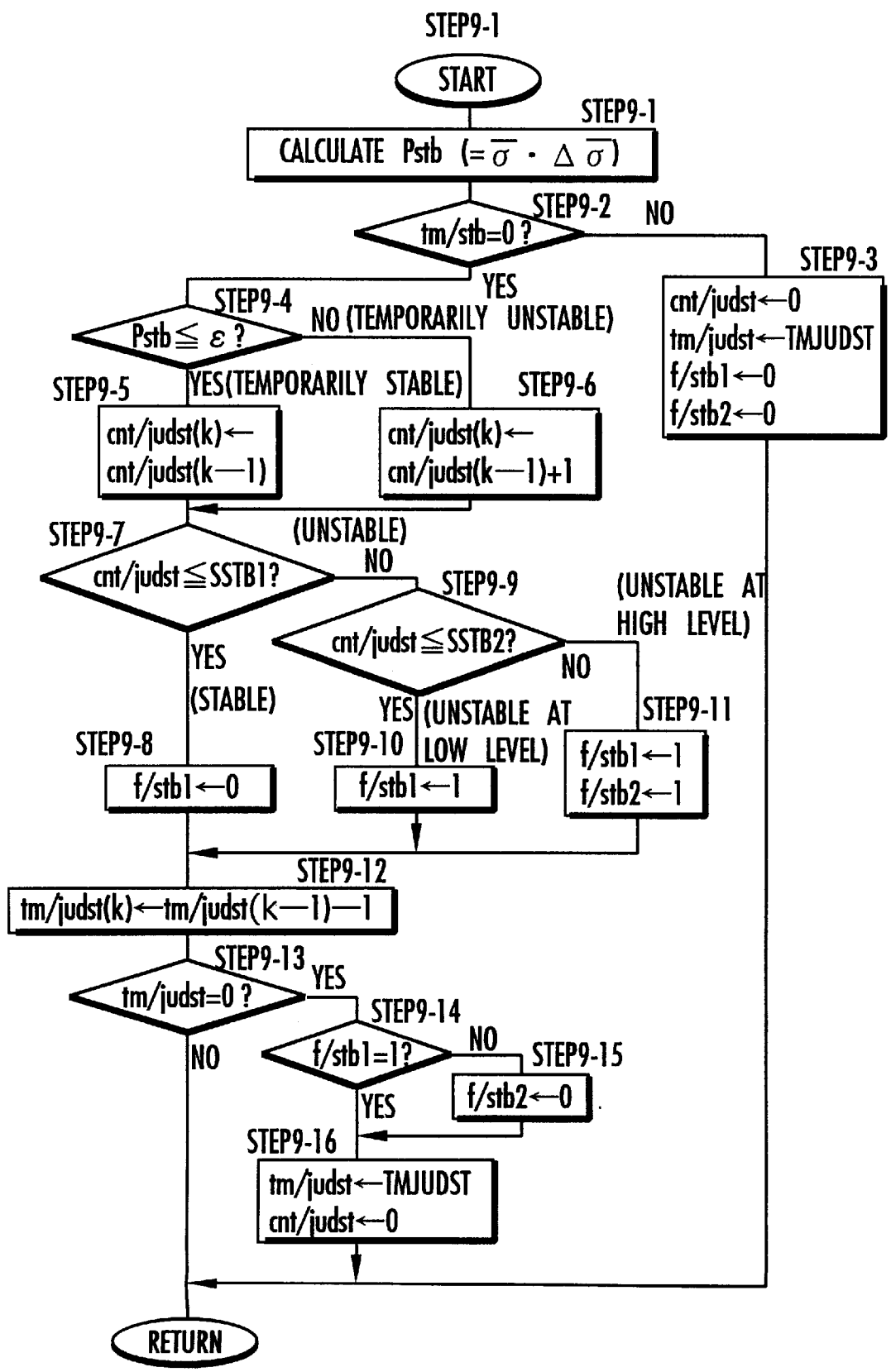
FIG. 16 is a flowchart of a subroutine of the flowchart shown in FIG. 8.

The process of determining the stability of the SLD control status is carried out according to a flowchart shown in FIG. 16.

The limiter 30 calculates the stability determining basic parameter Pstb (=σ(k+d) bar·Δσ bar) defined above from the present value σ(k+d) and the preceding value σ(k+d−1) of the switching function σ bar determined by the sliding mode controller 27 in STEP8-1 in STEP9-1 in FIG. 16.

Then, the limiter 30 determines whether the value of the timer counter tm/stb (count-down timer) initialized in STEPd-11 in FIG. 7 has become "0" or not, i.e., whether the time that has elapsed from the start of the manipulation of the air-fuel ratio of the internal combustion engine 1 based on the target air-fuel ratio KCMD generated by the target air-fuel ratio generator 28 (the control process for converging the output signal VO2/OUT from the $O_2$ sensor 6 to the target value VO2/TARGET, which may hereinafter be referred to as an "air-fuel ratio manipulation exhaust system output control process") has reached a predetermined time expressed by the initial value TMSTB of the timer counter tm/stb, in STEP9-2.

If tm/stb≠0, and hence the time that has elapsed from the start of the air-fuel ratio manipulation exhaust system output control process has not reached the predetermined time (:TMSTB) (immediately after start of the air-fuel ratio manipulation exhaust system output control process), then the stability of the SLD control status based on the measurement of the temporarily unstable decision frequency cnt/judst, etc. is not determined, and STEP9-3 is carried out, after which control returns to the main routine shown in FIG. 8.

In STEP9-3, the value of the timer counter tm/stb (count-down timer) for measuring the predetermined period in which to measure the temporarily unstable decision frequency cnt/judst is set to a predetermined initial value TMJUDST corresponding to the time of the predetermined period. In STEP9-3, the value of the temporarily unstable decision frequency cnt/judst is initialized to "0". In STEP9-3, moreover, the value of a flag f/stb1 which indicates whether the SLD control status is stable or not with "0" and "1", respectively, is initialized to "0", and the value of a flag f/stb2 which indicates whether the SLD control status is in the low-level unstable state or the high-level unstable state with "0" and "1", respectively, is initialized to "0".

If the value of the timer tm/stb is "0", and hence the time that has elapsed from the start of the air-fuel ratio manipulation exhaust system output control process has reached the predetermined time expressed by the initial value TMSTB of the timer tm/stb, then the limiter 30 compares the stability determining basic parameter Pstb with the predetermined value $\epsilon$ (>0) in STEP9-4. If Pstb≦$\epsilon$, then the SLD control status is regarded temporarily stable, and the value of the temporarily unstable decision frequency cnt/judst is maintained at its present value (preceding value) in STEP9-5. If Pstb>$\epsilon$, then the SLD control status is regarded as temporarily stable, and the value of the temporarily unstable decision frequency cnt/judst is incremented from the present value (preceding value) by "1" in STEP9-6.

Then, the limiter 30 compares the value of the temporarily unstable decision frequency cnt/judst determined in the present cycle in STEP9-5 or STEP9-6 with the first threshold SSTB1 in STEP9-7. If cnt/judst≦SSTB1, then the SLD control status is regarded as stable, and the flag f/stb1 (hereinafter referred to as a "stability decision flag f/stb1") is set to "0" in STEP9-8.

If cnt/judst>SSTB1 (the SLD control status is unstable), then the limit 30 compares the value of the temporarily unstable decision frequency cnt/judst with the second threshold SSTB2 in STEP9-9. If cnt/judst≦SSTB2, then the SLD control status is regarded as in the low-level unstable state, and the stability decision flag f/stb1 is set to "1" in STEP9-10. If cnt/judst>SSTB2, then the SLD control status is regarded as in the high-level unstable state, and the stability decision flag f/stb1 is set to "1" and the flag f/stb2 (hereinafter referred to as an "instability level decision flag f/stb2") is set to "1" in STEP9-11.

Then, the limiter 30 decrements the value of the timer counter tm/judst from the present value (preceding value) by "1" in STEP9-12, and thereafter determines whether the updated value of the timer counter tm/judst has reached "0"

or not, i.e., whether the predetermined period represented by the initial value TMJUDST of the timer counter tm/judst has elapsed or not, in STEP9-13.

If tm/judst≠0, and hence the predetermined period (:TMJUDST) has not elapsed (the timer counter tm/judst has not run out), then control returns to the main routine shown in FIG. 8.

If tm/judst=0, and hence the predetermined period (:TMJUDST) has elapsed (the timer counter tm/judst has run out), then the limiter 30 determines the value of the stability decision flag f/stb1 in STEP9-14. If f/stb1=1, then the value of the timer counter tm/judst is set to its initial value TMJUDST, and the value of the temporarily unstable decision frequency cnt/judst is reset to "0" in STEP9-16, after which control returns to the main routine shown in FIG. 8.

If f/stb1=0 in STEP9-14, i.e., if the SLD control status in the present control cycle is determined as stable, then the value of the instability level decision flag f/stb2 is reset to "0" in STEP9-15, and STEP9-16 is executed, after which control returns to the main routine shown in FIG. 8.

Figure 17:
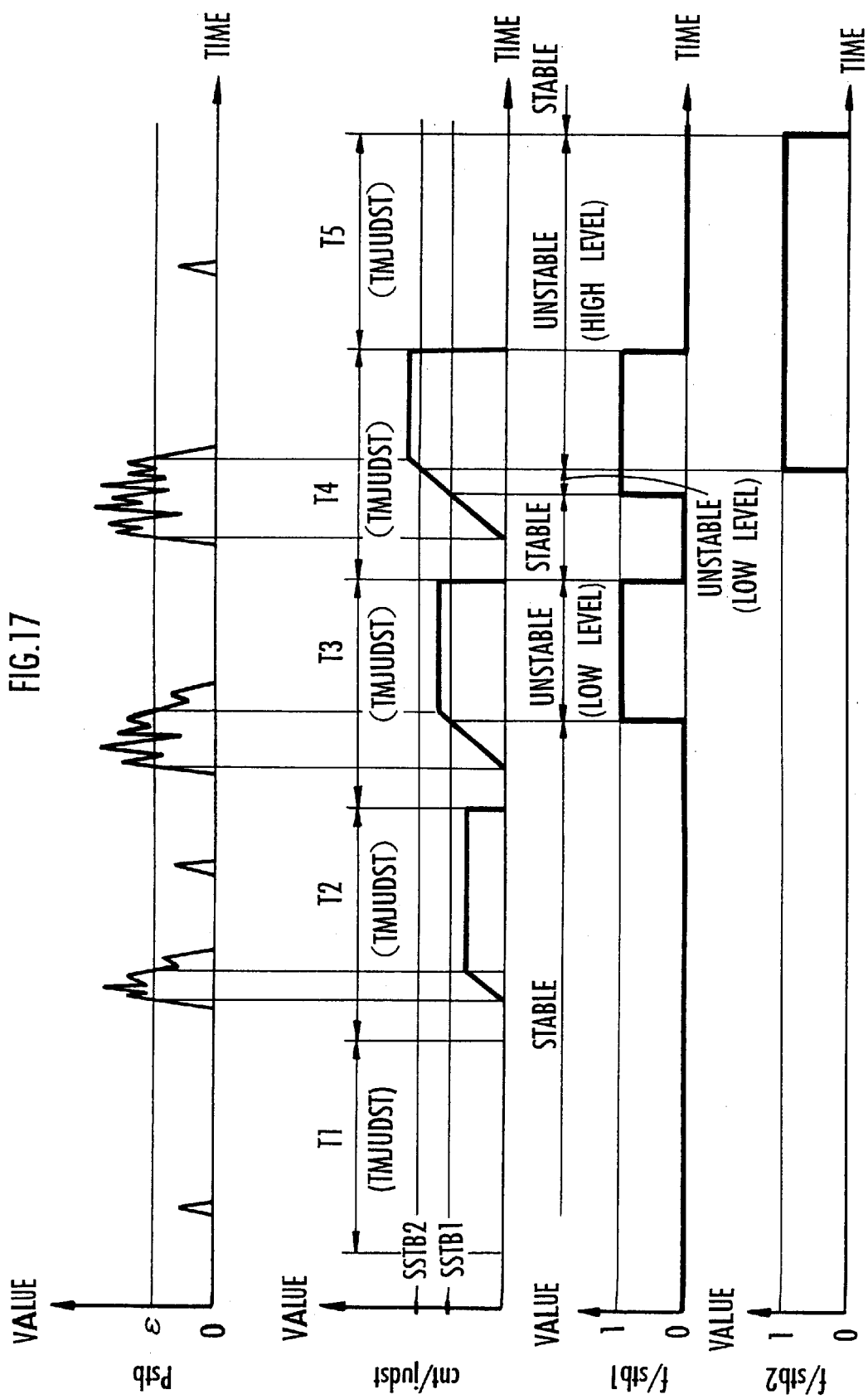
FIG. 17 is a diagram illustrative of the flowchart shown in FIG. 16.

The manner in which the values of the stability determining basic parameter Pstb, the temporarily unstable decision frequency cnt/judst, the stability decision flag f/stb1, and the instability level decision flag f/stb2 vary is illustrated respectively in first, second, third, and fourth stages of FIG. 17. In the first stage of FIG. 17, the value of the stability determining basic parameter Pstb is shown as being equal to or greater than "0". However, the stability determining basic parameter Pstb may actually be of a negative value.

As shown in FIG. 17, the temporarily unstable decision frequency cnt/judst, i.e., the frequency (the number of times) at which the value of the stability determining basic parameter Pstb is Pstb>ϵ, is measured in every predetermined period (:TMJUDST) and reset to "0" each time the predetermined period (:TMJUDST) elapses (see STEP9-16). As indicated in a period T1 or T2 in FIG. 17, if the value of the temporarily unstable decision frequency cnt/judst does not reach the first threshold SSTB1, i.e., if a situation in which the value of the stability determining basic parameter Pstb exceeds the predetermined value ϵ does not occur or occurs only temporarily, then the SLD control status is regarded as stable, and the value of the stability decision flag f/stb1 is set to "0" (see STEP9-7, STEP9-8).

As indicated in a period T3 in FIG. 17, if the situation in which the value of the stability determining basic parameter Pstb exceeds the predetermined value ϵ in the predetermined period continues for a certain time or occurs frequently, and the value of the temporarily unstable decision frequency cnt/judst exceeds the first threshold SSTB1, then the SLD control status is determined as in the low-level unstable state, and the value of the stability decision flag f/stb1 is set to "1" (see STEP9-9, STEP9-10). In this case, as the temporarily unstable decision frequency cnt/judst is reset in every predetermined period, the value of the stability decision flag f/stb1 is also reset to "0" in every predetermined period.

As indicated in a period T4 in FIG. 17, if the situation in which the value of the stability determining basic parameter Pstb exceeds the predetermined value ϵ in the predetermined period continues for a relatively long time or occurs frequently, and the value of the temporarily unstable decision frequency cnt/judst exceeds the second threshold SSTB2, then the SLD control status is determined as in the high-level unstable state, and the value of the stability decision flag f/stb1 is set to "1" and the value of the instability level decision flag f/stb2 is set to "1" (see STEP9-11). In this case, the value of the instability level decision flag f/stb2 is kept at "1" regardless of the value of the temporarily unstable decision frequency cnt/judst during a next predetermined period (period T5). Only if the value of the temporarily unstable decision frequency cnt/judst is continuously kept equal to or smaller than the first threshold SSTB1 and the value of the stability decision flag f/stb1 is kept at "0" during the next predetermined period (period T5), the instability level decision flag f/stb2 is reset to "0" at the end of the period T5 (STEP9-14, STEP9-15). Therefore, if the SLD control status is determined as in the high-level unstable state within a certain predetermined period, the value of the instability level decision flag f/stb2 is kept at "1" indicative of the high-level unstable state within a next predetermined period unless the value of the temporarily unstable decision frequency cnt/judst is continuously kept equal to or smaller than the first threshold SSTB1, so that the decision of the high-level unstable state essentially continues.

Referring back to FIG. 8, after the limiter 30 in the target air-fuel ratio generator 28 determines the stability of the SLD control status as described above, the limiter 30 limits the demand differential air-fuel ratio usl calculated by the sliding mode controller 27 in STEP8 to determine the command differential air-fuel ratio kcmd in STEP10.

Prior to specifically describing the limiting process in detail, allowable ranges used by the limiting process will be described below.

The limiting process carried out by the limiter 30 forcibly sets the command differential air-fuel ratio kcmd to an upper or lower limit of an allowable range if the demand differential air-fuel ratio usl deviates from the allowable range beyond the upper or lower limit thereof, in order to keep the command differential air-fuel ratio kcmd which defines the target air-fuel ratio KCMD to be finally given to the engine-side control unit 7b. If the demand differential air-fuel ratio usl falls in the allowable range, the limiting process sets up the demand differential air-fuel ratio usl directly as the command differential air-fuel ratio kcmd.

Figure 18:
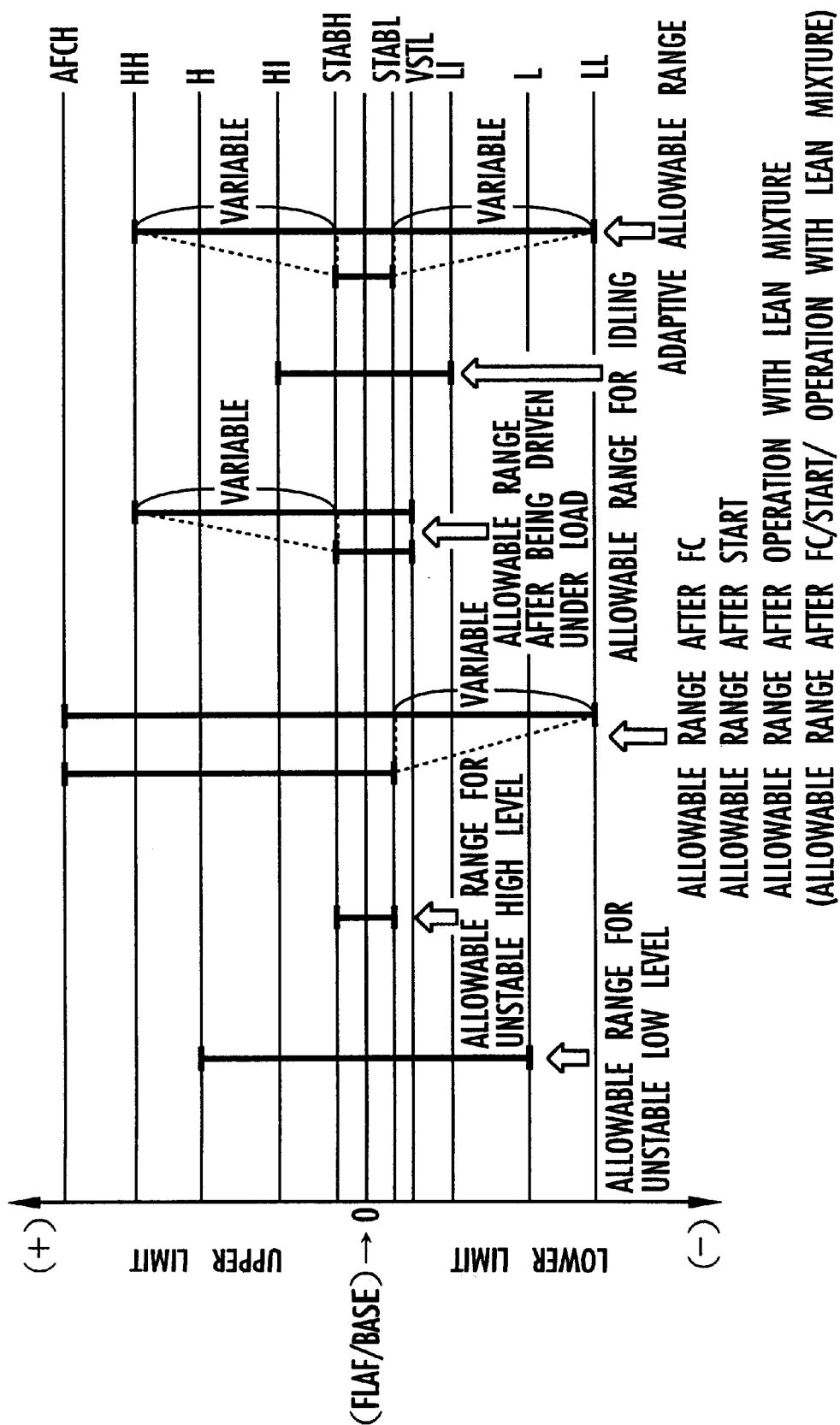
FIG. 18 is a diagram illustrative of an allowable range for a limiting process carried out in a subroutine of the flowchart shown in FIG. 8.

In the present embodiment, the limiting process uses a plurality of allowable ranges as shown in FIG. 18. Specifically, the allowable ranges include an allowable range for unstable low level used to limit the demand differential air-fuel ratio usl when the determined stability of the SLD control status represents the low-level unstable state (f/stb1=1 and f/stb2=0) (except when the internal combustion engine 1 is idling) in STEP9, and an allowable range for unstable high level used to limit the demand differential air-fuel ratio usl when the determined stability of the SLD control status represents the high-level unstable state (f/stb2=1).

The allowable ranges for the limiting process also include an allowable range after FC (fuel cut-off) used to limit the demand differential air-fuel ratio usl immediately after the fuel supply to the internal combustion engine 1 is cut off (specifically, until a predetermined time elapses after the fuel supply to the internal combustion engine 1 is cut off) except when the determined stability of the SLD control status represents the low-level unstable state or the high-level unstable state, an allowable range after start used to limit the demand differential air-fuel ratio usl immediately after the internal combustion engine 1 starts (more specifically, until a predetermined time elapses after the internal combustion engine 1 starts), and an allowable range after operation with lean mixture used to limit the demand differential air-fuel ratio usl immediately after the operation mode of the internal combustion engine 1 changes from the lean operation mode in which the air-fuel ratio of the internal combustion engine 1 is a lean ratio to the normal operation mode in which the air-fuel ratio manipulation exhaust system output control process is performed (specifically, until a predetermined time elapses after the lean operation mode is ended). In this embodiment, the allowable range after FC, the allowable range after start, and the allowable range after operation with lean mixture are identical allowable ranges, and will collectively be referred to as an allowable range after FC/start/operation with lean mixture.

The allowable ranges for limiting the demand differential air-fuel ratio usl further include an allowable range after being driven under load used to limit the demand differential air-fuel ratio usl immediately after a vehicle incorporating the internal combustion engine 1 starts (specifically, until a predetermined time elapses after the internal combustion engine 1 starts to operate drive wheels of the vehicle which serves as a load on the internal combustion engine 1), except when the determined stability of the SLD control status represents the low-level unstable state or the high-level unstable state, and except immediately after the fuel supply to the internal combustion engine 1 is cut off, or the internal combustion engine 1 starts, or the internal combustion engine 1 operates with lean mixture, and an allowable range idling used to limit the demand differential air-fuel ratio usl while the internal combustion engine 1 is idling, except when the determined stability of the SLD control status represents the high-level unstable state, and except immediately after the fuel supply to the internal combustion engine 1 is cut off, or the internal combustion engine 1 starts, or the internal combustion engine 1 operates with lean mixture.

The allowable ranges for limiting the demand differential air-fuel ratio usl also include an adaptive allowable range used to limit the demand differential air-fuel ratio usl while the internal combustion engine 1 is operates normally except those states corresponding to the above various allowable ranges.

The allowable range for unstable low level is a fixed allowable range with its upper and lower limits set respectively to predetermined fixed values H, L (the predetermined value H will hereinafter be referred to as an "upper-limit third predetermined value H" and the predetermined value L will hereinafter be referred to as a "lower-limit fourth predetermined value L"). The allowable range for unstable low level has a standard (intermediate) extent at the upper and lower limits thereof, among the various allowable ranges.

The allowable range for unstable high level is a fixed allowable range with its upper and lower limits set respectively to predetermined fixed values STABH, STABL (the predetermined value STABH will hereinafter be referred to as an "upper-limit first predetermined value STABH" and the predetermined value STABL will hereinafter be referred to as a "lower-limit first predetermined value STABL"). The allowable range for unstable high level has a narrowest extent at the upper and lower limits thereof, among the various allowable ranges.

The allowable range for idling is a fixed allowable range with its upper and lower limits set respectively to predetermined fixed values HI, LI (the predetermined value HI will hereinafter be referred to as an "upper-limit second predetermined value HI" and the predetermined value LI will hereinafter be referred to as a "lower-limit third predetermined value LI"). The allowable range for idling has a relatively narrow extent at the upper and lower limits thereof (narrower than the allowable range for unstable low level).

The allowable range after FC/start/operation with lean mixture is an allowable range with its upper limit set to a predetermined fixed value AFCH (hereinafter referred to as an "upper-limit fifth predetermined value AFCH") and its lower limit sequentially variable (in each control cycle) depending on how the demand differential air-fuel ratio usl deviates from the allowable range, between the lower-limit first predetermined value STABL and a predetermined value LL smaller than the lower-limit first predetermined value STABL (hereinafter referred to as a "lower-limit fifth predetermined value LL"). The lower limit of the allowable range after FC/start/operation with lean mixture is widest among the various allowable ranges. While the internal combustion engine 1 is idling, the lower limit of the allowable range after FC/start/operation with lean mixture is not variable, but set to the lower-limit third predetermined value LI which is the lower limit of the allowable range for idling.

The allowable range after being driven under load is an allowable range with its lower limit set to a predetermined fixed value VSTL (hereinafter referred to as a "lower-limit second predetermined value VSTL") and its upper limit sequentially variable (in each control cycle) depending on how the demand differential air-fuel ratio usl deviates from the allowable range, between the upper-limit first predetermined value STABH and a predetermined value HH larger than the upper-limit first predetermined value STABH (hereinafter referred to as an "upper-limit fourth predetermined value HH"). The lower limit of the allowable range after being driven under load is relatively narrow (narrower than the lower limit of the allowable range for idling).

The adaptive allowable range is an allowable range with its upper limit sequentially variable (in each control cycle) depending on how the demand differential air-fuel ratio usl deviates from the allowable range, between the upper-limit first predetermined value STABH and the upper-limit fourth predetermined value HH and its lower limit sequentially variable (in each control cycle) depending on how the demand differential air-fuel ratio usl deviates from the allowable range, between the lower-limit first predetermined value STABL and the lower-limit fifth predetermined value LL.

Since the demand differential air-fuel ratio usl to be limited to the various allowable ranges represents the difference between the air-fuel ratio of the internal combustion engine 1 and the air-fuel ratio reference value FLAF/BASE, the upper and lower limits of the allowable ranges represent differences with the air-fuel ratio reference value FLAF/BASE, i.e., positive and negative values with respect to the air-fuel ratio reference value FLAF/BASE represented as "0". The upper-limit first through fifth predetermined values STABH, HI, H, HH, AFCH are related in magnitude with each other as 0<STABH<HI<H<HH<AFCH as shown in FIG. 18. Similarly, the lower-limit first through fifth predetermined values STABL, VSTL, LI, L, LL are related in magnitude with each other as 0>STABL>VSTL>LI>L>LL as shown in FIG. 18.

In view of the above definition of the various allowable ranges, the limiting process in STEP10 will be described in specific detail below. The limiting process is carried out according to a flowchart shown in FIG. 19. An allowable range for the limiting process which is established in an idling state of the internal combustion engine 1, which allowable range is not limited to the above allowable range for idling, has an upper limit AHFI and a lower limit ALFI which will be referred to respectively as an idling upper limit AHFI and an idling lower limit ALFI. An allowable range for the limiting process which is established in an operating state of the internal combustion engine 1 except for the idling state has an upper limit AHF and a lower limit ALF which will be referred to respectively as a non-idling upper limit AHF and a non-idling lower limit ALF. The variable upper and lower limits of the adaptive allowable range will be referred to respectively as an adaptive upper limit ah and an adaptive lower limit al.

Figure 19:
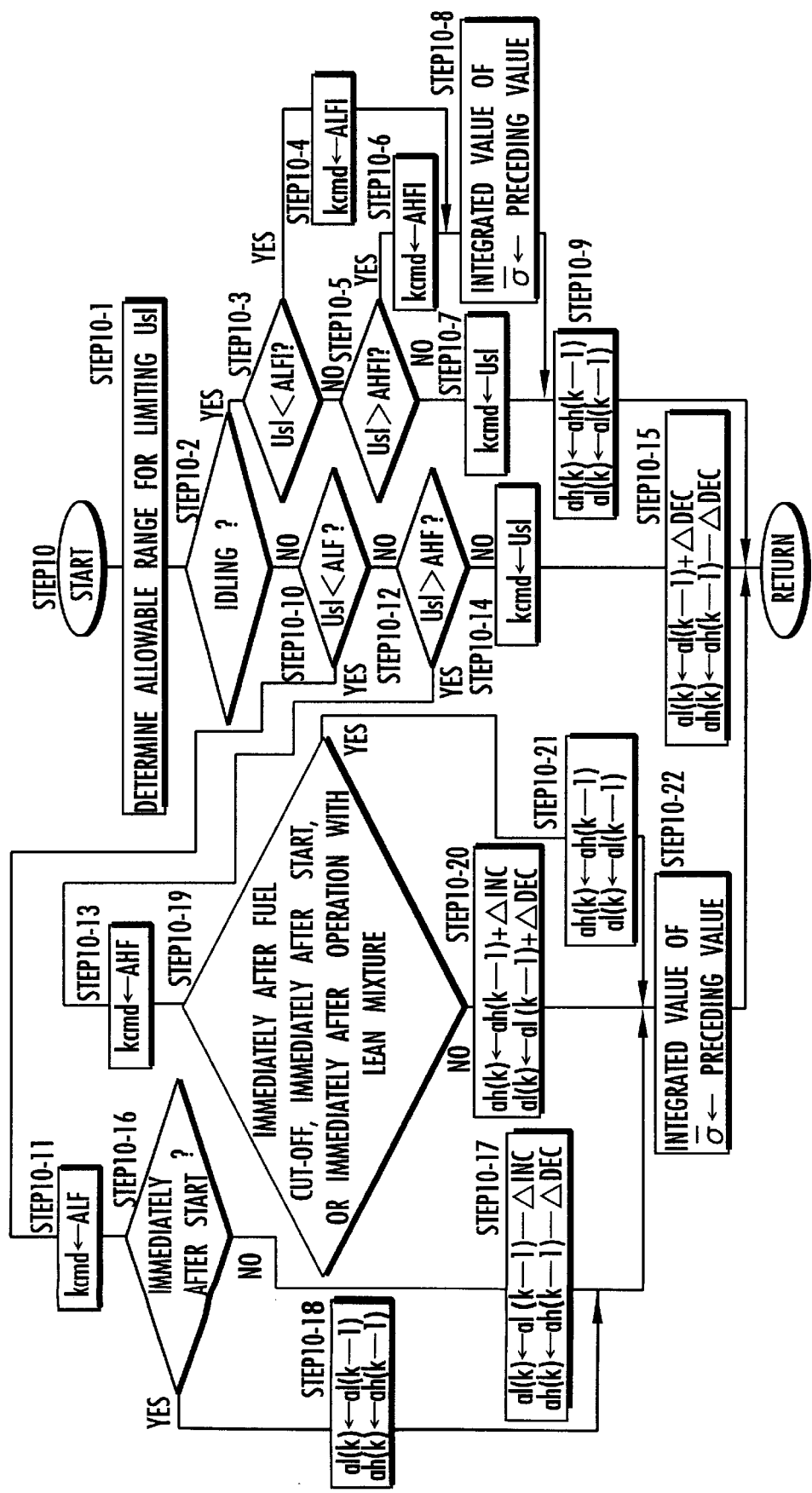
FIG. 19 is a flowchart of a subroutine of the flowchart shown in FIG. 8.

As shown in FIG. 19, the limiter 30 carries out a process of determining an allowable range for limiting the demand differential air-fuel ratio usl in the present cycle in STEP10-1.

Figure 20:
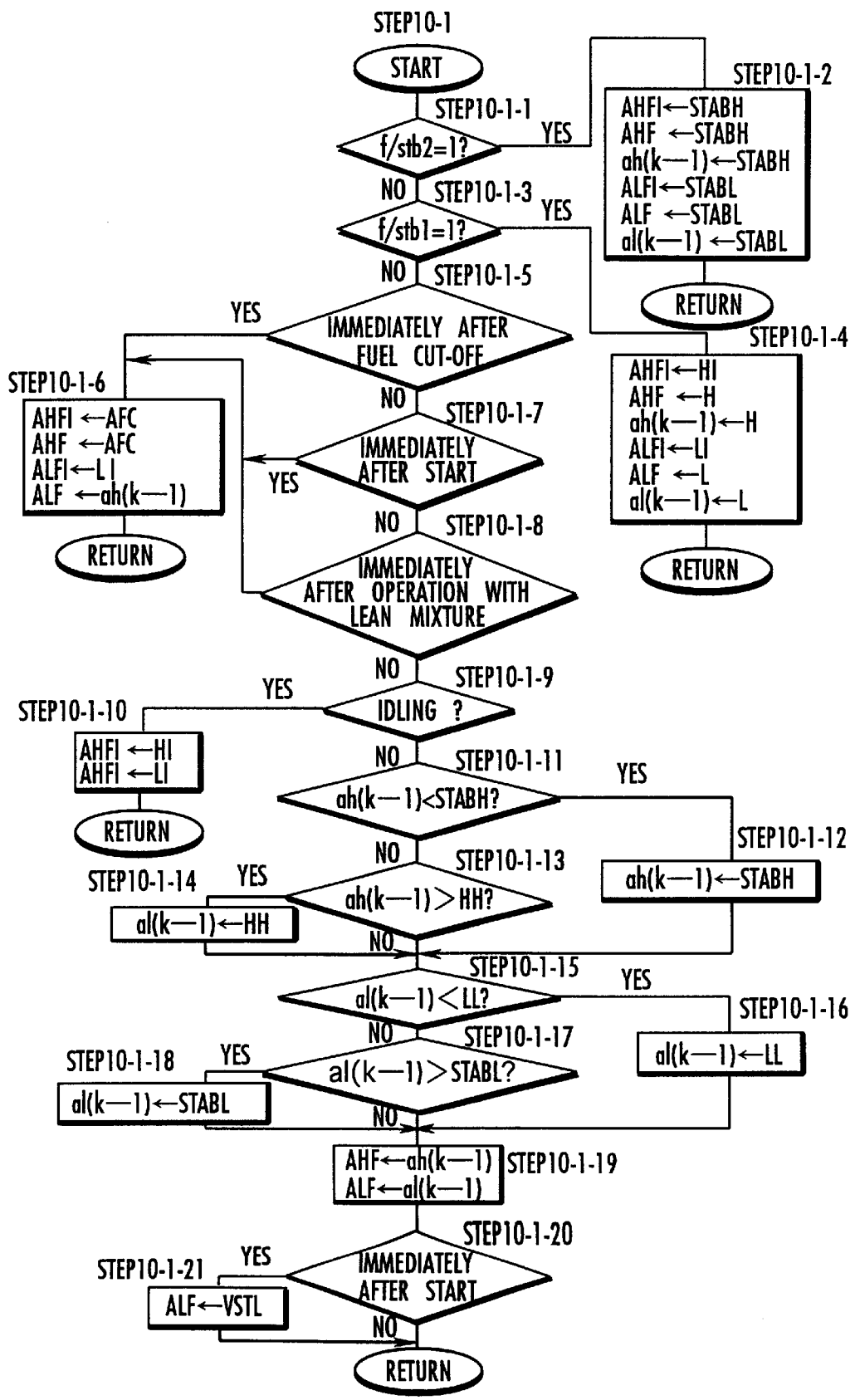
FIG. 20 is a flowchart of a subroutine of the flowchart shown in FIG. 19.

The process of determining an allowable range in STEP10-1 is performed according to a flowchart shown in FIG. 20.

First, the limiter 30 determines the value of the instability level decision flag f/stb2 established in the process of determining the stability of the SLD control status in STEP10-1-1. If f/stb2=1, i.e., if the SLD control status is in the high-level unstable state, then the limiter 30 sets the idling upper limit AHFI, the non-idling upper limit AHF, and the adaptive upper limit ah (more specifically, a present value ah(k−1) of the adaptive upper limit ah to the upper-limit first predetermined value STABH which is the upper limit of the allowable range for unstable high level (see FIG. 18), and also sets the idling lower limit ALFI, the non-idling lower limit ALF, and the adaptive lower limit al (more specifically, a present value al(k−1) of the adaptive lower limit al) to the lower-limit first predetermined value STABL which is the lower limit of the allowable range for unstable high level in STEP10-1-2. After STEP10-1-2, control returns to the routine shown in FIG. 19.

In STEP10-1-2, the allowable range for limiting the demand differential air-fuel ratio usl is set to the allowable range for unstable high level, i.e., the narrowest fixed allowable range, regardless of the operating state of the internal combustion engine 1. The adaptive allowable range which is made variable as described later on is initialized to the allowable range for unstable high level.

If f/stb2=0 in STEP10-1-1, then the limiter 30 determines the stability decision flag f/stb1 established in the process of determining the stability of the SLD control status in STEP10-1-3. If f/stb1=1, i.e., if the SLD control status is in the low-level unstable state, then the limiter 30 sets the idling upper limit AHFI to the upper-limit second predetermined value HI which is the upper limit of the idling allowable range (see FIG. 18) and also sets the idling lower limit ALFI to the lower-limit third predetermined value LI which is the lower limit of the idling allowable range in STEP10-1-4. In STEP10-1-4, the limiter 30 also sets the non-idling upper limit AHF and the present value ah(k−1) of the adaptive upper limit ah to the upper-limit third predetermined value H which is the fixed upper limit of the allowable range for unstable low level (see FIG. 18), and also sets the non-idling lower limit ALF and the adaptive lower limit al (al(k−1)) to the lower-limit fourth predetermined value L which is the fixed lower limit of the allowable range for unstable low level. After STEP10-1-4, control returns to the routine shown in FIG. 19.

In STEP10-1-4, the allowable range for limiting the demand differential air-fuel ratio usl is set to the allowable range for unstable low level (the fixed standard range) in an operating state of the internal combustion engine 1 except for the idling state, and set to the allowable range for idling (fixed narrow range) which is narrower than the allowable range for unstable low level in the idling state of the internal combustion engine 1. The adaptive allowable range is initialized to the allowable range for unstable low level.

If f/stb1=0 in STEP10-1-3, i.e., if the SLD control status is stable in STEP9, then the limiter 30 determines whether the internal combustion engine 1 is in a state immediately after the supply of fuel is cut off or not, i.e., whether the time that has elapsed after the end of the cutting-off of the supply of fuel has not reached a predetermined time or not, in STEP10-1-5.

The decision in STEP10-1-5 is carried out as follows: In this embodiment, data indicative of whether the supply of fuel to the internal combustion engine 1 is cut off or not is given from the engine-side control unit 7b to the exhaust-side control unit 7a. The limiter 30 activates a timer (not shown) from the time when it recognizes the end of the cutting-off of the supply of fuel based on the data, for thereby measuring the time that has elapsed from the time of the end of the cutting-off of the supply of fuel. The limiter 30 determines a period until the elapsed time reaches a predetermined time (fixed value) as the state immediately after the supply of fuel is cut off.

In this embodiment, while the supply of fuel is being cut off, the manipulation of the air-fuel ratio based on the target air-fuel ratio KCMD generated by the target air-fuel ratio generator 28, i.e., the control process of converging the output signal VO2/OUT from the $O_2$ sensor 6 to the target value VO2/TARGET, is not performed (see FIG. 7 showing details of STEPd in FIG. 6), but the processing in the target air-fuel ratio generator 28 for calculating the demand differential air-fuel ratio usl and the target air-fuel ratio KCMD is carried out. In the present embodiment, the state in which the supply of fuel to the internal combustion engine 1 is being cut off is determined as the state immediately after the supply of fuel is cut off.

If the internal combustion engine 1 is in the state immediately after the supply of fuel is cut off (including the state in which the supply of fuel to the internal combustion engine 1 is being cut off) in STEP10-1-5, then the limiter 30 sets the idling upper limit AHFI and a non-idling upper limit AHF to the upper-limit fifth predetermined value AFCH which is the upper limit of the allowable range after FC/start/operation with lean mixture (see FIG. 18) in STEP10-1-6. In STEP10-1-6, the limiter 30 also sets the idling lower limit ALFI to the lower-limit third predetermined value LI which is the lower limit of the allowable range for idling and sets the non-idling lower limit ALF to the present value of the adaptive lower limit al (the adaptive lower limit al(k−1) determined in the preceding control cycle). After STEP10-1-6, control goes back to the routine shown in FIG. 19.

In STEP10-1-6, the allowable range for limiting the demand differential air-fuel ratio usl is set to the allowable range after FC/start/operation with lean mixture whose lower limit is fixed to the lower-limit third predetermined value LI which is the lower limit of the allowable range for idling if the internal combustion engine 1 is in the idling state. If the internal combustion engine 1 is in an operating state other than the idling state, then the allowable range for limiting the demand differential air-fuel ratio usl is set to the allowable range after FC/start/operation with lean mixture whose lower limit is set to the sequentially variable adaptive lower limit al. At any rate, the allowable range for limiting the demand differential air-fuel ratio usl is set to a range which is widest at its upper limit, or more generally, a range whose upper limit is not lower than the upper-limit fifth predetermined value AFCH.

If the internal combustion engine 1 is not in the state immediately after the supply of fuel is cut off in STEP10-1-5, then the limiter 30 determines whether the internal combustion engine 1 is in a state immediately after it starts or not, i.e., whether the time that has elapsed after the start of the internal combustion engine 1 (more specifically, after the confirmation of the full fuel combustion in the internal combustion engine 1) does not reach a predetermined time or not, in STEP10-1-7.

In this case, data indicative of whether the internal combustion engine 1 starts or not, i.e., whether the full fuel combustion in the internal combustion engine 1 is confirmed or not, is given from the engine-side control unit 7b to the exhaust-side control unit 7a. The limiter 30 activates a timer (not shown) from the time when it recognizes the start of the internal combustion engine 1 based on the data, for thereby measuring the time that has elapsed from the start of the internal combustion engine 1. The limiter 30 determines a period until the elapsed time reaches a predetermined time (fixed value) as the state immediately after the internal combustion engine 1 starts.

If the internal combustion engine 1 is in the state immediately after it starts in STEP10-1-7, then the limiter 30 carries out STEP10-1-6 to set the idling upper limit AHFI, the non-idling upper limit AHF, the idling lower limit ALFI, and the non-idling lower limit ALF as described above, after which control returns to the routine shown in FIG. 19.

If the internal combustion engine 1 is not in the state immediately after it starts in STEP10-1-7, then the limiter 30 determines whether the internal combustion engine 1 is in a state immediately after the end of its lean operation mode or not, i.e., whether the time that has elapsed after the operation mode of the internal combustion engine 1 changes from the lean operation mode to the normal operation mode has reached a predetermined time or not, in STEP10-1-8.

In this case, data indicative of whether the internal combustion engine 1 is in the lean operation mode or not is given from the engine-side control unit 7b to the exhaust-side control unit 7a. The limiter 30 activates a timer (not shown) from the time when it recognizes the end of the lean operation mode based on the data, for thereby measuring the time that has elapsed from the start of the timer. The limiter 30 determines a period until the elapsed time reaches a predetermined time (fixed value) as the state immediately after the end of its lean operation mode, more specifically, the state immediately after the operation mode of the internal combustion engine 1 changes from the lean operation mode to the normal operation mode.

If the internal combustion engine 1 is in the state immediately after the end of its lean operation mode in STEP10-1-8, then the limiter 30 carries out STEP10-1-6 to set the idling upper limit AHFI, the non-idling upper limit AHF, the idling lower limit ALFI, and the non-idling lower limit ALF as described above, after which control returns to the routine shown in FIG. 19.

If the internal combustion engine 1 is not in the state immediately after the end of its lean operation mode in STEP10-1-8, then the limiter 30 determines whether the internal combustion engine 1 is in its idling state or not in STEP10-1-9.

In this case, data indicative of whether the internal combustion engine 1 is in its idling state or not is given from the engine-side control unit 7b to the exhaust-side control unit 7a. The limiter 30 determines whether the internal combustion engine 1 is in its idling state or not based on the data.

If the internal combustion engine 1 is in the idling state (at this time, the SLD control status is not in the low-level unstable state or the high-level unstable state, or the internal combustion engine 1 is not in the state immediately after the supply of fuel is cut off, or immediately after it starts, or immediately after the end of the lean operation mode), then the limiter 30 sets the idling upper limit AHFI to the upper-limit second predetermined value HI which is the upper limit of the allowable range for idling, and also sets the idling lower limit ALFI to the lower-limit third predetermined value LI which is the lower limit of the allowable range for idling in STEP10-1-10. Thereafter, control returns to the routine shown in FIG. 19.

In STEP10-1-10, the allowable range for limiting the demand differential air-fuel ratio usl is set to the fixed allowable range for idling.

If the internal combustion engine 1 is not in the idling state (at this time, the SLD control status is not in the low-level unstable state or the high-level unstable state, or the internal combustion engine 1 is not in the state immediately after the supply of fuel is cut off, or immediately after it starts, or immediately after the end of the lean operation mode, or the internal combustion engine 1 is not idling), then the limiter 30 performs a process of limiting the present value ah(k−1) (the value determined in the preceding control cycle) of the adaptive upper limit ah to a value in a range between the upper-limit first predetermined value STABH and the upper-limit fourth predetermined value HH (see FIG. 18), i.e., a process of limiting the adaptive upper limit ah, in STEP10-1-11 through STEP10-1-14 described below.

If the present value ah(k−1) of the adaptive upper limit ah is smaller than the upper-limit first predetermined value STABH in STEP10-1-11, then the limiter 30 sets the present value ah(k−1) forcibly to the upper-limit first predetermined value STABH in STEP10-1-12. If the present value ah(k−1) of the adaptive upper limit ah is greater than the upper-limit fourth predetermined value HH in STEP10-1-13, then the limiter 30 sets the present value ah(k−1) forcibly to the upper-limit fourth predetermined value HH in STEP10-1-14. Otherwise, the limiter 30 maintains the present value ah(k−1) of the adaptive upper limit ah.

Similarly, the limiter 30 perform a process of limiting the present value al(k−1) of the adaptive lower limit al to a value in a range between the lower-limit first predetermined value STABL and the lower-limit fifth predetermined value LL (see FIG. 18), i.e., a process of limiting the adaptive lower limit a1 in STEP10-1-15 through STEP10-1-18. The values al, STABL, LL are negative values.

After having limited the ranges for the present upper value ah(k−1) and the present lower value al(k−1), the limiter 30 sets the non-idling upper limit AHF and the non-idling lower limit ALF respectively to the adaptive upper limit ah(k−1) and the adaptive lower limit al(k−1) in STEP10-1-19.

The limiter 30 then determines whether the vehicle is in a state immediately after its start or not, i.e., whether the time that has elapsed after the internal combustion engine 1 starts to operate drive wheels of the vehicle which serves as a load on the internal combustion engine 1 has not reached a predetermined time or not, in STEP10-1-20.

The decision in STEP10-1-20 is carried out as follows: In the present embodiment, the data indicative of whether the internal combustion engine 1 is in the idling state and also data indicative of the speed of the vehicle are given from the engine-side control unit 7b to the exhaust-side control unit 7a. Based on these data, the limiter 30 recognizes a state in which the internal combustion engine 1 is idling and the vehicle speed is substantially "0", i.e., a parked or stopped state of the vehicle, and recognizes a start of the vehicle when the vehicle speed exceeds a predetermined value (sufficiently small value) from the parked or stopped state of the vehicle. The limiter 30 measures the time that has elapsed from the recognized start of the vehicle with a timer (not shown), and recognizes a period until the elapsed time reaches a predetermined time as the state immediately after the start of the vehicle.

If the vehicle is in the state immediately after its start in STEP10-1-20, then the limiter 30 sets the non-idling lower limit ALF to the lower-limit second predetermined value VSTL which is the lower limit of the allowable range after being driven under load (see FIG. 18) in STEP10-1-21, after which control returns to the routine shown in FIG. 19.

If the vehicle is not in the state immediately after its start in STEP10-1-20, then the limiter 30 maintains the non-idling upper limit AHF and the non-idling lower limit ALF established in STEP10-1-19, after which control returns to the routine shown in FIG. 19.

In STEP10-1-19 through STEP10-1-21, if the SLD control status is not in the low-level unstable state or the high-level unstable state, or the internal combustion engine 1 is not in the state immediately after the supply of fuel is cut off, or immediately after it starts, or immediately after the end of the lean operation mode, or the internal combustion engine 1 is not idling, and if the vehicle is not in the state immediately after its start (in a normal case), the allowable range for limiting the demand differential air-fuel ratio usl is set to the adaptive allowable range whose upper limit (adaptive upper limit ah) and lower limit (adaptive lower limit al) are sequentially varied, as described later on. If the vehicle is in the state immediately after its start, then the allowable range for limiting the demand differential air-fuel ratio usl is set to the allowable range after being driven under load, i.e., a range whose lower limit is relative narrow, or more generally, a range whose lower limit is not smaller than the lower-limit second predetermined value VSTL.

Referring back to FIG. 19, after the allowable range for limiting the demand differential air-fuel ratio usl has been determined, the limiter 30 determines whether the internal combustion engine 1 is in its idling state or not in STEP10-2.

If the internal combustion engine 1 is in its idling state, then the limiter 30 limits the demand differential air-fuel ratio usl to the allowable range (normally the allowable range for idling) determined by the idling upper limit AHFI and the idling lower limit ALFI which have been set in either one of STEP10-1-2, STEP10-1-4, STEP10-1-6, and STEP10-1-10 (normally STEP10-1-10), for thereby determining the command differential air-fuel ratio kcmd in STEP10-3 through STEP10-7.

Specifically, if the demand differential air-fuel ratio usl generated by the sliding mode controller 27 in STEP8 (see FIG. 8) deviates from the allowable range beyond the idling lower limit ALFI (negative) (usl<ALFI), then the limiter 30 limits the value of the demand differential air-fuel ratio usl to the idling lower limit ALFI in STEP10-3 and STEP10-4. If the demand differential air-fuel ratio usl deviates from the allowable range beyond the idling upper limit AHFI (positive) (usl>AHFI), then the limiter 30 limits the value of the demand differential air-fuel ratio usl to the idling upper limit AHFI in STEP10-5 and STEP10-6. If the demand differential air-fuel ratio usl falls in the allowable range (ALFI$\leq$usl$\leq$AHFI), then the limiter 30 sets the demand differential air-fuel ratio usl as the command differential air-fuel ratio kcmd in STEP10-7.

If the demand differential air-fuel ratio usl deviates from the allowable range between the idling upper limit AHFI and the idling lower limit ALFI in STEP10-3 or STEP10-5, then in order to prevent the value of the adaptive control law input uadp determined while the sliding mode controller 27 is generating the demand differential air-fuel ratio usl from becoming larger than necessary, the limiter 30 sets the integrated value of the switching function σ bar (see STEP8-2 in FIG. 15) forcibly to the integrated value determined in the preceding control cycle in STEP10-8. If the limiter 30 limits the demand differential air-fuel ratio usl while the internal combustion engine 1 is idling, the present values of the adaptive upper and lower limits ah, al are maintained in STEP10-9. After STEP10-3 through STEP10-9, control returns to the main routine shown in FIG. 8.

If the internal combustion engine 1 is not in its idling state, then the limiter 30 limits the demand differential air-fuel ratio usl to the allowable range (normally the adaptive allowable range) determined by the non-idling upper limit AHF and the non-idling lower limit ALF which have been set in either one of STEP10-1-2, STEP10-1-4, STEP10-1-6, STEP10-1-19, and STEP10-1-21 (normally STEP10-1-19), for thereby determining the command differential air-fuel ratio kcmd in STEP10-10 through STEP10-14.

Specifically, if the demand differential air-fuel ratio usl generated by the sliding mode controller 27 in STEP8 (see FIG. 8) deviates from the allowable range beyond the non-idling lower limit ALF (negative) (usl<ALF), then the limiter 30 limits the value of the demand differential air-fuel ratio usl to the non-idling lower limit ALF in STEP10-10 and STEP10-11. If the demand differential air-fuel ratio usl deviates from the allowable range beyond the non-idling upper limit AHF (positive) (usl>AHF), then the limiter 30 limits the value of the demand differential air-fuel ratio usl to the non-idling upper limit AHF in STEP10-12 and STEP10-13. If the demand differential air-fuel ratio usl falls in the allowable range (ALF$\leq$usl$\leq$AHF), then the limiter 30 sets the demand differential air-fuel ratio usl as the command differential air-fuel ratio kcmd in STEP10-14.

In case the demand differential air-fuel ratio usl is limited by the allowable range determined by the non-idling upper limit AHF and the non-idling lower limit ALF, the limiter 30 then updates (changes) the values of the adaptive upper and lower limits ah, al relative to the adaptive allowable range in STEP10-15 through STEP10-19.

Specifically, if the demand differential air-fuel ratio usl falls in the allowable range in STEP10-10 and STEP10-12, i.e., if STEP10-14 is executed, then the limiter 30 adds a predetermined change $\Delta$DEC (>0, hereinafter referred to as a "decreasing unit change $\Delta$DEC") to the present value al(k−1) of the adaptive lower limit al for thereby determining a new adaptive lower limit al(k) in STEP10-15. In STEP10-15, the limiter 30 also subtracts the decreasing unit change $\Delta$DEC from the present value ah(k−1) of the adaptive upper limit ah for thereby determining a new adaptive upper limit ah(k).

If the demand differential air-fuel ratio usl deviates from the allowable range beyond the non-idling lower limit ALF (negative), i.e., if STEP10-11 is executed, then the limiter 30 determines whether the vehicle is in a state immediately after its start or not in STEP10-16. If the vehicle is not in the state immediately after its start, then the limiter 30 subtracts a predetermined change $\Delta$INC (>0, hereinafter referred to as an "increasing unit change $\Delta$INC") from the present value al(k−1) of the adaptive lower limit al for thereby determining a new adaptive lower limit al(k) in STEP10-17. In STEP10-17, the limiter 30 also subtracts the decreasing unit change $\Delta$DEC from the present value ah(k−1) of the adaptive upper limit ah for thereby determining a new adaptive upper limit ah(k).

If the vehicle is in the state immediately after its start in STEP10-16, then the present values of the adaptive upper and lower limits ah, al are maintained in STEP10-18.

In the present embodiment, the decreasing unit change $\Delta$DEC and the increasing unit change $\Delta$INC are related to each other such that $\Delta$DEC<$\Delta$INC.

If the demand differential air-fuel ratio usl deviates from the allowable range beyond the non-idling upper limit AHF (positive), then the limiter 30 determines whether the internal combustion engine 1 is in the state immediately after the supply of fuel is cut off or not (including while the supply of fuel is being cut off or not), or whether the internal combustion engine 1 is in the state immediately after it starts or not, or whether the internal combustion engine 1 is in the state immediately after the end of its lean operation mode or not in STEP10-19. If the internal combustion engine 1 is not in any of these states, then the limiter 30 adds the increasing unit change $\Delta INC$ to the present value ah(k-1) of the adaptive upper limit ah for thereby determining a new adaptive upper limit ah(k) in STEP10-20. In STEP10-20, the limiter 30 also adds the decreasing unit change $\Delta DEC$ to the present value al(k-1) of the adaptive lower limit al for thereby determining a new adaptive lower limit al(k).

If the internal combustion engine 1 is in either one of the states in STEP10-19, then the present values of the adaptive upper and lower limits ah, al are maintained in STEP10-21.

If the demand differential air-fuel ratio usl deviates from the allowable range determined by the non-idling upper limit AHF and the non-idling lower limit ALF in STEP10-10 or STEP10-12, then the limiter 30 sets the integrated value of the switching function σ bar (see STEP8-2 in FIG. 15) forcibly to the integrated value determined in the preceding control cycle in STEP10-22. After STEP10-22, control returns to the main routine shown in FIG. 8.

In the present embodiment, the initial values of the adaptive upper and lower limits ah, al when the exhaust-side control unit 7a is activated, i.e., when the vehicle starts operating, are respectively the lower-limit fourth predetermined value L and the upper-limit third predetermined value H. That is, the initial range of the adaptive allowable range is the same as the allowable range for unstable low level.

In the present embodiment, if the SLD control status is in the low-level or high-level unstable state when the internal combustion engine 1 is in an operating state other than the idling state, the adaptive upper and lower limits ah, al are updated in STEP10-15, STEP10-17, STEP10-20. In the above unstable state, the adaptive upper and lower limits ah, al are forcibly set to fixed predetermined values, i.e., the upper-limit first predetermined value STABH, etc. corresponding to the allowable range for unstable low level and the allowable range for unstable high level, by the processing of STEP10-1-2 or STEP10-1-4 (see FIG. 20) in a next control cycle. Therefore, if the SLD control status is in the low-level or high-level unstable state, then the processing of STEP10-15, STEP10-17, STEP10-20 may be omitted.

The command differential air-fuel ratio kcmd determined in each control cycle by the limiting process in STEP10 is stored in a time-series fashion in a memory (not shown), and will be used for the above processing operation of the estimator 26.

According to the limiting process in STEP10, while the internal combustion engine 1 is in the idling state, either one of the fixed allowable ranges including the allowable range for unstable low level, the allowable range for unstable high level, the allowable range after FC/start/operation with lean mixture (specifically, the allowable range after FC/start/ operation with lean mixture whose lower limit is fixed to the lower-limit third predetermined value LI (see FIG. 18)), and the allowable range for idling, is established as the allowable range for limiting the demand differential air-fuel ratio usl (normally the allowable range for idling is established) depending on the SLD control status and the operating state of the internal combustion engine 1. The demand differential air-fuel ratio usl is limited by the established allowable range to determine the command differential air-fuel ratio kcmd.

When the internal combustion engine 1 is in an operating state other than the idling state, either one of the allowable ranges including the allowable range for unstable low level, the allowable range for unstable high level, the allowable range after FC/start/operation with lean mixture (specifically, the allowable range after FC/start/operation with lean mixture whose lower limit is set to the variable adaptive lower limit al), the allowable range after being driven under load, and the adaptive allowable range is established as the allowable range for limiting the demand differential air-fuel ratio usl (normally the adaptive allowable range is established) depending on the SLD control status and the operating state of the internal combustion engine 1. The demand differential air-fuel ratio usl is limited by the established allowable range to determine the command differential air-fuel ratio kcmd.

Regardless of whether the internal combustion engine 1 is in an operating state other than the idling state or in the idling state, when the determined stability of the SLD control status is in the high-level unstable state, the allowable range for limiting the demand differential air-fuel ratio usl is set to the narrowest allowable range for unstable high level whose upper limit AHF or AHFI and lower limit ALF or ALFI are set respectively to the fixed upper-limit first predetermined value STABH and the fixed lower-limit first predetermined value STABL in STEP10-1-2.

If the SLD control status is in the low-level unstable state and the internal combustion engine 1 is in an operating state other than the idling state, then the allowable range for limiting the demand differential air-fuel ratio usl is set to the allowable range for unstable low level, which has a standard extent, whose upper and lower limits AHF, ALF are set respectively to the upper-limit third predetermined value H and the lower-limit fourth predetermined value L in STEP10-1-4.

If the SLD control status is not in the high-level unstable state, or the internal combustion engine 1 is not in the state immediately after the supply of fuel is cut off, or immediately after it starts, or immediately after the end of the lean operation mode, or the vehicle is not in the state immediately after it starts, and the internal combustion engine 1 is in the idling state, then the allowable range for limiting the demand differential air-fuel ratio usl is set to the relatively narrow allowable range for idling whose upper and lower limits AHFI, ALFI are set respectively to the fixed upper-limit second predetermined value HI and the fixed lower-limit third predetermined value LI in STEP10-1-4, STEP10-1-10.

If in the normal state, i.e., if the SLD control status is not in the high-level unstable state or in the low-level unstable state, or the internal combustion engine 1 is not in the state immediately after the supply of fuel is cut off, or immediately after it starts, or immediately after the end of the lean operation mode, or not in the idling state, or the vehicle is not in the state immediately after it starts, then the allowable range for limiting the demand differential air-fuel ratio usl is set to the adaptive allowable range whose upper and lower limits AHF, ALF are set respectively to the adaptive upper and lower limits ah, al in STEP10-1-19.

In the adaptive allowable range, if the demand differential air-fuel ratio usl is in the adaptive allowable range (at this time, kcmd=usl), then after the limiting process, the adaptive upper and lower limits ah, al of the adaptive allowable range are updated in such a direction that they decrease by the decreasing unit change $\Delta DEC$ in each control cycle to respective limits provided by the upper-limit first predetermined value STABH and the lower-limit first predetermined value STABL in STEP10-15.

If the demand differential air-fuel ratio usl deviates from the adaptive allowable range beyond the upper limit thereof (at this time, kcmd=ah(k−1), then after the limiting process, the adaptive upper limit ah is updated in such a direction that the upper limit of the adaptive allowable range increases, by the increasing unit change ΔINC in each control cycle to a limit provided by the upper-limit fourth predetermined value HH in STEP10-20. At the same time, the adaptive lower limit a1 is updated in such a direction that the lower limit of the adaptive allowable range decreases, by the decreasing unit change ΔDEC in each control cycle to a limit provided by the lower-limit first predetermined value STABL.

Similarly, if the demand differential air-fuel ratio usl deviates from the adaptive allowable range beyond the lower limit thereof (at this time, kcmd=al(k−1), then after the limiting process, the adaptive lower limit al is updated in such a direction that the lower limit of the adaptive allowable range increases, by the increasing unit change ΔINC in each control cycle to a limit provided by the lower-limit fifth predetermined value LL in STEP10-17. At the same time, the adaptive upper limit ah is updated in such a direction that the upper limit of the adaptive allowable range decreases, by the decreasing unit change ΔDEC in each control cycle to a limit provided by the upper-limit first predetermined value STABH.

Figure 21:
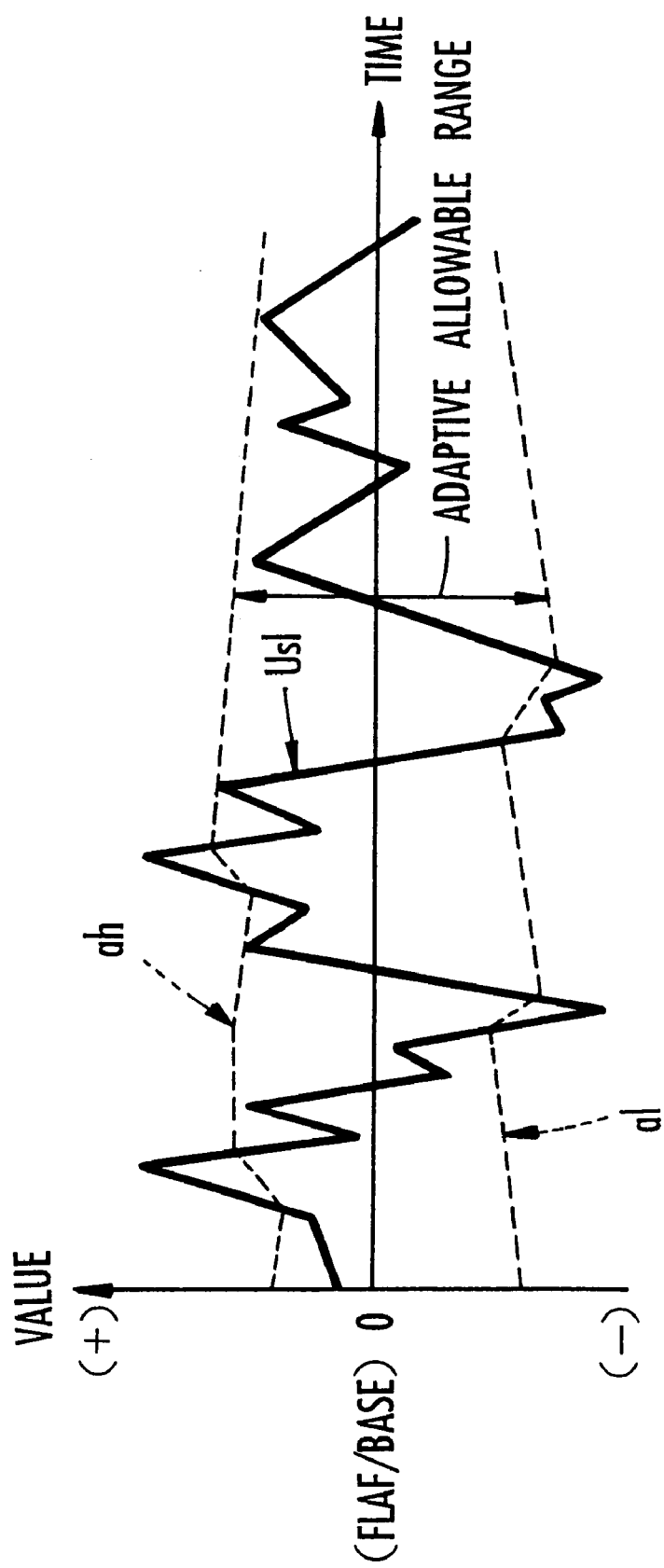
FIG. 21 is a diagram illustrative of the flowchart shown FIG. 19.

The manner in which the adaptive allowable range thus changes with time and also the manner in which the demand differential air-fuel ratio usl changes with time are illustrated in FIG. 21. As shown in FIG. 21, when the demand differential air-fuel ratio usl lies in the adaptive allowable range (al<usl<ah), both the adaptive upper and lower limits ah, al are updated in such a direction that the adaptive allowable range decreases, for thereby progressively reducing the upper and lower limits of the adaptive allowable range.

If the demand differential air-fuel ratio usl deviates from the adaptive allowable range beyond either one of the adaptive upper and lower limits ah, al (usl>ah or usl<al), one of the adaptive upper and lower limits ah, al beyond which the demand differential air-fuel ratio usl deviates is updated in such a direction that the adaptive allowable range increases, and hence progressively increases. At the same time, the other of the adaptive upper and lower limits ah, al is updated in such a direction that the adaptive allowable range decreases, and hence progressively decreases.

Except when the SLD control status is in the high-level unstable state or in the low-level unstable state, if the internal combustion engine 1 is in the state immediately after the supply of fuel is cut off, or immediately after it starts, or immediately after the end of the lean operation mode, then the allowable range for limiting the demand differential air-fuel ratio usl is set to the allowable range after FC/start/operation with lean mixture, i.e., the allowable range whose upper limit is widest, whose upper limit AHF or AHFI is set to the fixed upper-limit fifth predetermined value AFCH. Thus, the upper limit AHF or AHFI is inhibited from having a value beyond the upper-limit fifth predetermined value AFCH in the direction to reduce the allowable range in STEP10-1-6.

In the allowable range after FC/start/operation with lean mixture, if the internal combustion engine 1 is in the idling state, then the lower limit ALFI is set to the fixed lower-limit third predetermined value LI which is the lower limit of the allowable range for idling. If the internal combustion engine 1 is in an operating state other than the idling state, then the lower limit ALFI of the allowable range after FC/start/ operation with lean mixture is set to the variable adaptive lower limit al. The lower limit ALF (=al) is updated in each control cycle exactly in the same manner as the adaptive lower limit al of the adaptive allowable range depending on how the demand differential air-fuel ratio usl deviates from the allowable range after FC/start/operation with lean mixture, except when the demand differential air-fuel ratio usl deviates from the allowable range after FC/start/ operation with lean mixture beyond its upper limit in STEP10-15, STEP10-17, STEP10-21.

Figure 22:
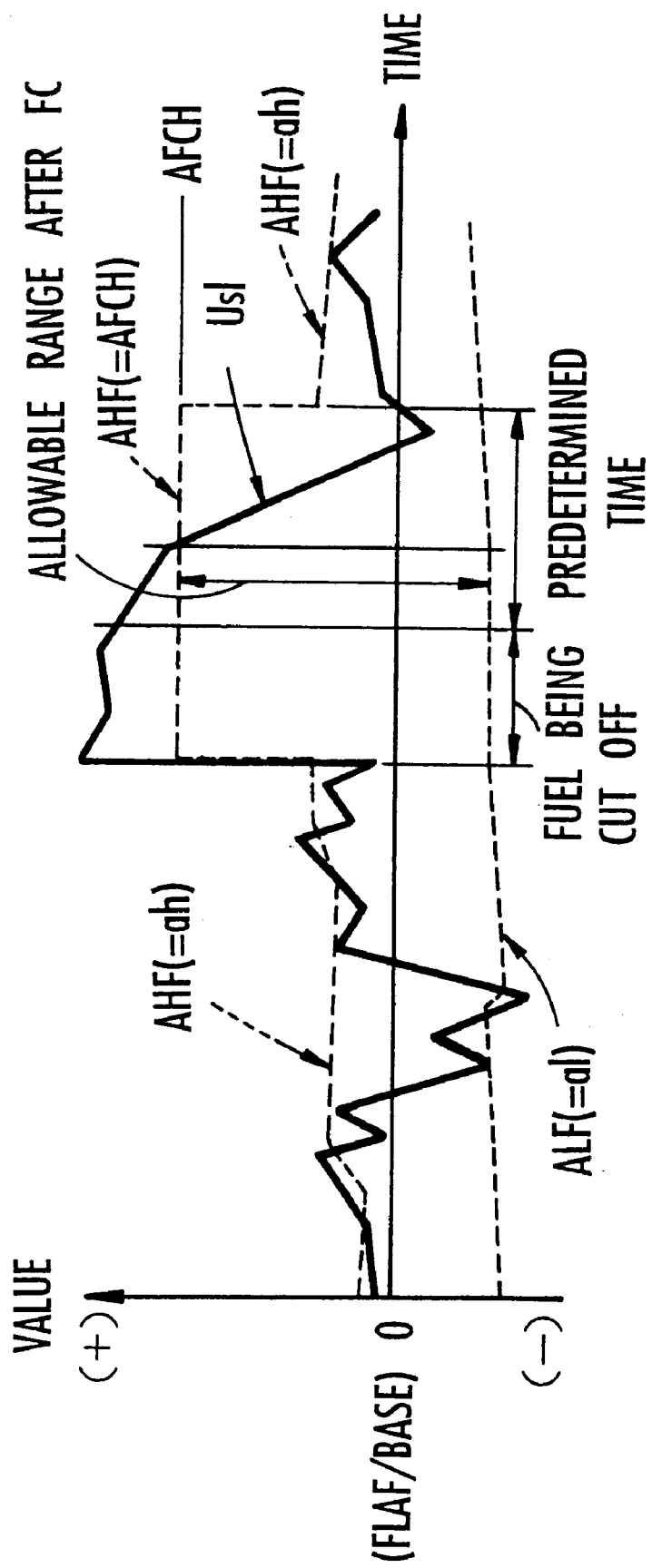
FIG. 22 is a diagram illustrative of the flowchart shown FIG. 19.
Figure 23:
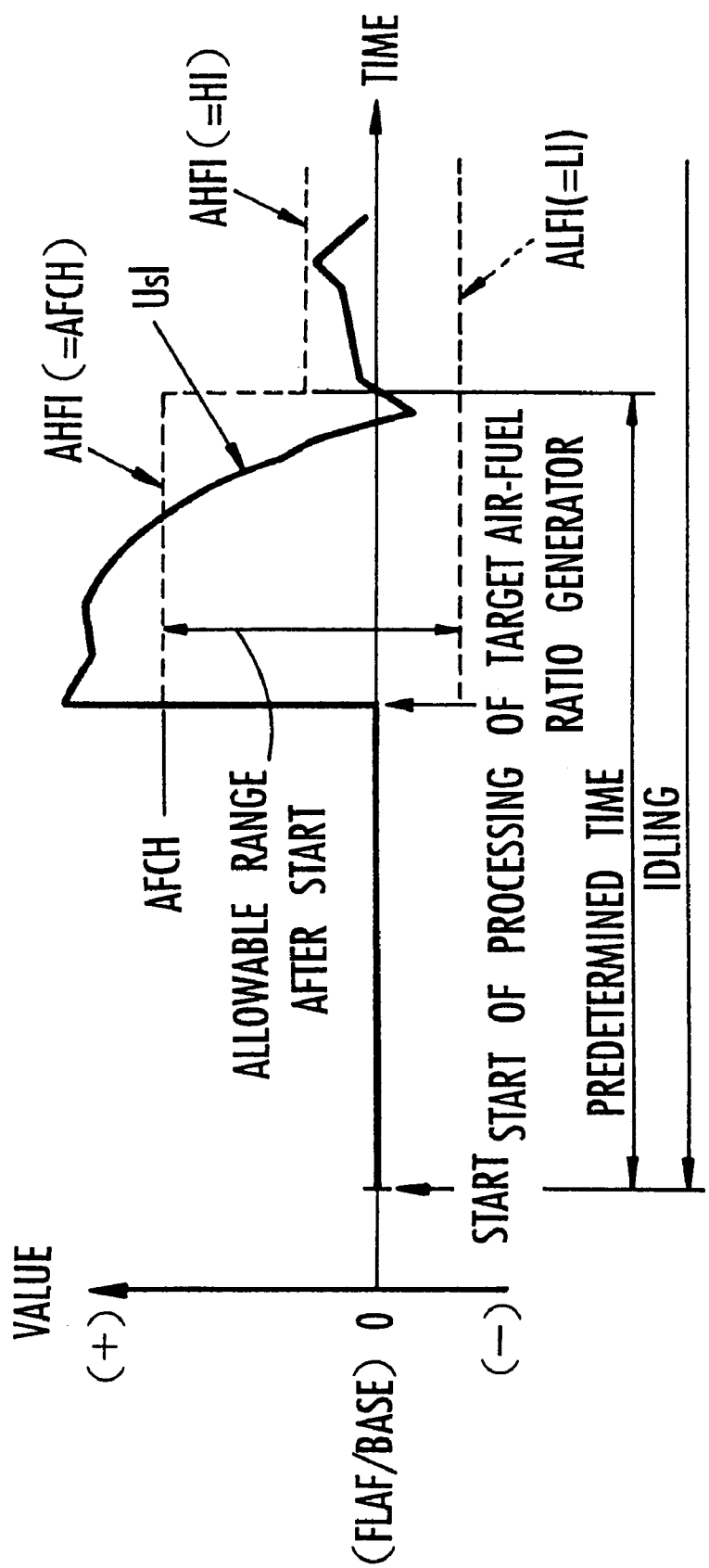
FIG. 23 is a diagram illustrative of the flowchart shown FIG. 19.
Figure 24:
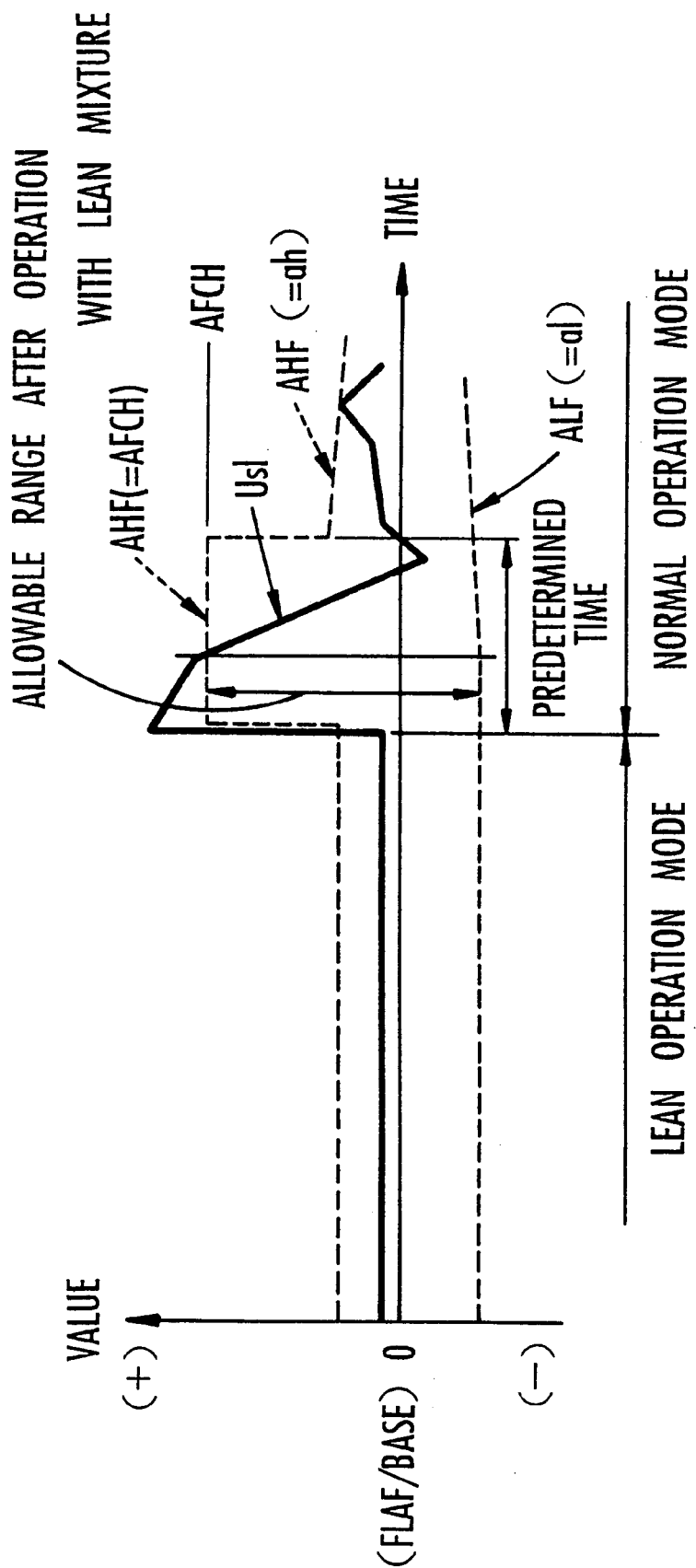
FIG. 24 is a diagram illustrative of the flowchart shown FIG. 19.

The manner in which the allowable range after FC, of the allowable range after FC/start/operation with lean mixture, established as the allowable range changes with time and also the manner in which the demand differential air-fuel ratio usl changes with time are shown in FIG. 22. Likewise, the manner in which the allowable range after start changes with time and the manner in which the allowable range after operation with lean mixture changes with time are shown in FIGS. 23 and 24, respectively.

As shown in FIG. 22, when the supply of fuel to the internal combustion engine 1 starts being cut off, the allowable range after FC is set up as the allowable range for limiting the demand differential air-fuel ratio usl until a predetermined time elapses after the supply of fuel is cut off, and the upper limit AHF thereof is fixedly maintained at the upper-limit fifth predetermined value AFCH. Therefore, the upper limit of the allowable range (the allowable range after FC) is made wide. In the illustrated example, the internal combustion engine 1 is in an operating state other than the idling state, and the lower limit ALF of the allowable range after FC is set to the adaptive lower limit al. Basically, the lower limit ALF of the adaptive lower limit a1 is sequentially updated in the same manner as with the adaptive allowable range. However, if the demand differential air-fuel ratio usl exceeds the upper limit AHF (=AFCH) of the allowable range after FC when the internal combustion engine 1 is in the state immediately after the supply of fuel is cut off (including the state in which the supply of fuel is being cut off), the lower limit ALF (=al) of the adaptive lower limit a1 is maintained at a constant value (not updated) according to the processing of STEP10-21.

In FIG. 22, the allowable range before the supply of fuel starts being cut off and after elapse of a predetermined time after the supply of fuel is cut off is set to the adaptive allowable range (normal operating state). In this embodiment, since the state in which the supply of fuel is being cut off is included in the state immediately after the supply of fuel is cut off, the allowable range from the start of the cutting-off of the supply of fuel is set to the allowable range after FC and its upper limit AHF is set to the upper-limit fifth predetermined value AFCH. However, while the supply of fuel is being cut off, the air-fuel ratio is not manipulated according to the target air-fuel ratio KCMD generated by the target air-fuel ratio generator 28. Therefore, the allowable range while the supply of fuel is being cut off may be any arbitrary allowable range, and may not necessarily be the allowable range after FC. Alternatively, while the supply of fuel is being cut off, the process of limiting the demand differential air-fuel ratio usl may not be carried out.

The allowable range after start is set up as follows: As shown in FIG. 23, when the processing of the target air-fuel ratio generator 28 starts after the internal combustion engine 1 starts to operate (the processing of the target air-fuel ratio generator 28 starts basically when the activation of both the $O_2$ sensor 6 and the LAF sensor 5 is confirmed, see FIG. 9), the demand differential air-fuel ratio usl starts being calculated. The allowable range for limiting the demand differential air-fuel ratio usl is set to the allowable range after start. The upper limit AHFI thereof (in the illustrated example, the operating state of the internal combustion engine 1 after it starts is the idling state) is fixedly maintained at the upper-limit fifth predetermined value AFCH (whose upper limit is wide) until a predetermined time elapses after the internal combustion engine 1 starts. Since the internal combustion engine 1 is in the idling state at this time, the lower limit ALFI of the allowable range after start is set to the lower-limit third predetermined value LI.

If the internal combustion engine 1 after it starts is kept in the idling state, then the allowable range after elapse of the predetermined time after the start of the internal combustion engine 1 is basically set to the allowable range for idling (AHFI=HI, ALFI=LI) as shown.

The allowable range after operation with lean mixture is set up as follows: As shown in FIG. 24, when the operation mode of the internal combustion engine 1 changes from the lean operation mode to the normal operation mode, the processing operation of the target air-fuel ratio generator 28 and the manipulation of the air-fuel ratio according to the target air-fuel ratio KCMD generated by the target air-fuel ratio generator 28 are resumed. Until a predetermined time elapses after the processing operation of the target air-fuel ratio generator 28 and the manipulation of the air-fuel ratio according to the target air-fuel ratio KCMD generated by the target air-fuel ratio generator 28 are resumed (immediately after the end of the lean operation mode), the allowable range after operation with lean mixture is set up as the allowable range for limiting the demand differential air-fuel ratio usl, and its upper limit AHF is fixedly maintained at the upper-limit fifth predetermined value AFCH. Therefore, the upper limit of the allowable range (the allowable range after operation with lean mixture) is made wide. In the illustrated example, the operating state of the internal combustion engine 1 after the lean operation mode is a normal operating state other than the idling state, and the lower limit ALF of the allowable range after operation with lean mixture is set to the adaptive lower limit al and sequentially updated in the same manner as with the adaptive allowable range. However, if the demand differential air-fuel ratio usl exceeds the upper limit AHF (=AFCH) of the allowable range after operation with lean mixture, the lower limit ALF (=al) of the allowable range after operation with lean mixture is kept constant according to the processing in STEP10-21.

In the lean operation mode, inasmuch as the processing operation of the target air-fuel ratio generator 28 is not carried out, the demand differential air-fuel ratio usl and the upper and lower limits AHF, ALF of the allowable range are kept at values immediately prior to the start of the lean operation mode. In the present embodiment, the period in which the allowable range after operation with lean mixture is set up as the allowable range for limiting the demand differential air-fuel ratio usl extends until the predetermined time elapses after the end of the lean operation mode. However, the allowable range after operation with lean mixture may be set up until the estimated differential output VO2 bar sequentially determined by the estimator 26 after the end of the lean operation mode, for example, i.e., the estimated value of the output of the $O_2$ sensor 6 determined by the estimated differential output VO2 bar becomes substantially equal to the air-fuel ratio reference value FLAF/BASE.

If the SLD control status is not in the low-level unstable state or the high-level unstable state, or the internal combustion engine 1 is not in the state immediately after the supply of fuel is cut off, or immediately after it starts, or immediately after the end of the lean operation mode, or the vehicle with the internal combustion engine 1 is in the state immediately after it starts (at this time, the internal combustion engine 1 is not idling), then the allowable range for limiting the demand differential air-fuel ratio usl is set to the allowable range after being driven under load (whose lower limit is narrow) which has the lower limit ALF set to the lower-limit second predetermined value VSTL, and the lower limit ALF is inhibited from having a value beyond the lower-limit second predetermined value VSTL in the direction to increase the allowable range in STEP10-1-21.

In the allowable range after being driven under load, the upper limit AHF is set to the variable adaptive upper limit ah in STEP10-1-19. The upper limit AHF (=ah) is updated in each control cycle exactly in the same manner as the adaptive upper limit ah of the adaptive allowable range depending on how the demand differential air-fuel ratio usl deviates from the allowable range after being driven under load, except when the demand differential air-fuel ratio usl deviates from the allowable range after being driven under load beyond its lower limit in STEP10-15, STEP10-18, STEP10-20.

Figure 25:
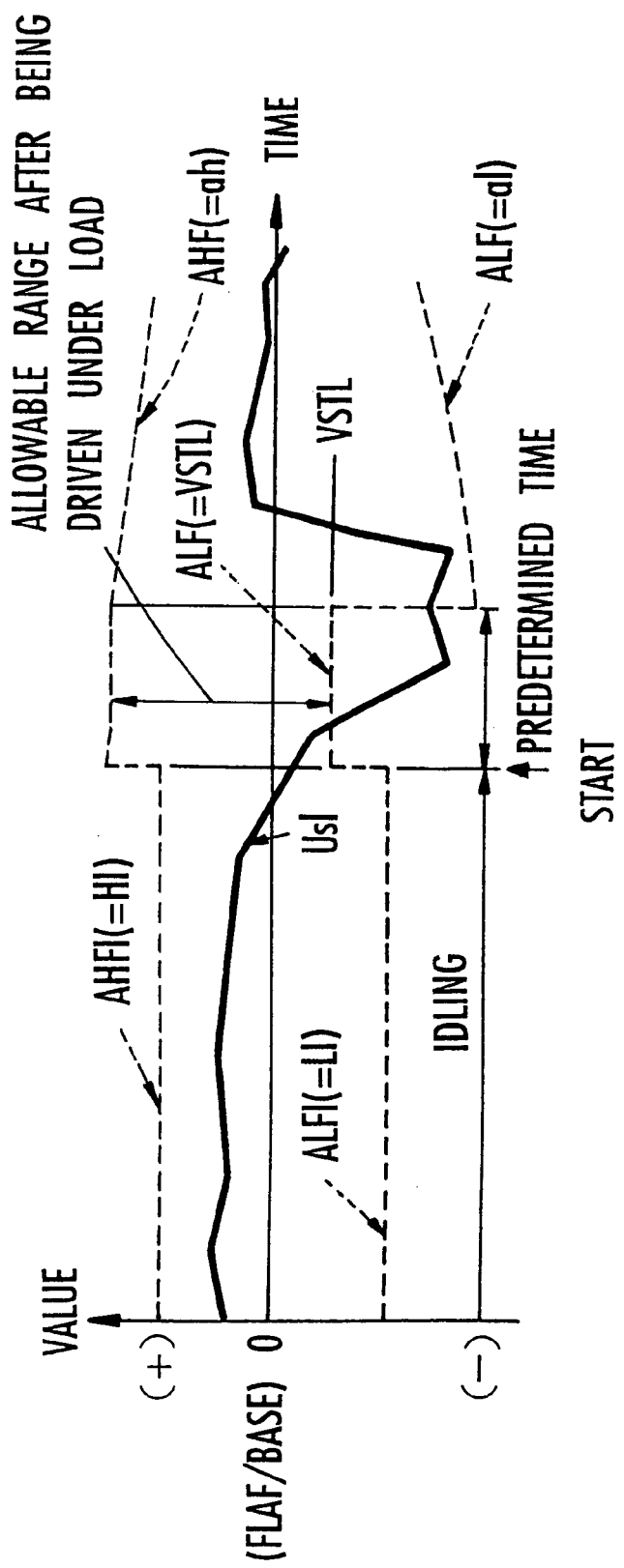
FIG. 25 is a diagram illustrative of the flowchart shown FIG. 19.

The manner in which the allowable range after being driven under load established as the allowable range changes with time and also the manner in which the demand differential air-fuel ratio usl changes with time are shown in FIG. 25.

As shown in FIG. 25, when the vehicle starts running from the idling state of the internal combustion engine 1 (the internal combustion engine 1 starts to drive its load), the allowable range is set to the allowable range after being driven under load and has its lower limit ALF fixedly maintained at the lower-limit second predetermined value VSTL until a predetermined time elapses after the vehicle starts running (immediately after the vehicle starts running). Therefore, the lower limit of the allowable range (the allowable range after being driven under load) is made relatively narrow. In this case, the upper limit AHF of the allowable range after being driven under load is set to the adaptive upper limit ah and sequentially updated in the same manner as with the adaptive allowable range.

While the internal combustion engine 1 is idling before the vehicle starts running, the allowable range is normally set to the allowable range for idling (AHFI=HI, ALFI=LI). In FIG. 25, the allowable range after elapse of the predetermined time after the vehicle starts running is set to the adaptive allowable range (normal state).

The details of the limiting process carried out in STEP10 have been described above.

Referring back to FIG. 8, the adder 31 in the target air-fuel ratio generator 28 adds the air-fuel ratio reference value FLAF/BASE (more specifically, the air-fuel ratio reference value FLAF/BASE determined by the reference value setting unit 11 in STEP12, described later on, in the preceding control cycle) to the command differential air-fuel ratio kcmd determined by the limiter 30 for thereby determining a target air-fuel ratio KCMD in the present control cycle in STEP11.

The target air-fuel ratio KCMD thus determined is stored in a time-series fashion in a memory (not shown) in each control cycle. When the engine-side control unit 7b uses the target air-fuel ratio KCMD determined by the target air-fuel ratio generator 28 of the exhaust-side control unit 7a (see STEPf in FIG. 6), the latest target air-fuel ratio KCMD stored in the time-series fashion is selected.

Then, the target air-fuel ratio generator 28 carries out a process of setting (updating) the air-fuel ratio reference value FLAF/BASE with the reference value setting unit 11 in STEP12, after which the processing in the present control cycle is finished.

In the present embodiment, the air-fuel ratio reference value FLAF/BASE is defined as the sum of a predetermined fixed component flaf/base (hereinafter referred to as a "reference value fixed component flaf/base") and a variable component flaf/adp (hereinafter referred to as a "reference value variable component flaf/adp"), i.e., FLAF/BASE=flaf/base+flaf/adp. For variably setting up the air-fuel ratio reference value FLAF/BASE, the value of the reference value variable component flaf/adp is adjusted. In the present embodiment, the reference value fixed component flaf/base is regarded as a "stoichiometric air-fuel ratio".

Figure 26:
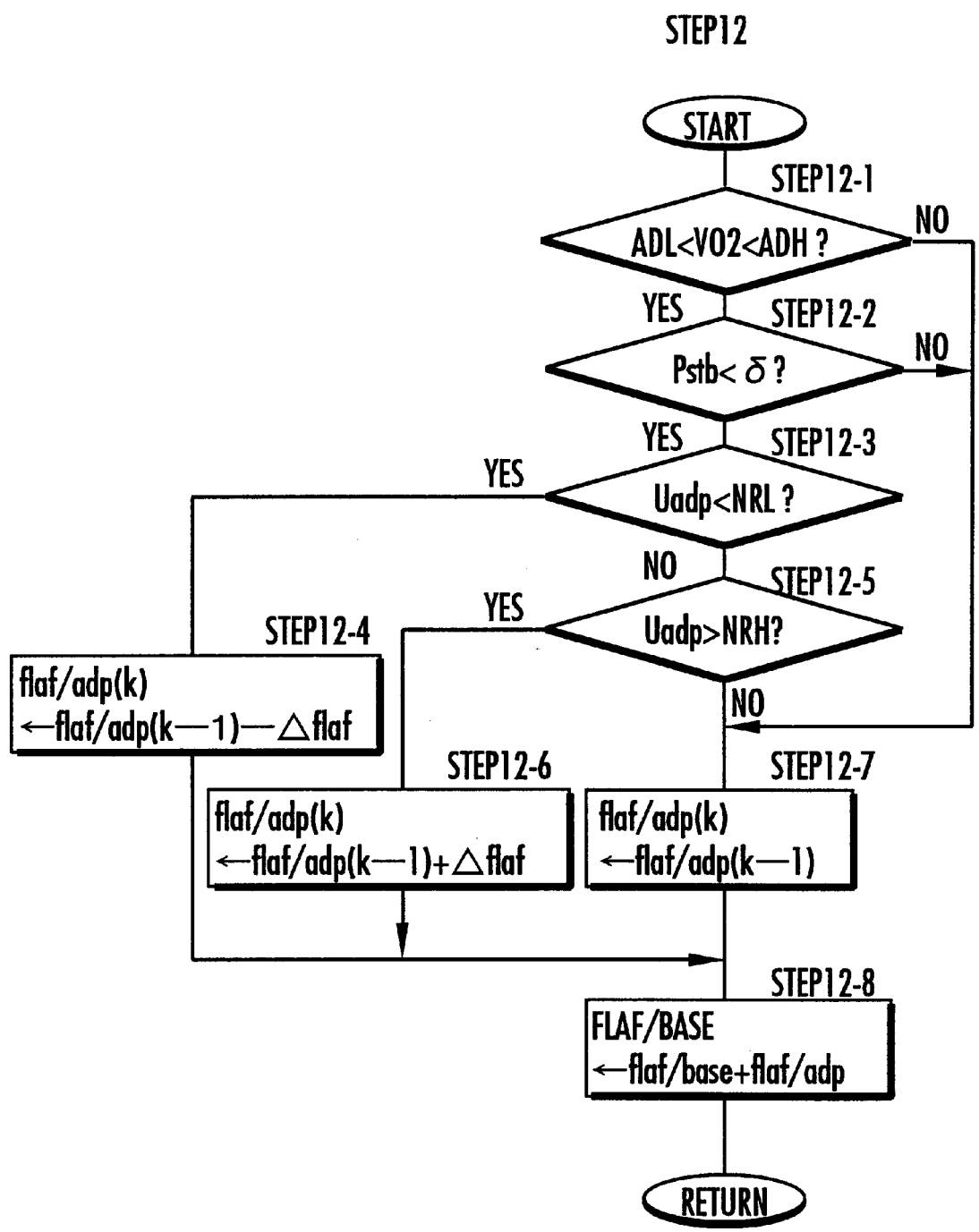
FIG. 26 is a flowchart of a subroutine of the flowchart shown in FIG. 8.

The processing of STEP12 is carried out according to a flowchart shown in FIG. 26.

The reference value setting unit 11 determines whether the differential output VO2 of the $O_2$ sensor 6 is of value within a predetermined range near "0" (a range whose lower and upper limits are set respectively to fixed values ADL (<0), ADH (>0), hereinafter referred to as a "convergence determining range") or not in STEP12-1. Stated otherwise, the reference value setting unit 11 determines whether the output VO2/OUT of the $O_2$ sensor 6 is converged substantially to its target value VO2/TARGET or not. In the present embodiment, the absolute values of the lower and upper limits ADL, ADH of the convergence determining range are identical to each other ($|ADL|=|ADH|$).

If the differential output VO2 falls in the convergence determining range (ADL<VO2<ADH) and hence the output VO2/OUT of the $O_2$ sensor 6 is converged substantially to the target value VO2/TARGET, then the reference value setting unit 11 compares the value of the stability determining basic parameter Pstb (see STEP9-1 shown in FIG. 16) determined by the limiter 30 in STEP9 (the process of determining the stability of the SLD control status) with a predetermined value $\delta$ (>0) in STEP12-2, for thereby determining the stability of the SLD control status as in STEP9-4 shown in FIG. 16.

The predetermined value $\delta$ to be compared with the stability determining basic parameter Pstb in STEP12-2 is smaller than the predetermined value $\epsilon$ used in STEP9-4 shown in FIG. 16, thus making stricter the condition to determine that the SLD control status is stable.

If Pstb<$\delta$, determining that the SLD control status is stable, then the reference value setting unit 11 adjust the reference value variable component flaf/adp depending on the adaptive control law input uadp (the adaptive control law component of the demand differential air-fuel ratio usl) determined by the sliding mode controller 27 in STEP8-3 shown in FIG. 15 in STEP12-3 through STEP12-7.

More specifically, the reference value setting unit 11 compares the value of the adaptive control law input uadp with a predetermined range near "0" (a range whose lower and upper limits are set respectively to predetermined (fixed) values NRL (<0), NRH (>0), hereinafter referred to as a "reference value adjusting dead zone") or not in STEP12-3, STEP12-5. In the present embodiment, the absolute values of the lower and upper limits NRL, NRH of the reference value adjusting dead zone are identical to each other ($|NRL|=|NRH|$).

If the adaptive control law input uadp is smaller than the lower limit NRL of the reference value adjusting dead zone (uadp<NRL), then the reference value setting unit 11 subtracts a predetermined (constant) change $\Delta$flaf (>0, hereinafter referred to as a "reference value unit change $\Delta$flaf") from a present value flaf/adp(k−1) (a value determined in the preceding control cycle) of the reference value variable component flaf/adp for thereby determining a new reference value variable component flaf/adp(k) in STEP12-4. That is, the reference value variable component flaf/adp is reduced by the reference value unit change $\Delta$flaf.

If the adaptive control law input uadp is greater than the upper limit NRH of the reference value adjusting dead zone (uadp>NRH), then the reference value setting unit 11 adds the reference value unit change $\Delta$flaf to the present value flaf/adp(k−1) of the reference value variable component flaf/adp for thereby determining a new reference value variable component flaf/adp(k) in STEP12-6. That is, the reference value variable component flaf/adp is increased by the reference value unit change $\Delta$flaf.

If the adaptive control law input uadp falls in the reference value adjusting dead zone (NRL$\leq$uadp$\leq$NRH), then the value of the reference value variable component flaf/adp is not changed, but kept at the present value flaf/adp(k−1) in STEP12-7.

Then, the reference value setting unit 11 adds the value of the reference value variable component flaf/adp(k) determined in either one of STEP12-4, STEP12-6, STEP12-7 to the reference value fixed component flaf/base for thereby determining the air-fuel ratio reference value FLAF/BASE to be used to determine the target air-fuel ratio KCMD in STEP11 in the next control cycle in STEP12-8. Thereafter, control returns to the main routine shown in FIG. 8.

If the output VO2/OUT of the $O_2$ sensor 6 is not converged to its target value VO2/TARGET (VO2$\leq$ADL or VO2$\leq$ADH) in STEP12-1, or if the SLD control status is unstable (Pstb$\geq$$\delta$) in STEP12-2, then the reference value variable component flaf/adp is not changed, but STEP12-7 is executed to hold the value of the reference value variable component flaf/adp at the present value flaf/adp(k−1). Then, STEP12-8 is executed to determine the air-fuel ratio reference value FLAF/BASE, after which control returns to the main routine shown in FIG. 8.

The reference value variable component flaf/adp which is varied depending on the adaptive control law input uadp is stored in a nonvolatile memory (not shown), e.g., an EEPROM, so that it will not be lost when the internal combustion engine 1 is stopped in operation and the exhaust-side control unit 7a is turned off. The stored value of the reference value variable component flaf/adp will be used as an initial value of the reference value variable component flaf/adp when the internal combustion engine 1 is operated next time. The initial value of the internal combustion engine 1 when the internal combustion engine 1 is operated for the first time is "0".

Figure 27:
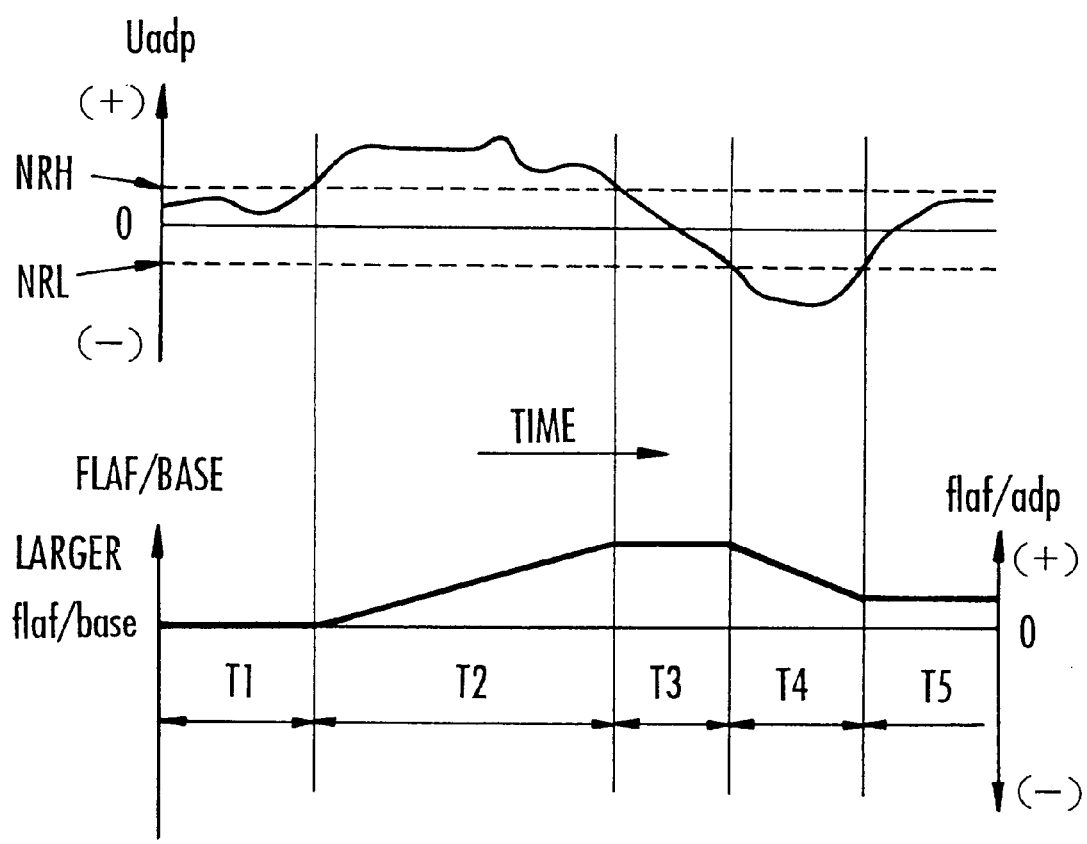
FIG. 27 is a diagram illustrative of the flowchart shown FIG. 26.

The manner in which the adaptive control law input uadp varies in STEP12 and the manner in which the reference value variable component flaf/adp and the air-fuel ratio reference value FLAF/BASE vary depending on the adaptive control law input uadp are shown respectively in upper and lower stages in FIG. 27.

As shown in FIG. 27, when the adaptive control law input uadp falls in the reference value adjusting dead zone (periods T1, T3, T5), the reference value variable component flaf/adp and the air-fuel ratio reference value FLAF/BASE are not varied, but kept constant. When the adaptive control law input uadp is greater than the upper limit NRH of the reference value adjusting dead zone (a period T2 in FIG. 27), the reference value variable component flaf/adp and the air-fuel ratio reference value FLAF/BASE are increased by the reference value unit change $\Delta$flaf in each control cycle. When the adaptive control law input uadp is smaller than the lower limit NRL of the reference value adjusting dead zone (a period T4 in FIG. 27), the reference value variable component flaf/adp and the air-fuel ratio reference value FLAF/BASE are reduced by the reference value unit change Δflaf in each control cycle. In this manner, the adaptive control law input uadp is finally converted to such a value that the adaptive control law input uadp falls within the reference value adjusting dead zone.

Details of the operation of the plant control system according to the present embodiment have been described above.

The operation of the plant control system is summarized as follows: Basically, the manipulated variable generator 29 (the sliding mode controller 27, the estimator 26, and the identifier 25) of the target air-fuel ratio generator 28 sequentially generates the demand differential air-fuel ratio usl as an input to be given to the object exhaust system E for converging the output signal VO2/OUT from the $O_2$ sensor 6 disposed downstream of the catalytic converter 3 to the target value VO2/TARGET, i.e., the difference between the air-fuel ratio of the internal combustion engine 1 and the air-fuel ratio reference value FLAF/BASE, required to converge the output signal VO2/OUT to the target value VO2/TARGET. The air-fuel ratio reference value FLAF/BASE is added to the command differential air-fuel ratio kcmd (basically kcmd=usl) produced by limiting the demand differential air-fuel ratio usl for thereby sequentially determining the target air-fuel ratio KCMD. The engine-side control unit 7b adjusts the fuel injection quantity of the internal combustion engine 1 in order to converge the output of the LAF sensor 5 (detected air-fuel ratio) to the target air-fuel ratio KCMD for thereby feedback-controlling the air-fuel ratio of the internal combustion engine 1 at the target air-fuel ratio KCMD. In this manner, the output signal VO2/OUT from the $O_2$ sensor 6 is converged to the target value VO2/TARGET, making the catalytic converter 3 capable of performing an optimum exhaust gas purifying capability regardless of aging thereof.

In the present embodiment, the sliding mode controller 27 performs the adaptive sliding mode control process which is highly stable against the effect of disturbances to calculate the demand differential air-fuel ratio usl. In calculating the demand differential air-fuel ratio usl, the estimator 26 sequentially determines the estimated differential output VO2 bar which is the estimated value of the differential output VO2 of the $O_2$ sensor 6 after the total dead time d which is the sum of the dead time d1 of the object exhaust system E including the catalytic converter 3 and the dead time t2 of the air-fuel ratio manipulating system (comprising the internal combustion engine 1 and the engine-side control unit 7b). The adaptive sliding mode control process constructed using the estimated differential output VO2 bar, more specifically, the adaptive sliding mode control process constructed for converging the estimated differential output VO2 bar to "0", is performed by the sliding mode controller 27 to determine the demand differential air-fuel ratio usl.

In this fashion, it is possible to generate the demand differential air-fuel ratio usl suitable for converging the output signal VO2/OUT of the $O_2$ sensor 6 to the target value VO2/TARGET while compensating for the effect of the dead times d1, d2 of the object exhaust system E and the air-fuel ratio manipulating system.

The gain coefficients a1, a2, b1 as parameters of the exhaust system model (the model for expressing the behavior of the object exhaust system E) required for performing the adaptive sliding mode control process with the sliding mode controller 27 and the process of calculating the estimated differential output VO2 bar with the estimator 26 are sequentially identified in a real-time basis by the identifier 25. The sliding mode controller 27 and estimator 26 determine the demand differential air-fuel ratio usl and the estimated differential output VO2 bar using the identified gain coefficients a1 hat, a2 hat, b1 hat which are the identified values of the gain coefficients a1, a2, b1.

Therefore, the identified gain coefficients a1 hat, a2 hat, b1 hat have their values highly reliable as depending on the behavior of the object exhaust system E, thus increasing the reliability of the demand differential air-fuel ratio usl and the estimated differential output VO2 bar.

In the engine-side control unit 7b for manipulating the air-fuel ratio of the internal combustion engine 1, primarily the adaptive controller 18 as a recursive-type controller capable of appropriately compensating for behavioral changes of the internal combustion engine 1 controls the air-fuel ratio of the internal combustion engine 1 at the target air-fuel ratio KCMD. Therefore, the air-fuel ratio of the internal combustion engine 1 can accurately be controlled at the target air-fuel ratio KCMD, and hence the output signal VO2/OUT of the $O_2$ sensor 6 can stably and accurately be converged to the target value VO2/TARGET.

In the present embodiment, the demand differential air-fuel ratio usl generated by the manipulated variable generator 29 for converging the output signal VO2/OUT of the $O_2$ sensor 6 to the target value VO2/TARGET is limited to produce the command differential air-fuel ratio kcmd limited in the allowable range, by which the target air-fuel ratio KCMD is finally determined. Therefore, even when the demand differential air-fuel ratio usl suffers a large variation such as a spike, the target air-fuel ratio KCMD and hence the actual air-fuel ratio of the internal combustion engine 1 are prevented from varying excessively, so that the internal combustion engine 1 can operate stably.

In the present embodiment, the adaptive allowable range is normally set up as the allowable range for limiting the demand differential air-fuel ratio usl. The adaptive upper and lower limits ah, al of the adaptive allowable range are sequentially variably updated depending on how the demand differential air-fuel ratio usl deviates from the allowable range, specifically, depending on the magnitude of the demand differential air-fuel ratio usl with respect to the upper and lower limits (see FIG. 21).

Consequently, the adaptive allowable range can be made to match exactly the range of values of the demand differential air-fuel ratio usl as an input to be given to the object exhaust system E for converging the output signal VO2/OUT from the $O_2$ sensor 6 to the target value VO2/TARGET.

For example, in a situation in which the range of values of the demand differential air-fuel ratio usl that are generated steadily is relatively narrow, i.e., in a situation in which the demand differential air-fuel ratio usl falls steadily in the adaptive allowable range, the adaptive allowable range can be narrowed to match the narrow range. Conversely, in a situation in which the range of values of the demand differential air-fuel ratio usl that are generated steadily is relatively wide, i.e., in a situation in which the demand differential air-fuel ratio usl frequently falls out of the adaptive allowable range, the adaptive allowable range can be widened to match the wide range. In a situation in which the range of values of the demand differential air-fuel ratio usl is shifted toward the upper limit (positive) of the adaptive allowable range, i.e., in a situation in which the demand differential air-fuel ratio usl frequently deviates from the adaptive allowable range beyond its upper limit, the adaptive allowable range can be shifted toward the positive limit to match the shifted range.

Thus, the demand differential air-fuel ratio usl suitable for converging the output signal VO2/OUT of the $O_2$ sensor 6 to the target value VO2/TARGET tends to fall in the allowable range (adaptive allowable range), resulting in increased opportunities to determine the target air-fuel ratio KCMD using the demand differential air-fuel ratio usl as the command differential air-fuel ratio kcmd (KCMD=usl+ FLAF/BASE). Since the demand differential air-fuel ratio usl is generated according to the adaptive sliding mode control process, the control process for converging the output signal VO2/OUT of the $O_2$ sensor 6 to the target value VO2/TARGET can stably be performed.

In a situation in which the demand differential air-fuel ratio usl temporarily varies greatly into a spike due to the effect of a disturbance and deviates from the allowable range (adaptive allowable range), the command differential air-fuel ratio kcmd is limited to a value in the allowable range for thereby avoiding large variations of the target air-fuel ratio KCMD to allow the internal combustion engine 1 to operate stably. In this case, because the adaptive allowable range is updated after limiting the demand differential air-fuel ratio usl, the determination of the target air-fuel ratio KCMD using the above inappropriate target air-fuel ratio KCMD directly and the resulting manipulation of the air-fuel ratio of the internal combustion engine 1 can reliably be eliminated.

For updating the adaptive allowable range, the increasing unit change ΔINC which defines a change in one control cycle of the adaptive upper limit ah or the adaptive lower limit al in a direction to increase the upper limit or the lower limit is greater than the decreasing unit change ΔDEC which defines a change in one control cycle of the adaptive upper limit ah or the adaptive lower limit al in a direction to decrease the upper limit or the lower limit. Therefore, in a situation in which the demand differential air-fuel ratio usl suitable for converging the output signal VO2/OUT of the $O_2$ sensor 6 to the target value VO2/TARGET deviates from the adaptive allowable range, the adaptive allowable range can quickly be changed to an allowable range in which the demand differential air-fuel ratio usl falls.

The adaptive upper limit ah of the adaptive allowable range is limited to a range between the upper-limit first predetermined value STABH and the upper-limit fourth predetermined value HH, and the adaptive lower limit a1 of the adaptive allowable range is limited to a range between the lower-limit first predetermined value STABL and the lower-limit fifth predetermined value LL (see STEP10-1-11 through STEP10-1-18 shown in FIG. 20). Therefore, the target air-fuel ratio KCMD is prevented from becoming an excessively lean or rich value which is not suitable for smoothly operating the internal combustion engine 1.

In the present embodiment, the allowable range for limiting the demand differential air-fuel ratio usl can be set to the variable adaptive allowable range, and also can be set to any of corresponding allowable ranges if the SLD control status is unstable or the internal combustion engine 1 is in a certain operating state, e.g., in a state immediately after the supply of fuel is cut off or in an idling state, as described. As a result, the following advantages are offered.

If the SLD control status is unstable, the output signal VO2/OUT of the $O_2$ sensor 6 tends to be unstable and suffer variations. However, according to the present embodiment, the relatively narrow allowable range for unstable low level or the allowable range for unstable high level is established as the allowable range for limiting the demand differential air-fuel ratio usl. Therefore, variations of the command differential air-fuel ratio kcmd and hence the target air-fuel ratio KCMD are suppressed, resulting in stability of the output signal VO2/OUT of the $O_2$ sensor 6.

The allowable range established if the SLD control status is unstable is narrower when it is unstable at high level than when it is unstable at low level (see FIG. 18). That is, the more unstable the SLD control status, the narrower the allowable range. If the SLD control status is unstable at high level, therefore, variations of the command differential air-fuel ratio kcmd and hence the target air-fuel ratio KCMD can be suppressed as positively as possible, so that the stability of the output signal VO2/OUT of the $O_2$ sensor 6 can reliably be achieved. If the SLD control status is unstable at low level, while the output signal VO2/OUT of the $O_2$ sensor 6 is rendered stable, the ability of the output signal VO2/OUT to the target value VO2/TARGET is achieved to some extent.

In this embodiment, for the predetermined time (:TMSTB) after the air-fuel ratio of the internal combustion engine 1 starts being manipulated according to the target air-fuel ratio KCMD generated by the target air-fuel ratio generator 28, i.e., after the control process of converging the output signal VO2/OUT of the $O_2$ sensor 6 to the target value VO2/TARGET starts, the stability of the SLD control status is not determined, i.e., the SLD control status is regarded as being stable (see STEPd-11 shown in FIG. 7 and STEP9-2, STEP9-3 shown in FIG. 16), so that the allowable range for unstable low level and the allowable range for unstable high level are prevented from being set up as the allowable range for limiting the demand differential air-fuel ratio usl. Specifically, immediately after the control process of converging the output signal VO2/OUT of the $O_2$ sensor 6 starts, the output signal VO2/OUT is not converged to the target value VO2/TARGET. In order to accelerate the convergence of the output signal VO2/OUT to the target value VO2/TARGET, limiting the command differential air-fuel ratio kcmd to the upper or lower limit of the allowable range is avoided as much as possible, and the frequency at which the demand differential air-fuel ratio usl becomes the command differential air-fuel ratio kcmd is increased. Thus, the output signal VO2/OUT of the $O_2$ sensor 6 can quickly be brought closely to the target value VO2/TARGET.

Immediately after the supply of fuel to the internal combustion engine 1 is cut off, as shown in FIG. 22, the allowable range for limiting the demand differential air-fuel ratio usl is set to the allowable range after FC with its upper limit being wide. Specifically, since a large amount of oxygen is stored in the catalytic converter 3 while the supply of fuel to the internal combustion engine 1 is being cut off, the output signal VO2/OUT of the $O_2$ sensor 6 is spaced away from the target value VO2/TARGET toward a leaner value of the air-fuel ratio (the output signal VO2/OUT of the $O_2$ sensor 6 becomes smaller, see FIG. 2). Therefore, immediately after the supply of fuel to the internal combustion engine 1 is cut off, the demand differential air-fuel ratio usl for converging the output signal VO2/OUT of the $O_2$ sensor 6 to the target value VO2/TARGET becomes large in a direction to make the air-fuel ratio richer (in the present embodiment, toward the upper limit of the allowable range in a positive direction of the demand differential air-fuel ratio usl), as shown in FIG. 22. Therefore, the upper limit of the allowable range after FC is set to the upper-limit fifth predetermined value AFCH, making the allowable range wider at the upper limit. It is thus possible for the command differential air-fuel ratio kcmd immediately after the supply of fuel to the internal combustion engine 1 is cut off to have a large value at the upper limit of the allowable range according to the demand differential air-fuel ratio usl, allowing the output signal VO2/OUT of the O₂ sensor 6 to converge quickly to the target value VO2/TARGET.

In the state immediately after the start of the internal combustion engine 1, as shown in FIG. 23, the allowable range for limiting the demand differential air-fuel ratio usl is set to the allowable range after start, with its upper limit made wide in the same manner as immediately after the supply of fuel is cut off. Specifically, since oxygen delivered to the catalytic converter 3 upon cranking of the internal combustion engine 1 to start same is stored in the catalytic converter 3, immediately after the internal combustion engine 1 starts, the output signal VO2/OUT of the O₂ sensor 6 tends to be spaced away from the target value VO2/TARGET toward a leaner value of the air-fuel ratio. In the present embodiment, therefore, the upper limit (corresponding to the leaner value of the air-fuel ratio) of the allowable range after start is made wide in the same manner as immediately after the supply of fuel is cut off. Therefore, the output signal VO2/OUT of the O₂ sensor 6 can be converged quickly to the target value VO2/TARGET.

In the state immediately after the end of the lean operation mode of the internal combustion engine 1 (immediately after the lean operation mode changes to the normal operation mode), as shown in FIG. 24, the allowable range for limiting the demand differential air-fuel ratio usl is set to the allowable range after operation with lean mixture, with its upper limit made wide in the same manner as immediately after the supply of fuel is cut off. Specifically, since the air-fuel ratio of the internal combustion engine 1 is manipulated toward a leaner value during the lean operation mode of the internal combustion engine 1, the output signal VO2/OUT of the O₂ sensor 6 is spaced away from the target value VO2/TARGET toward a leaner value of the air-fuel ratio. In the present embodiment, therefore, the upper limit of the allowable range after operation with lean mixture is made wide in the same manner as immediately after the supply of fuel is cut off. Therefore, it is possible for the command differential air-fuel ratio kcmd immediately after the end of the lean operation mode to have a large value at the upper limit of the allowable range according to the demand differential air-fuel ratio usl. Consequently, the output signal VO2/OUT of the O₂ sensor 6 can be converged quickly to the target value VO2/TARGET, and the catalytic converter 3 can quickly achieve an appropriate exhaust gas purifying capability.

At this time, inasmuch as the command differential air-fuel ratio kcmd has a large value at the upper limit of the allowable range (corresponding to a richer value of the air-fuel ratio), the actual air-fuel ratio of the internal combustion engine 1 quickly becomes a rich air-fuel ratio after the end of the lean operation mode. Thus, NOx absorbed by the NOx absorber (not shown) contained in the catalytic converters 3, 4 during the lean operation mode of the internal combustion engine 1 can quickly be reduced. In a next cycle of the lean operation mode, therefore, NOx in the exhaust gases can sufficiently be absorbed by the NOx absorber contained in the catalytic converters 3, 4 for exhaust gas purification.

In the state immediately after the start of the vehicle, i.e., in the state immediately after the internal combustion engine 1 starts driving its load, as shown in FIG. 25, the allowable range for limiting the demand differential air-fuel ratio usl is set to the allowable range after being driven under load, with its upper limit made narrow. Specifically, immediately after the internal combustion engine 1 starts driving its load, the air-fuel ratio of the internal combustion engine 1 tends to change to a leaner value. If such a situation occurs when the air-fuel ratio is changed in a direction toward a leaner value by the demand differential air-fuel ratio usl (in the present embodiment, in a negative direction of the demand differential air-fuel ratio usl toward the lower limit of the allowable range), then the output signal VO2/OUT of the O₂ sensor 6 is likely to change excessively to a leaner air-fuel ratio with respect to the target value VO2/TARGET. According to the present embodiment, the lower limit of the allowable range after being driven under load is set to the lower-limit second predetermined value VSTL, thus making the allowable range narrower at the lower limit. The magnitude (absolute value) of the value of the command differential air-fuel ratio kcmd which can be taken at the lower limit of the allowable range immediately after the start of the vehicle, i.e., immediately after the internal combustion engine 1 starts driving its load, is limited to a relatively small value, thus making the output signal VO2/OUT of the O₂ sensor 6 stable.

In the present embodiment, the demand differential air-fuel ratio usl is defined as a value produced by subtracting the air-fuel ratio reference value FLAF/BASE from the air-fuel ratio to be given to the object exhaust system E for converging the output signal VO2/OUT of the O₂ sensor 6 to the target value VO2/TARGET. Therefore, the upper limit (positive) of the allowable range corresponds to a richer air-fuel ratio and the lower limit (negative) of the allowable range corresponds to a leaner air-fuel ratio. However, the demand differential air-fuel ratio usl may be defined as a value produced by subtracting the air-fuel ratio to be given to the object exhaust system E for converging the output signal VO2/OUT of the O₂ sensor 6 to the target value VO2/TARGET, from the air-fuel ratio reference value FLAF/BASE. In this case, since the sign of the demand differential air-fuel ratio usl is opposite to the sign in the embodiment, the upper limit (positive) of the allowable range corresponds to a leaner air-fuel ratio and the lower limit (negative) of the allowable range corresponds to a richer air-fuel ratio.

While the internal combustion engine 1 is idling, the allowable range for limiting the demand differential air-fuel ratio usl is set to the allowable range for idling with both upper and lower limits thereof being made relatively narrow. Specifically, in the idling state of the internal combustion engine 1, if the air-fuel ratio of the internal combustion engine 1 is changed largely, then the stability of the idling state tends to be impaired. According to the present embodiment, therefore, the narrow allowable range for idling is established as the allowable range for limiting the demand differential air-fuel ratio usl. In this manner, the output signal VO2/OUT of the O₂ sensor 6 can be converged to the target value VO2/TARGET while keeping the idling state of the internal combustion engine 1 stable.

According to the present embodiment, furthermore, the air-fuel ratio reference value FLAF/BASE is variably established, as described above, depending on the adaptive control law input uadp which is a component based on the adaptive control law (adaptive algorithm) of the demand differential air-fuel ratio usl generated by the sliding mode controller 27. In this manner, the air-fuel ratio reference value FLAF/BASE can be of a central value in a range of values of the air-fuel ratio (=usl+FLAF/BASE) that is the sum of the air-fuel ratio reference value FLAF/BASE and the demand differential air-fuel ratio usl, i.e., the air-fuel ratio required for converging the output signal VO2/OUT of the O₂ sensor 6 to the target value VO2/TARGET, which air-fuel ratio is basically equal to the target air-fuel ratio KCMD. As a result, values of the demand differential air-fuel ratio usl which are sequentially generated by the sliding mode controller 27 can be balanced between positive and negative values, and the adaptive allowable range that is made variable depending on the demand differential air-fuel ratio usl can be balanced between its upper limit (positive) and its lower limit (negative).

Specifically, with the output signal VO2/OUT of the $O_2$ sensor 6 steadily converged to the target value VO2/TARGET, as is apparent from the equations (24)–(26), the equivalent control law input ueq and the reaching control law input urch, which are components other than the adaptive control law input uadp of the demand differential air-fuel ratio usl, become "0", and usl=uadp. The adaptive control law input uadp is thus significant as a central value in the range of values of the demand differential air-fuel ratio usl with the output signal VO2/OUT of the $O_2$ sensor 6 steadily converged to the target value VO2/TARGET. The sum of the adaptive control law input uadp and the air-fuel ratio reference value FLAF/BASE is significant as a central value of the air-fuel ratio required for converging the output signal VO2/OUT of the $O_2$ sensor 6 to the target value VO2/TARGET, i.e., the target air-fuel ratio KCMD.

By adjusting the target value VO2/TARGET such that the adaptive control law input uadp will be of a value close to "0", the air-fuel ratio reference value FLAF/BASE can be of a central value of the air-fuel ratio required for converging the output signal VO2/OUT of the $O_2$ sensor 6 to the target value VO2/TARGET, i.e., the target air-fuel ratio KCMD. In this embodiment, therefore, by appropriately changing the air-fuel ratio reference value FLAF/BASE depending on the value of the adaptive control law input uadp, the air-fuel ratio reference value FLAF/BASE is adjusted to keep the value of the adaptive control law input uadp in the reference value adjusting dead zone. In this fashion, the air-fuel ratio reference value FLAF/BASE can be adjusted to a central value of the air-fuel ratio required for converging the output signal VO2/OUT of the $O_2$ sensor 6 to the target value VO2/TARGET, i.e., the target air-fuel ratio KCMD. As a result, values of the demand differential air-fuel ratio usl can be balanced between positive and negative values, and the adaptive allowable range that is made variable depending on the demand differential air-fuel ratio usl can be balanced between its upper limit (positive) and its lower limit (negative). With the adaptive allowable range balanced between its upper limit (positive) and its lower limit (negative), the demand differential air-fuel ratio usl can be limited appropriately in a balance at both the upper and lower limits.

In this embodiment, the air-fuel ratio reference value FLAF/BASE is adjusted (updated) only when the output signal VO2/OUT of the $O_2$ sensor 6 is substantially converged to the target value VO2/TARGET and it is determined that the SLD control status is stable from the stability determining basic parameter Pstb. Thus, the air-fuel ratio reference value FLAF/BASE is adjusted when the value of the adaptive control law input uadp is stabilized, and the reliability of the air-fuel ratio reference value FLAF/BASE as a central value of the air-fuel ratio required for converging the output signal VO2/OUT of the $O_2$ sensor 6 to the target value VO2/TARGET, i.e., the target air-fuel ratio KCMD, is increased.

In this embodiment, in adjusting the air-fuel ratio reference value FLAF/BASE, the value of the air-fuel ratio reference value FLAF/BASE is not changed while the adaptive control law input uadp is present in the reference value adjusting dead zone. Thus, it is possible to avoid frequent variations of the air-fuel ratio reference value FLAF/BASE for thereby avoiding situations in which the SLD control status is unstable.

The above adjustment of the air-fuel ratio reference value FLAF/BASE offers the following advantages:

By changing the air-fuel ratio reference value FLAF/BASE depending on the adaptive control law input uadp, the quick response of the control process for converging the output signal VO2/OUT of the $O_2$ sensor 6 to the target value VO2/TARGET can be increased. Specifically, in the case where the air-fuel ratio reference value FLAF/BASE is constant, e.g., FLAF/BASE=flaf/base, then if there is a steady error between the actual air-fuel ratio of the internal combustion engine 1 and the target air-fuel ratio KCMD, then the adaptive control law input uadp determined by the sliding mode controller 27 finally corresponds to a learned value of the error. If the error is relatively large, then it takes a period of time for the adaptive control law input uadp to finally correspond to a learned value of the error. According to the present invention, since the air-fuel ratio reference value FLAF/BASE is changed depending on the adaptive control law input uadp, the adaptive control law input uadp can be of a sufficiently small value close to "0". Stated otherwise, the above error can be absorbed by the air-fuel ratio reference value FLAF/BASE, with the result that the quick response of the control process for converging the output signal VO2/OUT of the $O_2$ sensor 6 to the target value VO2/TARGET can be increased.

Furthermore, by changing the air-fuel ratio reference value FLAF/BASE depending on the adaptive control law input uadp, the accuracy of the estimated differential output VO2 bar determined by the estimator 26 and the identified gain coefficients a1 hat, a2 hat, b1 hat determined by the identifier 25 can be increased. The reasons for this are as follows: The exhaust system model expressed by the equation (1) with the air-fuel ratio reference value FLAF/BASE used as a reference for the input to the object exhaust system E is a model in which the output KACT (detected air-fuel ratio) of the LAF sensor 5 becomes the air-fuel ratio reference value FLAF/BASE with the output signal VO2/OUT of the $O_2$ sensor 6 steadily converged to the target value VO2/TARGET. Therefore, the air-fuel ratio reference value FLAF/BASE should be a central value of the air-fuel ratio of the internal combustion engine 1 with the output signal VO2/OUT of the $O_2$ sensor 6 steadily converged to the target value VO2/TARGET. In this embodiment, by changing the air-fuel ratio reference value FLAF/BASE depending on the adaptive control law input uadp, the air-fuel ratio reference value FLAF/BASE can be adjusted to a central value of the air-fuel ratio required for converging the output signal VO2/OUT of the $O_2$ sensor 6 to the target value VO2/TARGET. As a consequence, the behavior of the exhaust system model can be made to better match the actual behavior of the object exhaust system. Therefore, the accuracy of the estimated differential output VO2 bar determined by the estimator 26 based on the exhaust system model can be increased, and the accuracy of the identified gain coefficients a1 hat, a2 hat, b1 hat determined by the identifier 25 as identified values of parameters of the exhaust system model can be increased. With the accuracy of the estimated differential output VO2 bar and the identified gain coefficients a1 hat, a2 hat, b1 being increased, the demand differential air-fuel ratio usl determined by the sliding mode controller 27 using these data can be made optimum for converging the output signal VO2/OUT of the $O_2$ sensor 6 to the target value VO2/TARGET. As a result, the accuracy of the control process for converging the output signal VO2/OUT of the $O_2$ sensor 6 to the target value VO2/TARGET can be increased.

A plant control system according to another embodiment of the present invention will be described below. The embodiment basically differs from the above embodiment only as to the processing carried out by the estimator 26. Therefore, the same reference characters as those of the above embodiment will be used in the description of the other embodiment.

In the above embodiment, in order to compensate for the effect of the total dead time d which is the sum of the dead time d1 of the object exhaust system E and the dead time d2 of the air-fuel ratio manipulating system (comprising the internal combustion engine 1 and the engine-side control unit 7b), an estimated value of the differential output VO2 of the O$_2$ sensor 6 (estimated differential output VO2 bar) after the total dead time d is determined. If the dead time d2 of the air-fuel ratio manipulating system is sufficiently small as compared with the dead time d1 of the object exhaust system E, then an estimated value VO2(k+d1) of the differential output VO2 of the O$_2$ sensor 6 after the dead time d1 of the object exhaust system E (hereinafter referred to as a "second estimated differential output VO2 bar") may be determined, and the demand differential air-fuel ratio usl may be determined using the second estimated differential output VO2 bar. In this embodiment, the second estimated differential output VO2 bar is determined to converge the output signal VO2/OUT of the O$_2$ sensor 6 to the target value VO2/TARGET.

In this case, the estimator 26 determines the second estimated differential output VO2 bar as follows: Using the equation (1) representing the exhaust system model of the object exhaust system E, the second estimated differential output VO2 bar which represents an estimated value of the differential output VO2 of the O$_2$ sensor 6 after the dead time d1 of the object exhaust system E in each control cycle is expressed, using time-series data VO2(k), VO2(k−1) of the differential output VO2 of the O$_2$ sensor 6 and time-series data kact(k−j) (j=1, 2, . . . , d1) of past values of the differential output kact (kact=KACT−FLAF/BASE) of the LAF sensor 5, according to the following equation (42):

$$\overline{VO2}(k+d1) = \alpha 3 \cdot VO2(k) + \alpha 4 \cdot VO2(k-1) + \sum_{j=1}^{d_1} \gamma_j \cdot kact(k-j) \quad (42)$$

where $\alpha 3$ = the first-row, first-column element of $A^{d1}$, $\alpha 4$ = the first-row, second-column element of $A^{d1}$, $\gamma j$ = the first-row elements of $A^{j-1} \cdot B$ $A = \begin{bmatrix} a1 & a2 \\ 1 & 0 \end{bmatrix}$ $B = \begin{bmatrix} b1 \\ 0 \end{bmatrix}$ In the equation (42), $\alpha 3$, $\alpha 4$ represent the first-row, first-column element and the first-row, second-column element of the d1th power $A^{d1}$ (d1: total dead time of the object exhaust system E) of the matrix A defined in the equation (12), and $\gamma j$ (j=1, 2, . . . , d1) represents the first-row elements of the product $A^{j-1} \cdot B$ of the (j−1)th power $A^{j-1}$ (j=1, 2, . . . , d1) of the matrix A and the vector B defined in the equation (12).

The above equation (42) is a basic equation for the estimator 26 to calculate the second estimated differential output VO2(k+d1) bar in this embodiment. The equation (42) is similar to the equation (12) except that "kcmd" in the equation (12) is replaced with "kact" and "d" in the equation (12) is replaced with "d1". In this embodiment, the equation (42) is calculated using time-series data VO2(k), VO2(k−1) of the differential output VO2 of the O$_2$ sensor 6 and time-series data kact(k−j) (j=1, 2, . . . , d1) of past values of the differential output kact (kact=KACT−FLAF/BASE) of the LAF sensor 5 in each control cycle, to determine the second estimated differential output VO2(k+d1) bar of the O$_2$ sensor 6.

The values of the coefficients $\alpha 3$, $\alpha 4$ and $\gamma j$ (j=1, 2, . . . , d1) which are necessary to calculate the second estimated differential output VO2(k+d1) bar according to the equation (42) are calculated using the identified gain coefficients a1 hat, a2 hat, b1 hat which are identified values of the gain coefficients a1, a2, b1. The value of the dead time d1 required in the calculation of the equation (42) is the same as in the previous embodiment.

The other processing than the processing described above is basically the same as in the previous embodiment. However, the sliding mode controller 27 determines the equivalent control input ueq, the reaching control law input urch, and the adaptive control law uadp, which are components of the demand differential air-fuel ratio usl according to the equations (24), (26), (27), respectively, where "d" is replaced with "d1". In the process of limiting combinations of the identified gain coefficients a1 hat, a2 hat, carried out by the identifier 25, depending on the value of the dead time d1 of the object exhaust system E, the range for limiting the combinations (which corresponds to the identifying coefficient stable range or the identifying coefficient limiting range shown in FIG. 12) may differ from the range in the previous embodiment, but may be established in the same manner as in the previous embodiment.

The plant control system according to this embodiment operates on the same manner and offers the same advantages as the with previous embodiment with respect to the process of limiting the demand differential air-fuel ratio usl and the variable setting of the air-fuel ratio reference value FLAF/BASE.

The plant control system where the object exhaust system E serves as a plant is not limited to the above embodiments, but may be modified as follows:

In the above embodiments, the LAF sensor (wide-range air-fuel ratio sensor) 5 is employed as the second detecting means for detecting an air-fuel ratio as an input to the object exhaust system E. However, the second detecting means may comprise an ordinary O$_2$ sensor or any of various other types of sensors insofar as it can detect the air-fuel ratio of an air-fuel mixture combusted by the internal combustion engine 1.

In the above embodiments, an output from the object exhaust system E represents an oxygen concentration in the exhaust gas, and the O$_2$ sensor 6 is employed as the first detecting means for detecting the oxygen concentration. However, the first detecting means may comprise any of various other types of sensors insofar as it can detect the concentration of a certain component of an exhaust gas downstream of the catalytic converter to be controlled. For example, if carbon monoxide in an exhaust gas downstream of the catalytic converter is to be controlled, the first detecting means may comprise a CO sensor. If nitrogen oxide (NOx) in an exhaust gas downstream of the catalytic converter is to be controlled, the first detecting means may comprise an NOx sensor. If hydrocarbon (HC) in an exhaust gas downstream of the catalytic converter is to be controlled, the first detecting means may comprise an HC sensor. When a three-way catalytic converter is employed, then even if the concentration of any of the above gas components is detected, it may be controlled to maximize the purifying performance of the three-way catalytic converter. If a catalytic converter for oxidation or reduction is employed, then purifying performance of the catalytic converter can be increased by directly detecting a gas component to be purified.

In the above embodiments, the gain coefficients a1, a2, b1 as parameters of the exhaust system model are identified by the identifier 25. However, the gain coefficients a1, a2, b1 may be fixed to predetermined values, or may be established from a map or the like depending on operating conditions of the internal combustion engine 1 and deteriorated states of the catalytic converter 3.

In the above embodiments, the estimator 26 and the sliding mode controller 27 use a common exhaust system model of the object exhaust system E. However, the estimator 26 and the sliding mode controller 27 may use respective models. In such a case, an input to the exhaust system model for use in the processing of the estimator 26 may not necessarily be expressed using the air-fuel ratio reference value FLAF/BASE.

In the above embodiments, the exhaust system model is expressed by a discrete system (discrete-time system). However, it may be expressed a continuous system (continuous-time system), and an algorithm for the processing of the estimator 26 and the sliding mode controller 27 may be constructed based on the model of such a continuous system (continuous-time system).

While the estimator 26 is used in the above embodiments, the estimator 26 may be dispensed with if the dead times of the object exhaust system E and the air-fuel ratio manipulating system are sufficiently short.

In the above embodiments, the adaptive sliding mode control process is used as a feedback control process for generating the manipulated variable (the demand differential air-fuel ratio usl) for manipulating the air-fuel ratio of the internal combustion engine 1 for converging the output signal VO2/OUT of the $O_2$ sensor 6 to the target value VO2/TARGET, using the estimated differential output VO2 bar. However, any of various other feedback control processes (preferably for generating a manipulated variable component corresponding to the adaptive control law input uadp) may be used.

In the above embodiments, the air-fuel ratio of the internal combustion engine 1 is feedback-controlled at the target air-fuel ratio KCMD using the output signal from the LAF sensor 5. However, it is possible to manipulate the air-fuel ratio of the internal combustion engine 1 into the target air-fuel ratio KCMD by adjusting the amount of fuel supplied to the internal combustion engine 1 under feed-forward control using a map or the like based on the target air-fuel ratio KCMD.

In the above embodiments, in adjusting the air-fuel ratio reference value FLAF/BASE, the value of the air-fuel ratio reference value FLAF/BASE is not changed while the adaptive control law input uadp is present in the reference value adjusting dead zone. However, the air-fuel ratio reference value FLAF/BASE may be changed such that if the adaptive control law input uadp is greater than "0", then the air-fuel ratio reference value FLAF/BASE is incremented by the reference value unit change Δflaf in each control cycle, and if the adaptive control law input uadp is smaller than "0", then the air-fuel ratio reference value FLAF/BASE is decremented by the reference value unit change Δflaf in each control cycle. The air-fuel ratio reference value FLAF/BASE can then be adjusted such that the adaptive control law input uadp will be substantially "0".

In the above embodiments, the air-fuel ratio reference value FLAF/BASE is changed depending on the adaptive control law input uadp according to the adaptive sliding mode control process. However, even if the demand differential air-fuel ratio usl is generated according the normal sliding mode control process which does not include the adaptive control law input uadp, the air-fuel ratio reference value FLAF/BASE can variably be established. Specifically, if the demand differential air-fuel ratio usl is determined as the sum of the equivalent control input ueq and the reaching control law input urch (usl=ueq+urch) according to the normal sliding mode control process which does not employ the adaptive control law, then the reaching control law input urch in a state wherein the value of the stability determining basic parameter Pstb (=σ bar·Δσ bar) or the value of the rate of change of the switching function σ bar is steadily substantially "0" corresponds to the adaptive control law input uadp in the above embodiments. Therefore, the same advantages as in the above embodiments can be achieved by changing the air-fuel ratio reference value FLAF/BASE depending on the reaching control law input urch in the above state in the same manner as in the above embodiments.

In the above embodiments, the control system for controlling the internal combustion engine 1 mounted on the vehicle has been described by way of example. However, the present invention is also applicable to an engine for actuating an object other than the vehicle, e.g., an electric generator or the like.

In the above embodiments, the plant control system where the object exhaust system E serves as the plant has been described by way of example. However, the plant control system according to the present invention is not limited to the above embodiments.

A plant control system according to still a second embodiment of the present invention will be described below with reference to FIG. 28.

Figure 28:
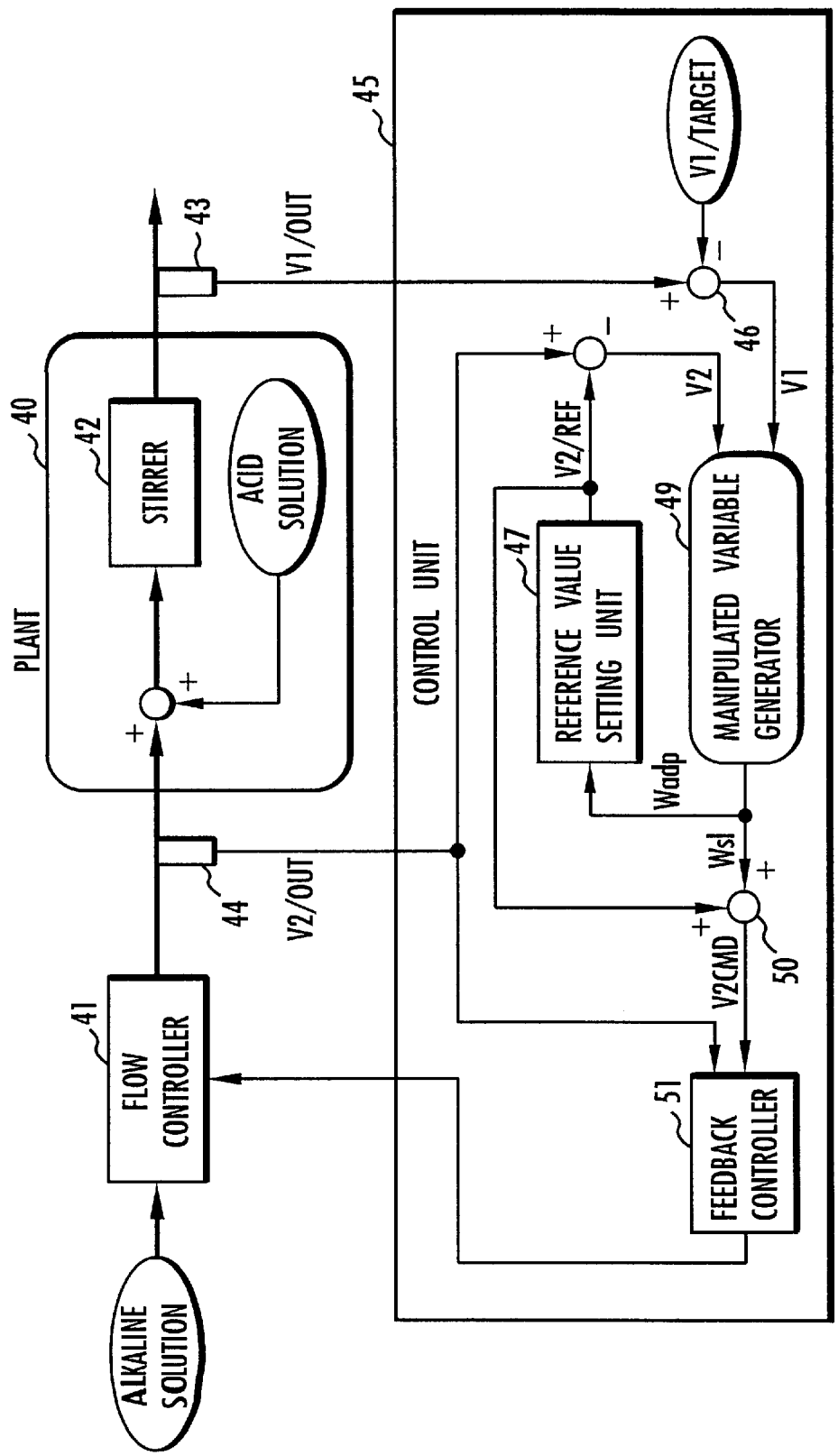
FIG. 28 is a block diagram of a plant control system according to a second embodiment of the present invention.

As shown in FIG. 28, a plant 40 is supplied with an alkaline solution at a flow rate which can be regulated by a flow rate controller (actuator) 41. The plant 40 mixes the supplied alkaline solution with an acid solution, and stirs them into a mixed solution with a stirrer 42.

The plant control system according to the embodiment shown in FIG. 28 serves to control the flow rate of the alkaline solution supplied to the plant 40 for adjusting the pH of the mixed solution (the mixture of the alkaline solution and the acid solution) discharged from the plant 40 to a desired pH, i.e., a pH corresponding to a neutral value.

The plant control system has a pH sensor 43 (first detecting means) disposed at the outlet of the plant 30 for detecting the pH of the mixed solution discharged from the plant 40, a flow rate sensor 44 (second detecting means) disposed at the inlet of the plant 40 for detecting the flow rate of the alkaline solution supplied to the plant 40, and a control unit 45 for performing a processing operation (described later on) based on respective outputs V1/OUT, V2/OUT of the pH sensor 43 and the flow rate sensor 44.

The control unit 45 comprises a microcomputer or the like. The control unit 45 comprises a subtractor 46 for calculating a difference V1 (=V1/OUT−V1/TARGET, which will hereinafter be referred to as a differential output V1 of the pH sensor 43)) between the output V1/OUT of the pH sensor 43 and a target value V1/TARGET (which corresponds to a target pH of the mixed solution) therefor, a reference value setting unit 47 (reference value setting means) for sequentially generating a reference value V2/REF for the flow rate of the alkaline solution to be supplied to the plant 40 (which reference value will also be a reference value for the output of the flow rate sensor 44), and a subtractor 48 for calculating a difference V2 (=V2/OUT−V2/REF, which will hereinafter be referred to as a differential output V2 from the flow rate sensor 44) between the output V2/OUT of the flow rate sensor 44 and the reference value V2/REF. The control unit 45 also comprises a manipulated variable determining unit 49 for determining a difference wsl (which corresponds to the demand differential air-fuel ratio kcmd in the above embodiments, and will hereinafter be referred to as a demand differential flow rate wsl) with the reference value V2/REF for the flow rate of the alkaline solution to be supplied to the plant 40 in order to converge the output V1/OUT of the pH sensor 43 to the target value Vl/TARGET, as a manipulated variable for manipulating the output of the flow rate controller 41, an adder 50 for adding the reference value V2/REF to the demand differential flow rate wsl to determine a target flow rate V2CMD for the alkaline solution to be supplied to the plant 40, and a feedback controller 51 (actuator control means) for adjusting an operation variable (e.g., the opening of a valve) for the flow rate controller 41 under feedback control for converging the output V2/OUT (detected flow rate) of the flow rate sensor 44 to the target flow rate V2CMD.

A system which comprises the flow rate controller 41 and the feedback controller 51, i.e., a system for generating the output V2/OUT of the flow rate sensor 44 from the target flow rate V2CMD is referred to as a flow rate manipulating system (which corresponds to the air-fuel ratio manipulating system in the above embodiments).

The manipulated variable determining unit 49 has an identifier, an estimator, and a sliding mode controller (not shown) which are identical to those of the air-fuel ratio manipulated variable determining unit 29 (see FIG. 3) according to the above embodiments. The manipulated variable determining unit 49 employs a discrete-system model of the plant 40 where VO2, kact in the equation (1) described above are replaced respectively with the differential outputs V1, V2, and a discrete-system model of the flow rate manipulating system where kact, kcmd in the equation (2) are replaced respectively with the differential output V2 and the demand differential flow rate wsl, and carries out the same processing operations as those of the identifier 25, the estimator 26, and the sliding mode controller 27 of the air-fuel ratio manipulated variable determining unit 49.

Specifically, the manipulated variable determining unit 49 calculates identified values (which correspond to the identified gain coefficients a1 hat, a2 hat, b1 hat in the above embodiments) of parameters of the model of the plant 40, using the data of the differential outputs V1, V2. The manipulated variable determining unit 49 also calculates an estimated value (which corresponds to the estimated differential output VO2 bar in the above embodiments) of the differential output V1 of the pH sensor 43 after a total dead time which is the sum of a dead time existing in the plant 40 and a dead time existing in the flow rate manipulating system, using the data of the differential outputs V1, V2 and the data of the identified values of the parameters of the model of the plant 40. The manipulated variable determining unit 49 also calculates the demand differential flow rate wsl according to the adaptive sliding mode control process, using the data of the differential outputs V1, V2, the data of the estimated value of the differential output V1, and the data of the identified values of the parameters of the model of the plant 40.

A preset value of the dead time in the model of the plant 40 may be determined by way of experimentation so as to be a time (e.g., a constant value) which is equal to or greater than the actual dead time of the plant 40. A preset value of the dead time in the model of the flow rate manipulating system may be determined by way of experimentation so as to be a time (e.g., a constant value) which is equal to or greater than the actual dead time of the flow rate manipulating system in view of the operating characteristics of the flow rate controller 41.

For limiting the values of parameters of the model of the plant 40 to be identified by the identifier as with the above embodiments, conditions for limiting the values of the parameters or their combinations may be established through experimentation or simulation in view of the controllability of the output V1/OUT of the pH sensor 43 at the target value V1/TARGET, the stability of the demand differential flow rate wsl, and the stability of operation of the flow rate controller 41 depending thereon, in the same manner as with the above embodiments.

As with the reference value setting unit 11 in the above embodiments, the reference value setting unit 47 sequentially variably determines the reference value V2/REF depending on an adaptive control law input wadp that is determined by a sliding mode controller in the manipulated variable determining unit 49 as a component based on the adaptive control law of the demand differential flow rate wsl according to the adaptive sliding mode control process.

The adaptive control law input wadp can be determined by an equation which is the same as the right-hand side of the equation (27) using the switching function σ bar where the VO2 bar according to the equation (25) is replaced with the estimated value of the differential output V1.

As with the general feedback controller 15 according to the above embodiments, the feedback controller 51 feedback-controls the operation of the flow rate controller 41 to equalize the output V2/OUT (detected flow rate) of the flow rate sensor 44 to the target flow rate V2CMD with a PID controller, an adaptive controller, or the like (not shown).

The plant control system according to the embodiment shown in FIG. 28 is effective to converge the output V1/OUT of the pH sensor 43, i.e., the pH of the mixed solution generated by the plant 40, to a desired pH (target value V1/TARGET) according to the adaptive sliding mode control process regardless of the effect of disturbances and the dead time existing in the plant 40, without recognizing the pH of the alkaline solution supplied to the plant 40, the pH of the acid solution mixed with the alkaline solution in the plant 40, and the flow rate of the acid solution.

With the reference value V2/REF relative to the model of the plant 40 being sequentially established depending on the adaptive control law input wadp relative to the adaptive sliding mode control process, the quick response of the control process for converging the output V1/OUT of the pH sensor 43 to the target value VI/TARGET can be increased. At the same time, the accuracy of the estimated value of the differential output V1 and the identified values of the parameters of the model of the plant 40 can also be increased. As a result, the accuracy of the control process for converging the output V1/OUT of the pH sensor 43 to the target value VI/TARGET can be increased.

In this embodiment, the process of limiting the demand differential flow rate wsl is omitted. However, the target flow rate V2CMD may be determined by limiting the demand differential flow rate wsl to a value in a given allowable range and adding the reference value V2/REF. In such a case, it is also possible to variably set up the allowable range depending on how the demand differential flow rate wsl deviates from the allowable range, or change the manner in which the allowable range is set up depending on the operating state of the flow rate controller 41.

The plant control system according to the present embodiment may be modified in the same manner as the above embodiments where the object exhaust system E serves as a plant.

Although certain preferred embodiments of the present invention have been shown and described in detail, it should be understood that various changes and modifications may be made therein without departing from the scope of the appended claims.

What is claimed is:

1. A plant control system for controlling a plant, comprising:
   an actuator for generating an input to the plant;
   first detecting means for detecting an output from the plant;
   manipulated variable determining means for sequentially generating a manipulated variable which manipulates the input to the plant to converge the output from said first detecting means to a predetermined target value according to a feedback control process constructed based on a model of a behavior of the plant as a system for generating the difference between the output from said first detecting means and a target value with at least a response delay from the difference between the input to the plant and a predetermined reference value;
   actuator control means for controlling operation of said actuator based on said manipulated variable to manipulate the input to the plant; and
   reference value variable setting means for variably setting said predetermined reference value depending on the manipulated variable generated by said manipulated variable determining means.

2. A plant control system according to claim 1, wherein said plant comprises an exhaust system ranging from a position upstream of a catalytic converter disposed in an exhaust passage of an internal combustion engine for purifying an exhaust gas from the internal combustion engine, to a position downstream of the catalytic converter, said exhaust system including said catalytic converter, said input to the plant comprising an air-fuel ratio of an air-fuel mixture combusted in the internal combustion engine as said actuator for generating the exhaust gas which enters said catalytic converter, said output from the plant comprising the concentration of a component of the exhaust gas having passed through said catalytic converter.

3. A plant control system according to claim 1, wherein said feedback control process comprises a process for generating said manipulated variable using data representing the difference between the output of said first detecting means and said target value, and parameters of said model which define the behavior of the model.

4. A plant control system according to claim 2, wherein said feedback control process comprises a process for generating said manipulated variable using data representing the difference between the output of said first detecting means and said target value, and parameters of said model which define the behavior of the model.

5. A plant control system according to claim 3, further comprising second detecting means for detecting the input to the plant, and identifying means for sequentially identifying the parameters of said model, using the data representing the difference between the output of said first detecting means and said target value, and the data representing the difference between the output from said second detecting means and said reference value.

6. A plant control system according to claim 4, further comprising second detecting means for detecting the input to the plant, and identifying means for sequentially identifying the parameters of said model, using the data representing the difference between the output of said first detecting means and said target value, and the data representing the difference between the output from said second detecting means and said reference value.

7. A plant control system according to any one of claims 1 through 6, wherein said model of the plant comprises a model expressing the behavior of said plant with a discrete-time system.

8. A plant control system according to any one of claims 1 through 6, wherein said manipulated variable comprises a target value for the difference between the input to said plant and said reference value, said actuator control means comprising means for controlling operation of said actuator in order to manipulate the input to said plant into a target input determined based on said target value for the difference and said reference value.

9. A plant control system according to any one of claims 1 through 6, wherein said feedback control process comprises a sliding mode control process.

10. A plant control system according to claim 9, wherein said sliding mode control process comprises an adaptive sliding mode control process.

11. A plant control system according to claim 10, wherein said manipulated variable generated by said manipulated variable generating means according to said adaptive sliding mode control process includes an adaptive control law component based on an adaptive control law of said adaptive sliding mode control process, said reference value variable setting means comprising means for variably setting said reference value based on the value of the adaptive control law component of said manipulated variable.

12. A plant control system according to claim 11, wherein said reference value variable setting means comprises means for variably setting said reference value by increasing or decreasing said reference value depending on the magnitude of the value of the adaptive control law component of said manipulated variable with respect to a predetermined value or a range close to and containing said predetermined value.

13. A plant control system according to claim 9, wherein said reference value variable setting means comprises means for sequentially determining whether the output from said first detecting means is stable or not, and holding said reference value as a predetermined value irrespective of said manipulated variable if the output from said first detecting means is unstable.

14. A plant control system according to claim 13, wherein said reference value variable setting means comprises means for determining whether the output from said first detecting means is stable or not based on the value of a switching function used in said sliding mode control process.

15. A plant control system according to any one of claims 1 through 6, wherein said reference value variable setting means comprises means for determining whether the output from said first detecting means is substantially converged to said target value or not, and holding said reference value as a predetermined value irrespective of said manipulated variable if the output from said first detecting means is not converged to said target value.

16. A plant control system according to claim 9, wherein said reference value variable setting means comprises means for determining whether the output from said first detecting means is substantially converged to said target value or not, and holding said reference value as a predetermined value irrespective of said manipulated variable if the output from said first detecting means is not converged to said target value.

* * * * *